(12) United States Patent
Heitman et al.

(10) Patent No.: US 7,080,140 B2
(45) Date of Patent: Jul. 18, 2006

(54) STORAGE AREA NETWORK METHODS AND APPARATUS FOR VALIDATING DATA FROM MULTIPLE SOURCES

(75) Inventors: Allen Robert Heitman, Rochester, MN (US); Gregory John Knight, Brooklyn Park, MN (US); David Lynn Merbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 09/972,398

(22) Filed: Oct. 5, 2001

(65) Prior Publication Data

US 2003/0177168 A1    Sep. 18, 2003

(51) Int. Cl.
  G06F 15/173    (2006.01)
  G06F 15/16     (2006.01)
  G06F 13/00     (2006.01)
(52) U.S. Cl. .................... 709/224; 709/201; 719/319
(58) Field of Classification Search ........ 709/213–217, 709/223–224, 201, 250; 719/316; 707/103
  See application file for complete search history.

(56) References Cited

U.S. PATENT DOCUMENTS

| | | | |
|---|---|---|---|
| 3,720,812 A | 3/1973 | Downs | |
| 3,912,881 A | 10/1975 | Rigazio et al. | |
| 4,486,777 A | 12/1984 | Yamamura | |
| 4,766,324 A | 8/1988 | Saadat et al. | |
| 5,079,418 A | 1/1992 | Michel et al. | |
| 5,079,536 A | 1/1992 | Chapman | |
| 5,136,155 A | 8/1992 | Kyburz et al. | |
| 5,991,437 A | 11/1999 | Migdal et al. | |
| 6,016,285 A | 1/2000 | Wright et al. | |
| 6,055,493 A | 4/2000 | Ries et al. | |
| 6,202,157 B1 * | 3/2001 | Brownlie et al. | 713/201 |
| 6,208,345 B1 * | 3/2001 | Sheard et al. | 715/853 |
| 6,289,333 B1 * | 9/2001 | Jawahar et al. | 707/2 |
| 6,606,690 B1 * | 8/2003 | Padovano | 711/148 |
| 6,754,718 B1 * | 6/2004 | Dobberpuhl et al. | 709/250 |
| 6,757,696 B1 * | 6/2004 | Multer et al. | 707/201 |
| 6,804,819 B1 * | 10/2004 | Bates et al. | 719/318 |

\* cited by examiner

*Primary Examiner*—Ario Etienne
*Assistant Examiner*—El Hadji Malick Sall
(74) *Attorney, Agent, or Firm*—William K. Konrad; Konrad Raynes & Victor LLP

(57) ABSTRACT

A storage area network has a plurality of components, such as host digital data processors and storage devices. A store, e.g., resident on a manager digital data processor, contains one or more objects (or other data constructs) that represent information gathered from the hosts, i.e., scans. Further such objects represent components in the SAN and/or relationships between and among those components. A discover engine or other functionality executing on the manager digital data processor validates information gathered from a selected host concerning a selected component or relationship based on a scan object, if any, that is associated with a component object or relationship object, respectively, corresponding to the selected component or relationship.

25 Claims, 46 Drawing Sheets

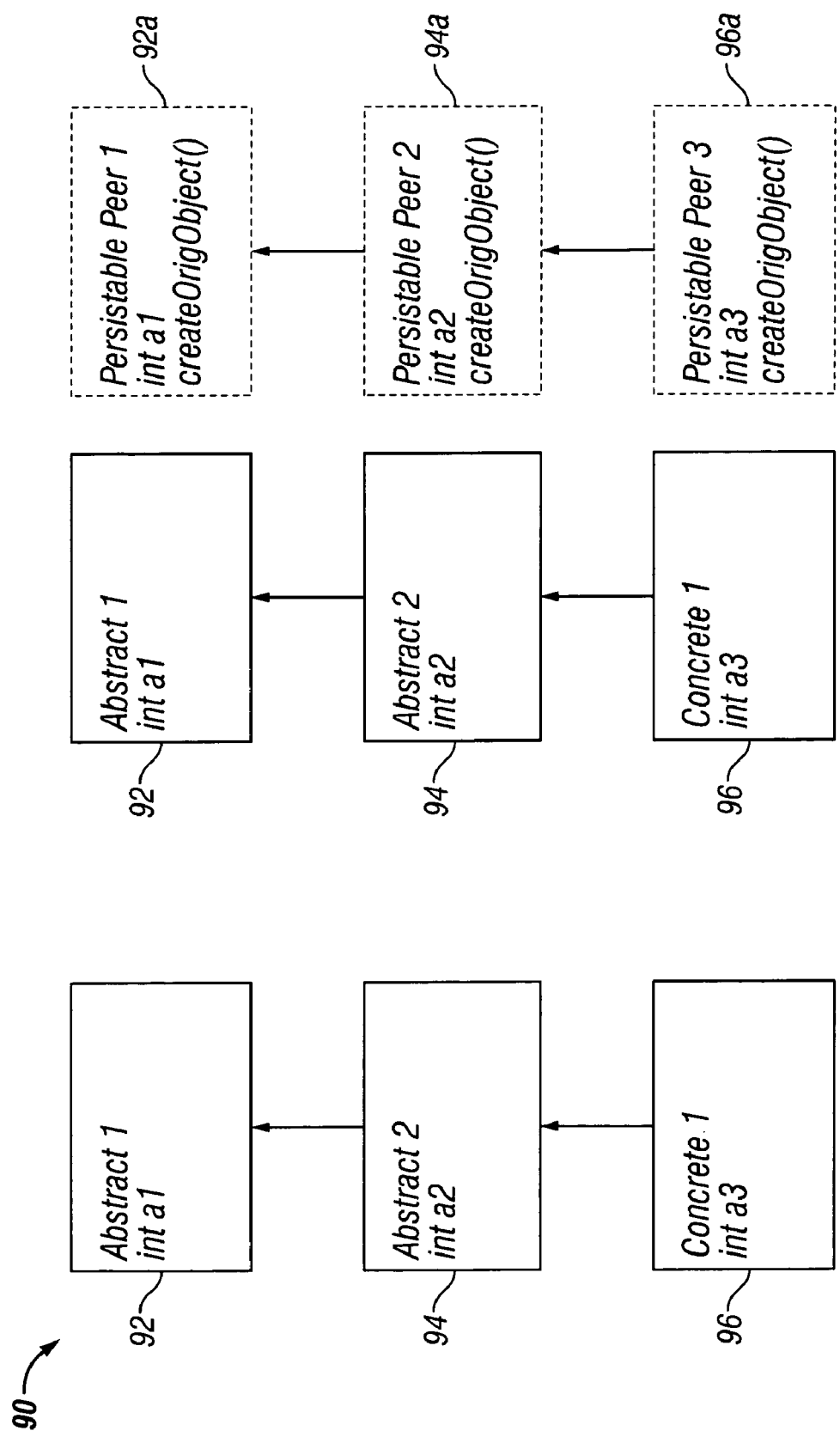

STORAGE AREA NETWORK METHODS AND APPARATUS FOR VALIDATING DATA FROM MULTIPLE SOURCES

BACKGROUND OF THE INVENTION

The invention pertains to digital data processing and, more particularly, to storage area networks and methods of operation thereof. The invention has application, for example, in managing access by a plurality of digital data processors (e.g., web or file servers, graphical workstations and so forth) to a plurality of disk drives, disk arrays and other storage devices.

In early computer systems, long-term data storage was typically provided by dedicated storage devices, such as tape and disk drives, connected to a data central computer. Requests to read and write data generated by applications programs were processed by special-purpose input/output routines resident in the computer operating system. With the advent of "time sharing" and other early multiprocessing techniques, multiple users could simultaneously store and access data—albeit only through the central storage devices.

With the rise of the personal computer (and workstation) in the 1980's, demand by business users led to development of interconnection mechanisms that permitted otherwise independent computers to access data on one another's storage devices. Though computer networks had been known prior to this, they typically permitted only communications, not storage sharing. The prevalent business network that has emerged is the local area network, typically comprising "client" computers (e.g., individual PCs or workstations) connected by a network to a "server" computer. Unlike the early computing systems in which all processing and storage occurred on a central computer, client computers usually have adequate processor and storage capacity to execute many user applications. However, they often rely on the server computer—and its associated battery of disk drives and storage devices—for other than short-term file storage and for access to shared application and data files.

An information explosion, partially wrought by the rise of the corporate computing and, partially, by the Internet, is spurring further change. Less common are individual servers that reside as independent hubs of storage activity. Often many storage devices are placed on a network or switching fabric that can be accessed by several servers (such as file servers and web servers) which, in turn, service respective groups of clients. Sometimes even individual PCs or workstations are enabled for direct access of the storage devices (though, in most corporate environments such is province of server-class computers) on these so-called "storage area networks."

A drawback in prior art storage area networks arises in managing the proliferation of hosts and storage devices. Current solutions focus on setting switches or switch-like interfaces on the network or interconnect fabric between the hosts and storage device, electrically "blocking" certain hosts certain storage devices and so forth. A problem with these solutions is that they permit only zoning or switch-like control. Another problem is that, by their very nature, these solutions tend to be provider specific.

An object of this invention is to provide improved storage area networks and methods of operation thereof.

Further objects of the invention provide such methods and apparatus as facilitate access to multiple storage devices, e.g., of varied types, from a plurality of servers or other host digital data processors, e.g., running a variety of platforms.

Still further objects of the invention are to provide such methods and apparatus for managing administrator-defined and other policies for storage networks, e.g., to facilitate access by multiple hosts to multiple storage devices in a manner consistent with network administrators' wishes and without risk of unwanted access conflicts.

Yet still further objects of the invention are to provide such methods and apparatus as facilitate the persistence of status and other data pertaining to storage area networks regardless of the metaphors under which that data is used and/or stored (e.g., object-oriented, relational, and so forth).

Another object of the invention is to provide such methods and apparatus as facilitate automated handling of events that occur with respect to storage area networks and their componentry.

Yet other objects of the invention are to provide such methods and apparatus as facilitate visual representation of the storage area network topology, componentry and status.

Still yet another object of the invention is to provide such methods and apparatus as facilitate administrator (or other operator) definition of storage area network policy (e.g., vis-à-vis assignment of storage devices to hosts) and as facilitate notification of events occurring with respect thereto.

These and other objects of the invention are evident in the drawings and in the description that follow.

SUMMARY OF THE INVENTION

LUN Management

The foregoing are among the objects attained by the invention which provides, in one aspect, novel storage area networks (SANs) and methods of operation thereof. For example, in one aspect, the invention provides improvements on a SAN of the type having a plurality of hosts coupled via a network or other interconnect with one or more storage units. The improvement, according to this aspect of the invention, comprises a manager process, device or other functionality in communication with a plurality of agent processes, devices or other functionality, each of which is associated with a host. The agents identify attributes of (i) their associated hosts, (ii) the interconnect (or portion thereof) to which that host is coupled, and/or (iii) storage units to which that host is coupled via the interconnect. The manager responds to these attributes identified by the agents to manage the SAN.

The manager according to related aspects of the invention can be implemented on a first digital data processor, while the hosts are implemented on further digital data processors. These digital data processors can be coupled via a first network, e.g., an IP or other network, to support communications between the manager and the agents. Such communications can be further effected, according to one aspect of the invention, utilizing an object request broker (ORB). The interconnect, according to further related aspects of the invention, comprises a second network, e.g., SCSI and/or fiber channel based fabric, separate from the first network.

According to still further aspects of the invention, the manager provides one or more management functions including, by way of non-limiting example, interfacing with a SAN administrator, resolving SAN topology, managing storage device logical unit number assignment, and managing extension of host file systems. The agents can serve as proxies (or agents) for the manager, effecting functionality on its behalf at the host level. This functionality can include SAN component attribute collection, LUN masking control, host file system monitoring, and file system extension implementation.

Further aspects of the invention provide systems as describe above in which one or more agents utilize their associated hosts to query and otherwise gather information regarding storage devices to them (the hosts) via the interconnect. This information can include the number of logical units present on each physical storage device, the identification of the physical storage device and its respective logical units, and/or the storage capacity of each logical unit. Queries from the hosts to the devices can be effected via using the protocol of the interconnect, e.g., a SCSI protocol for a fiber channel interconnect.

In related aspects of the invention, the manager correlates information collected by the agents from their respective hosts, e.g., disambiguating identifies of logical units in the storage devices and, more typically, on the SAN, from potentially only partial (or incomplete) information supplied by each agent. In accord with policies established by the SAN administrator (and entered into the manager, e.g., via its graphical interface), the manager assigns logical units to the hosts. According to related aspects of the invention, the manager communicates those assignments to, and effects them via, the agents.

Further related aspects of the invention provide SAN systems as described above in which each agent imposes logical unit number (LUN) assignments on their respective agents, e.g., via filters at the adapter layer. This facilitates communication between the host and its assigned storage devices by obviating the need for it (the host) to consult the manager for each read/write operation to those or other (e.g., unassigned) storage devices.

In still further aspects, the invention provides SANs as described above in which the manager includes a graphical user interface (GUI) for display of SAN topology and/or for input of administrator-defined SAN "policy," by way of non-limiting example, LUN assignment, un-assignment, and file extension policy. The GUI can provide a plurality of views, each for example with icons or text representations (collectively, "icons" or "graphical objects") representing hosts, storage devices (or logical units), associations therebetween (e.g., assignment or accessibility), and/or properties thereof.

Assignment of a LUN to a host is permitted through administrator/operator-selection of a host icon and a LUN icon on the GUI display. This is beneficially facilitated, according to one aspect of the invention, by selectively activating the icons representing the LUNs only after the icon for a specific host has been selected and, then, only activating icons for those LUN that are accessible to the selected host and otherwise suitable for assignment.

In related aspects of the invention, the GUI provides icons representing SAN operations, such as assignment, unassignment, and so forth. These icons are beneficially activated, for example, only when icons for corresponding hosts, storage units and/or other SAN components have been selected. For example, an icon for executing a LUN-to-host assignment operation is activated only after both a host and a LUN are selected. This can likewise be true of a LUN-to-host unassignment operation. A GUI with such features advantageously facilitates administrator action, minimizing the number input decisions on the part of an administrator as well as the number of key strokes, "mouse" clicks, or other operator input device operations.

In further related aspects of the invention, a topological, hierarchical or enumerated (i.e., listing) display of SAN components can be accompanied by a display of component properties (e.g., identity of LUNs in a physical storage device, and so forth). The latter display, too, is beneficially generated only upon selection of a specific component in the former display. In a related aspect, data necessary for generating the latter (i.e., a component property) display is retrieved, for example, from a local or remote database, only upon selection of a specific component in the former display.

Further related aspects of the invention provide a system as described above in which the GUI provides for selective display of storage devices, or logical units, depending upon their storage capacity or other quantitative attributes. In this regard, the GUI permits operator/administrator specification of a numerical range for use by the manager in filtering storage device display. This aspect of the invention can be used to display, for example, logical units having a storage capacity, say, of between four and six gigabytes or, for example, greater than ten gigabytes.

According to further aspects of the invention, the manager of a SAN as described above notifies the operator/administrator of SAN events such as, by way of non-limiting example, failure or disconnection of a storage device from the SAN. The manager permits specification (e.g., by the administrator) of a delay interval (or "alert interval") between a first and subsequent notifications of an event. Upon receipt of an event notification from an agent, for example, the manager can implement this mechanism by determining, e.g., from a database or otherwise, whether a previous notification of was made to the administrator. If so, further notification is made only if the current time follows that of the previous notification by the specified alert interval.

In further aspects, the invention provides a SAN as described above in which the manager maintains policies for handling events pertaining to (i) attributes of at least selected hosts and/or (ii) establishment of relationships of at least selected hosts with one or more storage units. A policy engine included within the manager responds to notification of at least a selected event by effecting execution of an action according to the policy maintained therefor.

In a related aspect, the policy engine includes a module, herein referred to as an automation module, that receives events from the agents and associates each event with a policy applicable to that event to form an [event, policy] pair. For example, as discussed in more detail below, when an agent file system monitor detects that the utilized portion of a file system associated with a managed host has exceeded a pre-defined threshold, it transmits an event notification to the policy engine. The policy engine determines, based on a pre-defined policy, whether the file system of this managed host should be extended. If the pre-defined policy calls for the extension of the file system, the policy engine identifies which LUN should be utilized and requests that a LUN manager assign the identified LUN to that host.

Further aspects of the invention provide systems as described above in which the manager maintains in a relational database a topological or other representation of the storage area network, or aspect thereof. In response, for example, to notification from an agent of addition of a component to the SAN, the manager instantiates an object oriented programming (OOP) object reflecting attributes of the component. This object, referred to below as a "manager" object can also include, for example, method members for collecting those attributes (e.g., from other databases or stores in the manager, or elsewhere). The manager instantiates one or more further objects, referred to as "peer" objects, that store persistable data from a corresponding manager object. These peer object are mapped into the relational database and, thereby, facilitate transfer of the persistable data to and from it.

Event Processing

The invention provides in other aspects improvements on a digital data processing apparatus of the type that manages a SAN and maintains an internal representation thereof, e.g. of the topology of the SAN. The improvements include providing a first queue with entries representing tasks and a second queue with entries representing data for processing in connection with those tasks, where the data in the second queue is grouped in accord with the task to which it corresponds. A manager service updates the internal representation of the SAN (e.g., the representation of the SAN topology) by executing the tasks in the first queue one at a time, for example, atomically using a single-threaded process.

Further aspects of the invention provide improved apparatus as described above in which the data contained in the second queue constitute event notifications, e.g., generated by a detection service in response to changes in the SAN. That service can receive, for example, from agents associated with host digital data processors on the SAN, information regarding the hosts and storage devices to which they are connected via an interconnect. In related aspects of the invention, the detection service discerns changes in the SAN and generates notifications by comparing information or "scans" from the agents with previously stored scans. One or more notifications can be generated corresponding to each change and transmitted to the manager for placement on the queues. The notifications can reflect, for example, that a new host or storage device has been added to the SAN, that the attributes of such a device have been modified, that a device is missing, and/or that a relationship between a storage device and host has changed.

Further aspects of the invention provide improved apparatus as described above in which the manger service selectively adds notifications received from the detection service to the second queue until receipt of a selected notification, e.g., indicating that the underlying scan is complete. The service manger can, upon such receipt, generate for addition to the second queue an object-oriented programming (OOP) object, or other construct, execution of which effects processing of the prior notifications for the same underlying change detected by the service manager.

Still further aspects of the invention provide apparatus as described above in which the first (or task) queue is processed on a first-in-first out (FIFO) basis. In related aspects, the tasks in that queue can be treated on a priority basis, e.g., with high priority tasks being executed prior to those of lower priority.

Conflict Resolution in Event Processing

Further aspects of the invention provide an improved SAN, e.g. of the type described above, that includes a first element that maintains a first representation of the SAN, and a second element that maintains a second representation of the SAN. The first element generates notifications of events in the SAN, e.g., addition or removal of components or relationships between components. The second element responds to such notifications by accessing the first representation (e.g., via the first element) and updating the second representation.

The first element can be, for example, a detection service of the type discussed above. This maintains, according to aspects of the invention, a representation of the SAN comprising a one-deep history of scans received from the agents.

The second element conversely can be the aforementioned manager service. It maintains, as noted above, a topological representation of the SAN. In executing tasks and notifications in the queues described above, the service manager service (or "second element") can access the SAN representation (e.g., scan history) maintained by the detection service.

In certain instances, the event notification may prove inconsistent with the topology representation maintained by the manager service, e.g., as where the notification indicates that a relationship has been added between two SAN components and the topology representation does not include one of those components. Or, for example, if the event notification indicates that a component has been added to the SAN and the detection service's representation includes no such component. In some such instances, according to aspects of the invention, the manager service disregards the event notification. In other instances, the manager service instigates a recovery of the topology representation, e.g., by copying all or a portion of detection service representation. In the latter regard, recovery can be targeted to objects representing a specific device (and its relationships with other devices) in connection with which the inconsistency arose or, for example, to objects representing components of the SAN in a region of that device, thereby, speeding the recovery process.

Event Notification with Data

Still further aspects of the invention provide an improved SAN as described above in which the detection service (or first element) provides data, along with the event notification. That data is preferably sufficient for the manager service (or second element) to update the second representation but, in any event, is at least sufficient to avoid the need for the manager service to access information in the first representation in order to update the second representation. Thus, for example, along with notification of a missing storage device, the discover engine can transmit an identifier of the device and any other information necessary for the manager service to update its SAN topology database without a need to request additional data from the discover engine.

Further aspects of the invention provide a SAN as described above in which the notification and event are contained in an object-oriented programming "object" or other construct suitable for carrying the requisite message between the detection service and manager service.

A SAN constructed and operated in accord with these aspects of the invention allows for maintenance of a valid topological representation of the SAN in the manager service, without a need to lock the scan representation in the detection service, even where notifications are generated asynchronously with respect to one another and where multiple notifications may be queued for processing. It also avoids the necessity of conflict resolution of the type described above.

Virtual SAN Determination

Still further aspects of the invention provide a storage area network (SAN) in which one or more host digital data processors are coupled to one or more storage devices (e.g., LUNs) by an interconnect, e.g., a fiber channel-based fabric. Switches or switch-like interfaces on the interconnect fabric define zones or regions in which certain hosts can access certain storage devices, but not other storage devices. Thus, for example, a switch in the fabric may effect two regions: one over which a first host can access a single port on each storage devices A and B; and another over which a second host can two ports on storage device B.

Scanners, e.g., operating within agents associated with the hosts, collect information regarding the regions and, more particularly, the hosts, storage devices and interconnect elements that make them up. Continuing the above example, a scanner operating on or in conjunction with the first host reports that it can access port 1 on storage device A and port 1 on B via the switch. A scanner operating on or in conjunction with the second host reports that it can access ports 1 and 2 on storage device B via the switch.

A manager operating, for example, on a further digital data processor disambiguates information from the regions and discerns the topology of the portion of the SAN spanned by the regions. Thus, it identifies as a virtual SAN elements from regions that have at least one common storage device port, or other interconnect endpoint, with at least one other region. In the example above, the manager identifies, as a virtual SAN the first and second hosts, the switch, and storage devices A (port 1) and B (ports 1 and 2)—since these are the combined elements of the two regions have an endpoint in common, to wit, port 1 of storage deviceB.

Maintenance and Removal of SAN Change Histories

The invention provides in other aspects improved storage area networks (SANs) that maintain an internal representation of the SAN in a first data store and that maintains a separate store identifying changes to the SAN. A process executing, for example, in the manager digital data processor of the type described above utilizes the first store to generate a display, e.g., on the operator/administrator console, of the SAN topology, its components and/or the relationships among those components (collectively, "topology"). The manager responds to information in the second store to identify on the display changes in the SAN.

In related aspects, the invention provides an improved SAN as described above in which the digital data processor selectively discontinues identifying changes on the topology display. This can be in response, for example, to an operator/administrator request. At the same time, or otherwise in connection therewith, the digital data processor can remove the corresponding history information from the second store.

Further related aspects of the invention provide improved SANs as described above in which the internal representation (or model) of the SAN is represented by objects or other data constructs (collectively, "model objects") maintained in the first store. Each of those model objects can represent, for example, a respective component of the SAN or a respective interrelationship between components of the SAN. And, each can identify the respective component/interrelationship and its attributes.

The second store can likewise maintain, according to further aspects of the invention, objects or other data constructs (collectively, "history objects") that represent changes to the SAN. Each of those objects corresponds to a respective object in the first store or component in the SAN (though, there typically are not as many history objects as model objects or SAN components).

The history objects can reflect a status of their respective components, e.g., as "new," "suspect," "missing" or otherwise. The designation "new" applies, for example, the SAN components or interrelationships that have been added since the last topology display (or operator/administrator "clear history" command); the designation "suspect" to components/interrelationships whose status is inconsistently reported, e.g., by the aforementioned agents and their respective hosts; and the designation "missing" to component/interrelationships that have been removed since the last topology display (or operator/administrator "clear history" command). Further statuses that can be represented by the history objects include, for example, "broken" indicating that the component is not functioning properly; "attribute changed" indicating that an attribute of the component has since the last topology display (or operator/administrator "clear history" command); "needs attention" indicating that the component, though functioning properly, requires operator attention; and "moved" indicating that the component has been moved in the topology since the last display (or operator/administrator "clear history" command). Related aspects of the invention provide a SAN as described above in which the status reflected by a history object is a function of the corresponding component's prior status and its condition, e.g., as reported by a scanner or discerned by the discover engine. Thus, for example, an object whose prior status was "broken" and which is reported by the discover engine as being "new" is assigned a status of "suspect" in a corresponding history object.

By using separate stores for the SAN representation and the change history, indicia of changes in the topology can generated rapidly, without traversing the entire internal representation. Clearing of the change history can likewise be accomplished quickly, again, without traversing the internal representation.

In yet further aspects, the invention provides methods as described above in which tasks on the second queue derive not only from event notifications received from the detection service, but also from SAN operations, e.g., device labeling commands, requested by the system operator/administrator.

LUN Selection For File System Extension

Further aspects of the invention provide an improved SAN of type having one or more digital data processors, e.g., the aforementioned hosts, and one or more storage devices. At least a selected one of the hosts includes a file system that effects access by the host to assigned storage devices. This can be, for example, a conventional AIX or other host platform file system that oversees file and other data accesses between the host and those assigned devices. That host can be associated, according to these aspects of the invention, with lower and upper capacity bounds for purposes of file system extension. In response to a request by (or on behalf of) the selected digital data processor for extension of the file system, the manager assigns one of more further storage devices to that digital data processor.

In related aspects, the invention provides a SAN of the type described above having a plurality of storage units and a plurality of host digital data processors coupled to those storage units via an interconnect. Agents associated with each of the hosts digital data processors identify attributes of any of (i) the associated host, (ii) the interconnect to which that host digital data processor is coupled, and (iii) storage units to which that host digital data processor is coupled. The agents also respond to assignment, by a manager digital data processor, of a storage unit to the associated host digital data processor(s) by preventing access by that host digital data processor to others of said storage units in the SAN. At least a selected one of the hosts includes a file system and is associated with lower and upper capacity bounds for purposes of file system extension, as described above. In response to a request by the agent of that host for extension of the file system, the manager assigns one of more further storage devices (e.g., from among a pool of storage devices accessible to that host and otherwise available for assignment to it) to that selected host digital data processor.

Further aspects of the invention provide a SAN as described above in which the manager responds to the file system extension request by identifying a storage device from among the plurality of further storage devices accessible to the first digital data processor having a capacity in a range between the lower capacity bound and the upper capacity bound (or, in the case of a striped RAID file system, a range between the lower capacity bound divided by (s) and the upper capacity bound divided by (s), where (s) is the number of stripes), and assigns that storage device to the selected host digital data processor. Where more than one storage device meets these capacity criterion, the manager can assign to the selected host the storage device having the greatest capacity.

In related aspects, the invention provides a SAN as described above in which the manager responds to the file system extension request by identifying and assigning to the selected host a plurality of storage devices whose combined storage capacity that equals or exceeds the lower capacity bound (divided by (s), for a striped RAID file system). Such identification and assignment of multiple devices can be effected, for example, in instances where no single storage device, itself, has adequate capacity. Moreover, where such identification and assignment is effected, the manager can select among the storage devices on the basis of decreasing size. Thus, it assigns storage devices with larger storage capacities before assigning those with smaller storage capacities.

Still further aspects of the invention provide SANs as described above in which the manager removes from selection any storage device whose assignment to the first digital data process, in response to a previous file extension request, had failed. Related aspects of the invention provide such SAN in which the manager assigns only storage devices of types, e.g., pre-selected by an operator/administrator or otherwise.

Further aspects of the invention provide SAN, e.g., of the type described above, that assigns storage devices for purposes of file system extension based on a RAID file system type of the selected host digital data processor and, particularly, that determines a number of same-sized storage devices to be assigned to the selected host based on that file system type. For example, in one related aspect, the invention provides such a SAN in which the number of assigned storage devices (n) for a RAID file system having no stripes and a number of mirror redundancies (m) is determined in accord with the relation $n=m+1$.

A related aspect of the invention provides a SAN as described above in which the number (n) of same-sized storage devices assigned to a host digital data processor having (s) stripes and no mirror redundancies is determined in accord with the relation $n=s$.

A still further aspects of the invention provides a SAN as described above in which the number (n) of same-sized storage devices assigned to a host digital data processor having (s) stripes, each with (m) mirror redundancies is determined in accord with the relation $n=s*(m+1)$.

A still further aspects of the invention provides a SAN as described above in which the number (n) of same-sized storage devices assigned to a host digital data processor having (m) mirror redundancies spread over (s) stripes in accord with the relation $n=(m+1)*s$.

Rendering a SAN Topology

In further aspects, the invention provides improvements on a storage area network ("SAN") of the type that includes one or more digital data processors (e.g., the aforementioned hosts) that are coupled for communication with one or more storage devices (e.g., LUNs) over an interconnect. The improvement provides a mechanism for hierarchically displaying, e.g., on the administrator console or other output device, portions of the SAN topology. Particularly, the SAN is divided into segments to facilitate display and, thereby, locating failing devices in the SAN. A graphical user interface displays icons for each SAN and divides the topology into submaps, i.e., a screen that contains icons—where double clicking on an icon will show another submap if the icon is not a leaf node. The SAN is divided into several types of segments: a switch segment contains an icon representing an individual switch and the devices directly connected to the switch; a switch port connected to multiple devices is represented by a loop segment. The segment contains an icon for the switch and the devices.

According to further aspects of the invention, the improvement provides a process that generates for application to the output device a plurality of graphical objects that represent "segments" of the SAN and/or components of the SAN, along with the interconnections between them. Thus, for example, a first graphical object displayed on the output device can represent a first segment of the SAN. A second graphical object can represent either a second segment of the SAN or a component (e.g., host or storage device) of the SAN. And, a third graphical object can represent the portion of the interconnect that couples the segments/component represented by the first and second graphical objects. The process selectively responds to operator/ administrator selection of any of the graphical objects that represent a segment by regenerating the display to depict the interconnected segments and/or components that make up that segment.

A component, in this context, refers for example to a storage device or a host digital data processor, while a segment refers to portion of the SAN containing multiple such interconnected components, whether represented as (i) individual components and/or (ii) one or more further segments.

Related aspects of the invention provide a SAN as described above in which the process responds to operator selection of a graphical object representing a segment or component by displaying the attributes thereof. For example, in the case of selection of an object representing a storage device, the process can display the type and capacity of the device, its LUN identifier, and so forth. In the case of selection of an object representing a segment, the process can display its location, an enumeration of its components, and so forth.

Further aspects of the invention provide a SAN as described above in which the process displays the aforementioned graphical objects in a main presentation panel (or window) and displays further graphical objects—referred to here as "navigational" objects—in one or more other presentation panels. These navigation objects, too, represent components or segments of the SAN and, indeed, can correspond to the graphical objects displayed in the main panel. Alternatively, or in addition, the navigational objects can correspond to the SAN root or other segments and or components that are not direct descendants of those represented by the graphical objects in the main panel.

Still further aspects of the invention provide SANs as described above in which a component having a selected status, e.g., failed, is depicted in alternate form, e.g., with color highlighting, blinking, or so forth. Segments that contain such a component can likewise be displayed in an alternate form to facilitate operator identification of the component. Related aspects of the invention provide use of such alternate display to highlight portions of the interconnect that have failed or are otherwise have a selected status.

Hierarchical File System Extension Policy

Further aspects of the invention provide a storage area network (SAN) that includes a plurality of digital data processors, each with a file system that effects access to one or more storage devices coupled to the SAN, for example, via the aforementioned interconnect fabric. A process (e.g., executing in the aforementioned SAN manager) responds to a file system over-extension notification from at least a selected one of the digital data processors, e.g., by assigning a further storage device to that digital data processor. The type of response is, more particularly, determined in accord with a hierarchically defined policy inherited, in whole or in part, from one or more hierarchical groups of which the digital data processor is a member.

In a related aspect, the invention provides a SAN as described above in which the policy used by the process in responding to the notification is defined, in part, by a first grouping to which that digital data processor belongs and, in part, by a second grouping to which that digital data processor belongs. Each of the groups is at a respective hierarchical level: the first group at a first level, and the second group at a second level. The first level is higher then the second, and the first group includes the digital data processor(s) of the second group, as well as at least one other digital data processor.

A still further related aspect of the invention provides a SAN as described above in which the first group is associated with a first set of attributes and the second group is associated with a second set of attributes, e.g., which form a subset of the first group. The first set defines a default policy for digital data processors included in the first group. The second set overrides corresponding attributes of the first group and, along with the inherited (but not overridden) attributes, defines a policy for second group.

By way of non-limiting example, according to one aspect of the invention, the selected digital data processor can be a member of several hierarchical groups: a domain level group that defines the default file extension policy for all digital data processors in the SAN; a host-group level group that overrides some or all of the domain level attributes for a selected subset of the SANs digital data processors; and a host level "group" that overrides some or all of the attributes for a given digital data processor. By way of further non-limiting example, policy-defining attributes can include whether the file system of the digital data processor is being monitored, whether the file system can be extended, a threshold value for extension, storage devices onto which the file system can be extended, an extension minimum size, an extension maximum size, and an alert interval defining how often event notification is to be provided.

Further aspects of the invention provide a SAN as described above in which the policy extends down to the level of the file system (i.e. a so-called file system level "group"), such that the manager process can respond to a notification from a host digital data processor based on a policy for a specific file system within that digital data processor. That policy can be inherited, in part, from each of the domain level group, the host-group level group, and the digital data processor itself. It can also be based on attributes specified for that specific file system, which override corresponding inherited attributes.

Still further aspects of the invention provide a SAN as described above in which a hierarchical policy as described above is implemented with respect to other components of the SAN.

Display and Management of File System Extension Policy Hierarchy

Further aspects of the invention provide a SAN, e.g., as described above, that includes one or more of the aforementioned host or other digital data processors, each having a file system that effects access to one or more storage devices. Consistent with the discussion above, each processor can be associated with multiple groups from respective levels of a hierarchy, e.g., a first processor group and a second processor group descendant from the first processor group.

As above, the first group can be associated with a default file extension policy (e.g., with attributes assigned outright to that group and/or from a group at a still higher hierarchical level). The second group can be associated with the default policy by inheritance, which association can be overridden in whole or in part by attributes specifically assigned to that level. Continuing the example above, the groups can include any combination of the aforementioned domain level group, host-group level group, host "group," and file system "group."

A process, e.g., executing on the aforementioned SAN manager, includes a graphical user interface that displays the processor groups as a hierarchical tree. Along, for example, with the identities of the processor groups, nodes of the displayed tree list attributes of the policy defined for each respective group. As above, those attributes can include, by way of non-limiting example, whether the file system of the digital data processor is being monitored, whether the file system can be extended, a threshold value for extension, storage devices onto which the file system can be extended, an extension minimum size, an extension maximum size, and an alert interval defining how often event notification is to be provided.

In related aspects, the invention provides a SAN as described above in which the process displays the hierarchical tree and its associated nodes in a first panel on a display device, such as the operator/administrator console. In a second panel, the process displays interface graphical objects, e.g., list controls, dialog boxes or other editable fields, for modifying one or more attributes of a file system extension policy associated with at least a selected one of the processor groups.

Further aspects of the invention provide a SAN as described above in which the tree display includes at least one node identifying at least one overriden attribute, i.e., one attribute that will be overridden in the second processor group.

LUN Masking on Windows™ NT and Windows™ 2000 Hosts

Further aspects of the invention provide a storage area network (SAN) as described above that uses adapter layer filters to implement logical unit number (LUN) assignments—or, put another way, LUN masking (and unmasking)—in the host digital data processors.

According to one such aspect of the invention, the invention provides an improved SAN of the type having one or more digital data processors, e.g., hosts of the type described above, in communication with one or more storage devices, e.g., LUNs. The host (or other digital data processor) is of the type with an operating system that utilizes (i) a port driver to define a software interface between a class driver and an adapter to which one or more of the storage devices are coupled, and (ii) a class driver that claims storage devices for access, e.g., by the operating system and any applications programs executing therein, by invoking the port driver to which the host is coupled, e.g., via the interconnect fabric. The improvement comprises a software filter in communication with the port driver and the class driver. That filter intervenes to block claiming of one or more selected storage devices by the class driver.

In a related aspect, the invention provides a SAN as described above where the host executes the Windows NT™ operating system and the filter blocks claiming of a selected storage device by returning a failure code to the class driver in response to its invocation of the port driver for purposes of claiming that storage device.

In a further related aspect, the invention provides a SAN as described above where the host executes the Windows 2000™ operating system and the filter blocks claiming of a selected storage device by blocking claim requests by the class driver.

A SAN manager or other functionality is provided, according to further aspects of the invention, for transmitting to the filter identifiers, e.g., LUN IDs, of storage devices for which claiming is to be any of blocked or unblocked. In a preferred such aspect, the SAN manager or other functionality loads the filter with identifiers of storage devices for which claiming is not to be blocked, and the filter blocks claiming of storage devices—particularly, fiber channel storage devices—other than those so identified.

Further aspects of the invention provide a SAN as described above which provides for blocking access to, or masking, a storage device to which access had previously not been blocked. According to these aspects, the agent or other functionality (e.g., resident on the host) masks the storage device by invalidating a disk object previously created for that device. The device can later be unmasked, e.g., in response to an operator/administrator request, by validating that disk object.

Still further aspects of the invention provide a SAN as described above which provides for unmasking a storage device to which access had previously been masked. According to these aspects of the invention, the filter responds to the manager's identifying such a storage device to be unmasked by invoking the port driver for purposes of claiming the one or more storage devices identified by it as coupled to the selected digital data processor. In this regard, the filter duplicates the operation of the class driver, which, at system start-up, itself invokes the port driver to claim the storage devices (listed by the port driver as) coupled to the host.

Association of LUN ID with Physical Device Object Name

Further aspects of the invention provide an improved storage area network (SAN) of the type having a digital data processor, e.g., a host, in communication with one or more storage devices, e.g., a LUN and, further, of the type having a plug-and-play (PNP) manager that generates an event in response to a change in status of at least one of the storage devices.

The improvement is characterized, according to one aspect of the invention, by at least a selected process, that executes on the host (or other digital data processor), which references at least a selected one of the storage devices using a previously assigned logical identification, e.g., a LUN ID. The improvement is further characterized by the selected process responding to an event generated by the plug-and-play manager by querying for information the storage device (or an interface thereto) with respect to which the event was generated. From that information, the process generates a logical identification for the device.

In related aspects, the invention provides a SAN as described above in which the PNP manager generates, along with the event, a physical identification of the storage device with respect to which the event was generated. The improvement is characterized by the selected process referencing that physical identification in querying the storage device, or an interface thereto, for the aforementioned information. In a further related aspect of the invention, the PNP manager executes at least in part in kernel mode, while the selected process executes in user mode. The selected process registers for, and is notified of, the event in user mode.

Further aspects of the invention provide a SAN as described above where the event signaled by the PNP signifies any of coupling or decoupling of a storage device to/from the host.

Yet still further aspects of the invention provide a SAN as described above in which the PNP manager generates, along with the event, a reference to a data structure containing data regarding the storage device with respect to which the event was generated. The improvement provides for parsing of that data by the selected process to determine an address of the storage device. That address can be used, for example, in querying the storage device or its interface (e.g., the port driver or adapter).

Fiber Channel Device Determination in Kernel Mode

The invention provides, in further aspects, an improved storage area network (SAN) of the type described above that has a host or other digital data processor whose ports are coupled to peripheral devices that include fiber channel or other SAN-class storage devices. Processes executing on the host (or other digital data processor) generate requests for access to those peripheral devices. The improvement is characterized by a persistent store that identifies ports coupled to SAN-class storage devices. This store can be loaded, for example, by a process that executes on the host in user mode. The improvement is further characterized by filter, such as the aforementioned filter driver, that executes on the host in kernel mode to block access to selected ones of those SAN-class storage devices.

In related aspects, the invention provides a SAN as described above in which the store, which can be retained as part of the host's Windows™ registry, identifies ports that are coupled to a specific class of SAN storage devices, notably, fiber channel storage devices. The filter, commensurately, blocks access to selected ones of the fiber channel devices. Further aspects of the invention provide a SAN as described above in which the filter does not block or, more simply, passes, requests for access to peripheral devices not identified as comprising SAN-class storage devices.

Still further aspects of the invention provide a SAN as described above that includes an element, for example, the aforementioned SAN manager, that designates SAN-class storage devices as o assigned (or unassigned) to the host. The filter, according to this aspect, passes requests for access to peripheral devices that are identified as comprising SAN-class storage devices and that are designated as assigned to the host, while blocking access to those that are not assigned to the host.

Yet still further aspects of the invention provide a SAN as described above in which the host executes a user mode process, e.g., as a final phase of host boot-up, which identifies ports coupled with SAN-class—and, more specifically, fiber channel—storage devices. The user mode process stores that information to the registry for use by a kernel mode processes running during earlier phases of a subsequent host boot-up.

Related aspects of the invention provide a SAN as described above in which the host includes a kernel mode process that executes, e.g., during an initial phase of host boot-up, that validates identifications made by the user mode process during a prior boot-up.

Still further aspects of the invention provide a SAN as described above in which the filter passes requests for access to peripheral devices for which the kernel mode process indicates the identification is not valid, unless those requests comprise claims for access to peripheral devices that are hard disk devices that are not designated as assigned to the digital data processor.

Ensuring Validity of Data from the Scanners

Still further aspects of the invention provide a SAN, e.g., of the type described above having a plurality of components such as host digital data processors and storage devices. A store, e.g., resident on a manager digital data processor, contains one or more objects (or other data constructs) that represent information gathered from the hosts, i.e., scans. Further such objects represent components in the SAN and/or relationships between and among those components. Though these objects can be of the same type, they are referred to here for convenience as scan objects, component objects and relationship objects, respectively. A discover engine or other functionality executing on the manager digital data processor validates information gathered from a selected host concerning a selected component or relationship based on a scan object, if any, that is associated with a component object or relationship object, respectively, corresponding pertaining to the selected component or relationship.

In related aspects, the invention provides a SAN as described above in which a scanner executing on each of the hosts gathers information—e.g., a "scan"—regarding that host and the storage devices (or other SAN components) that host can "see," as well as relationships therebetween. The discover module responds, according to related aspects of the invention, to selected changes discerned from a scan by validating the information from which the change was discerned. This can be accomplished by traversing the component objects or relationship objects to find those for the same component or relationship, respectively, underlying the apparent change. Scans containing information regarding that component or relationship are identified via the scan objects associated with any matching component or relationship objects.

For example, upon discerning from a scan that a storage device has apparently been removed, the component objects can be traversed to determine which contain information regarding the apparently removed device. Scans providing information from which the change can be validated are identified via association of their respective scan objects with any matching component objects founds during traversal. Those other scans can be checked to see if they are in accord with the scan in which the change was discerned and/or the scanners that generated the scan(s) can be re-executed. Alternatively, according to one aspect of the invention, the apparent change is ignored upon finding any such other scans.

Further aspects of the invention provide a SAN as described above in which the store maintains objects representing component attributes, in addition to objects representing scans, components and relationships. All of these objects, according to other aspects of the invention, can reference corresponding data in tables of attributes, scans, components, and relationships, respectively. At least one of the objects, moreover, can include a unique identifier referencing the corresponding table and the data field therein.

Yet still further aspects of the invention provide SAN as described above wherein the discover engine validates only selected changes discerned from the scan. Thus, for example, according to one aspect of the invention, such an engine can validate changes representing removal or decoupling of storage devices and/or removal (or missing) relationships between components.

User Interface Architecture

The invention provides, in still further aspects, an improved architecture of a digital data processor of the type used in a storage area network (SAN). The digital data processor, which can be the aforementioned manager digital data processor, executes a process, herein referred to as a manager process, to maintain a representation of the SAN topology or at least an attribute thereof. A graphical output device displays the SAN representation. A further process, herein referred to as a user interface process, controls the output device for purposes of displaying that representation. An interface element, residing on the manager digital data processor or another data processor, effects retrieval of the SAN representation, for example, in response to a request from the user interface process. It transmits that representation to the user interface process for display on the graphical output device.

In a related aspect, the invention provides a SAN as described above in which the interface element includes a requester that receives a request from the user interface process for retrieval of the SAN representation from the manager process. For example, the user interface process can transmit such a request in response to a SAN administrator command that the displayed topology representation be refreshed. The requester, in turn, forwards the request to a request handler, for example, in a mark-up language format, such as XML, for further processing.

Further aspects of the invention provide a SAN as described above in which the interface element includes a manager daemon in communication with the request handler and the manager process, for example, via an object request broker. The request handler transmits the request to the manager daemon which, in response, effects retrieval of the SAN representation from the manager process. The request handler can transmit the request to the manager daemon in the same format as that received from the requester. Alternatively, the request handler can map the request onto a generic format prior to its transmission to the manager daemon. The manager daemon can, moreover, include a controller that receives the request from the request handler, and communicates with the manager process to retrieve the SAN representation.

In still further aspects, the invention provides a SAN as described above in which the user interface element includes a daemon process, herein referred to as user interface daemon, that receives the SAN representation retrieved by the manager daemon. The user interface daemon, in turn, effects display of the SAN representation on the graphical output device.

Yet still further aspects of the invention provide a SAN as described above in which the manager daemon segregates a representation retrieved from the manager process, e.g., a SAN topology representations, onto a plurality of sub-representation, and transmits the sub-representations to the user interface daemon.

Dynamically Extending File Systems

The invention provides, in other aspects, an improved SAN of type having one or more digital data processors, e.g., the aforementioned hosts, and one or more storage devices. At least a selected one of the hosts includes a file system that effects access by the host to assigned storage devices. In response to a request by (or on behalf of) the selected host for extension of the file system, a manager assigns one of more further storage devices to that digital data processor. An agent associated with the first digital data processor that responds to the assignment by extending the file system to include the assigned storage device.

Further aspects of the invention provide a SAN as described above in which the agent automatically extends the selected host file system by executing one or more steps including initializing the assigned storage device, creating a logical object to represent the assigned storage device, adding the logical object into a logical grouping of storage devices that contain the file system to be extended, extending a volume size of the host file system, and increasing a size of the host file system. In related aspects, the agent does not extend the file system if any of these steps fail.

Related aspects of the invention provide a SAN as described above in which the agent executes on an AIX journal system. Here, the agent extends the selected host file system by converting the assigned storage device into one or more physical volumes, adding the one or more physical volume into a volume group of the file system to be extended, and extends the logical volume of that file system onto the assigned storage device.

Further related aspects invention provide a SAN as described above in which the agent executes on a UNIX or Veritas file system (both running under a Solaris operating system). Here, the agent extends the selected host file system by writing a new label to the assigned storage device, configuring the storage device for use with a volume manager by converting the storage device into one or more VM disks, adding the one or more VM disks to a disk group where a logical volume of the file system to be extended resides, and increasing a size of that file system and the logical volume.

Dynamically Enabling SAN Manager

Further aspects of the invention provide a storage area network as described above having one or more digital data processors, e.g., hosts, in communication with one or more storage devices, e.g., LUNs. At least a selected one of the hosts has an operating system in which a storage device must be claimed (or mounted), e.g., via port driver and class driver components as discussed earlier or via analogous functionality in other operating systems, before the storage device can be accessed by applications programs executing on that host. The improvement is characterized by a selectively actuable filter, e.g., loaded with the selected host operating system, that—when actuated—intervenes to block claiming (or mounting) of one or more selected storage devices.

In further aspects, the invention provides a store that maintains a flag or other indicator, referred to elsewhere herein as an "enable" or "fully enabled" indicator. The aforementioned filter is responsive to that indicator for selectively intervening to block claiming (or mounting) of storage devices. According to more particular aspects of the invention, the filter, when actuated, intervenes to block claiming (or mounting) of one or more selected storage devices by the selected host operating system class driver.

A graphical user interface element is provided, according to other aspects of the invention, for setting the value of the enable indicator. The interface is responsive, for example, to operator/administrator input (e.g., selection of buttons on a console) for determining that setting, e.g., enabled or disabled.

Still further aspects of the invention provide a SAN as described above comprising a manager digital data processor that is coupled to at least the selected host digital data processor. The manager responds to operator/administrator input for transmitting software comprising a filter to the selected host.

According to related aspects of the invention, the manager digital data processor provides for assignment of storage devices to the selected and other host digital data processors. Each of the storage devices, according to this aspect of the invention, is associated with one or more logical unit numbers (LUNs). The manager transmits LUNs to the filter to effect assignment of the associated storage device(s) to the selected host digital data processor. The filter, in turn, according to this aspect of the invention, blocks claiming (or mounting) of SAN-class (e.g., fiber channel) storage devices other than those associated with the LUNs transmitted to the filter.

Further aspects of the invention provide a SAN as described above in which the manager digital data processor includes a graphical user interface that sets a value of a further indicator, referred to elsewhere herein as an "assignment enable" indicator, in the store to permit the operator/administrator to make assignments.

Launching Device Specific Applications

The invention provides, in still further aspects, a storage area network (SAN) of the type described above having a plurality of components including one or more digital data processors in communication with one or more storage devices via a switching fabric. An interface process, e.g., resident on a manager digital data processor, permits the operator/administrator to effect execution of at least a process residing on the manager and at least one process residing on another SAN component. The latter process can be, for example, an applications program for management of the respective component.

In another aspect, the invention provides a SAN as described above in which the interface process effects a topological or other display of one or more graphical objects, each representing one of the SAN components, on the graphical output device. The interface process responds to operator/administrator selection of one of these graphical objects by depicting application processes, if any, residing on that SAN component. Execution of those processes can be effected by selection of those depicted processes.

The invention provides, in still further aspects, a SAN as described above in which the interface process responds to the selection of a graphical object representing a SAN component by accessing a store (e.g., maintained by the manager) identifying application processes, if any, associated with each component. When the operator/administrator selects a component application for execution, the interface process retrieves requisite parameters, e.g., command parameters, from the database, and utilizes the retrieved parameters to effect launching of the application on the corresponding component.

Interfacing with Multiple Host Platforms

The invention provides, in further aspects, a storage area network (SAN) of the type described above having a plurality of components including digital data processors, e.g., hosts, coupled to a plurality of storage device. A common, platform-independent process executes on the hosts, which can be of varied platform types, e.g., Unix™, Windows™, Solaris, and so forth. That process utilizes the command line interface of the host operating system to invoke at least one platform-dependent process on the respective host.

According to related aspects of the invention, the platform-independent and platform-dependent processes comprise portions of the aforementioned agents. Here, the platform-independent processes represent those portions of the agents common to all platforms. The platform-dependent processes representing modules, such as drivers and scanners, specific to each platform.

In another aspect, the invention provides a SAN as described above in which the platform-independent processes transfer commands, data and other information to the respective platform-dependent processes via command line parameters of the respective hosts operating system. In related aspects, the platform-dependent processes return data and other information back to the respective platform-independent processes via the Standard Output and/or Standard Error of the respective host command line interface.

The invention provides, in still further aspects, a SAN as described above in which the platform-independent processes invoke the respective platform-dependent processes to obtain information, e.g., "scans," regarding the status of SAN components. The platform-independent processes capture that information (e.g., returned, via Standard Output/Error of the respective host command line interface) for transfer, e.g., to a manager digital data processor.

In still another aspect, the invention provides a SAN as described above in which the manager digital data processor transmits queries to the platform-independent processes, e.g., to effect their execute of scans. The platform-independent process responds to these queries by invoking their respective platform-dependent processes via the command line interface of the respective host, as described above, and returning the gathered information to the manager for further processing. The manager and the platform-independent process transmit information to one another formatted in a format such as XML and, further, utilize Object Request Broker protocol for communication, e.g., via a local area network.

The invention provides, in still further aspects, a SAN as described above in which the manager includes a query engine for forwarding queries to the platform-independent process, and further includes a registry that contains information regarding the common platform-independent process and the digital processor hosts associated therewith. The information in the register provides identifiers, for example, IP address, for communicating with the platform-independent processes via their respective hosts.

Yet, still further aspects of the invention provide methods of operating a storage area network and components thereof paralleling the foregoing.

These and other aspects of the invention are evident in the drawings and in the description that follows.

BRIEF DESCRIPTION OF THE DRAWINGS

A more complete understanding of the invention may be attained by reference to the drawings, in which:

FIG. 12 illustrate three objects in a SAN management environment of the invention including persistable data and related t o one another via an inheritance tree;

FIG. 13 schematically depicts a method of the invention for mapping the persistable data contained in the objects of FIG. 12 onto a relational database;

DETAILED DESCRIPTION OF THE ILLUSTRATED EMBODIMENT

The illustrated embodiment provides inter alia for management of a storage area network (SAN) generally having a plurality of hosts that are coupled with one or more storage devices via an interconnect fabric for purposes of storing and retrieving information. The embodiment utilizes a manager and one or more agents, each of the latter being associated with at least one of the hosts and serving as "proxies" for the manager, gathering status, attributes and other such information regarding the hosts, the storage devices, and the interconnect fabric. The manager collates that information to discern the makeup, topology and status of the SAN and its components, to apprise an administrator or other operator of the same (and of changes thereto), and to implement an administrator-defined or other policy, e.g., by way of non-limiting example, for assignment and unassignment of storage devices (e.g., logical units) to the hosts.

Figure 1:
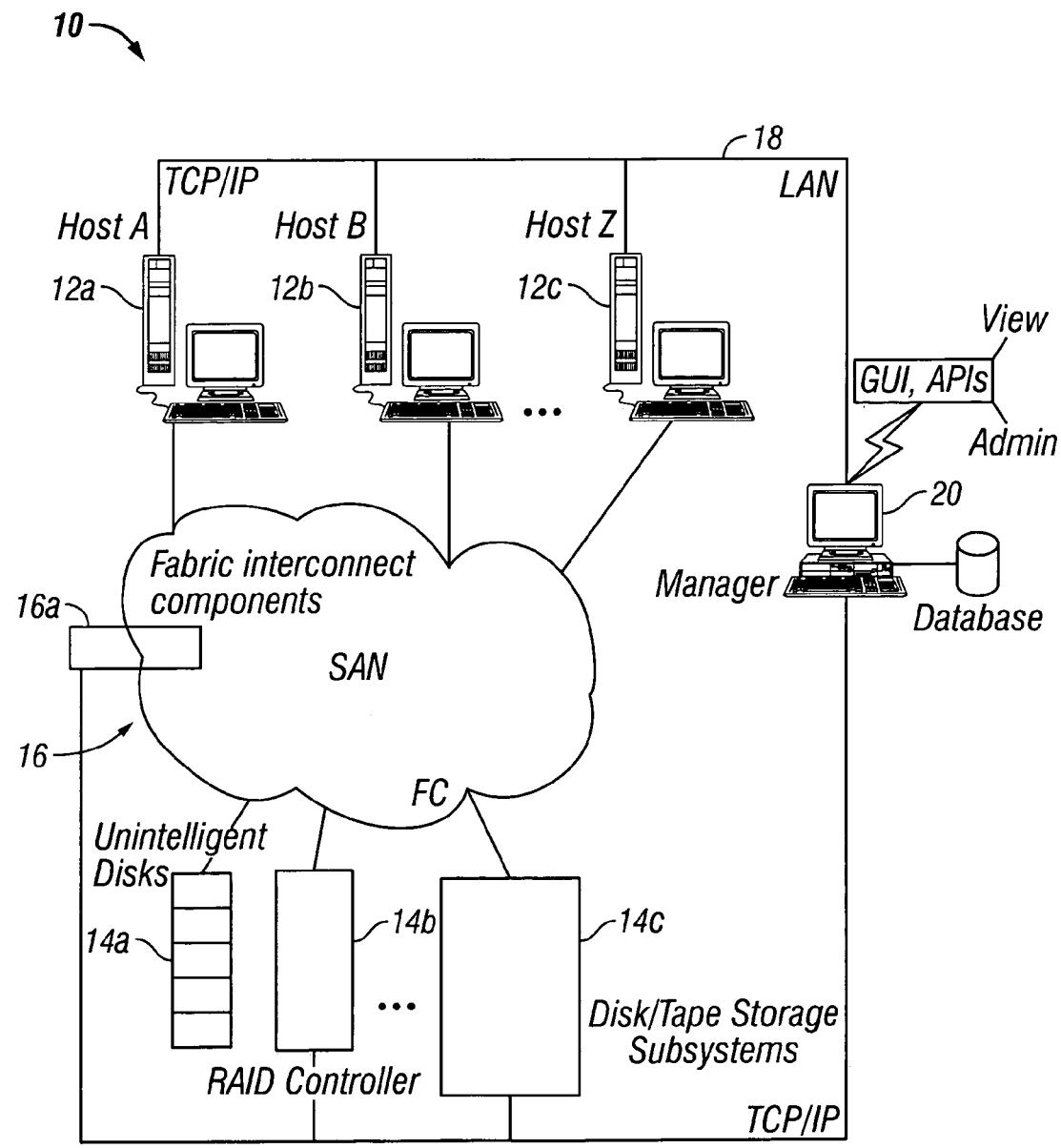
FIG. 1 depicts an exemplary storage area network (SAN) management environment according to the invention.

FIG. 1 illustrates an exemplary storage network management environment 10 according to the present invention in which a plurality of hosts 12a, 12b, and 12c, herein collectively referred to as hosts 12 or alternatively as managed hosts 12 communicate with a plurality of storage devices 14a, 14b, and 14c, herein collectively referred to as storage devices 14, via an interconnect fabric 16 having a plurality of interconnect elements, such as, a switch 16a. Though hosts 12 are typically web or file servers (for client computers which are not shown in the drawing), graphical workstations and so forth, they may comprise any digital data device that accesses and/or stores (collectively, "accesses") information on the storage devices 14. The hosts, moreover, may run a variety of operating systems, by way of non-limiting example, Windows 2000, Windows NT, Solaris, and Linux. The hosts are constructed and operated in the conventional manner known in the art, as modified in accord with the teachings herein (by way of non-limiting example, through incorporation of agent functionality as described in still further detail below).

Storage devices 14 comprise apparatus for storing and/or retrieving data. These typically comprise disk drives and arrays of the type conventionally used in storage area networks, though any variety of storage devices may be used for this purpose. Illustrated devices 14 are constructed and operated in the conventional manner as modified in accord with the teachings herein.

Per convention, physical storage devices, e.g., a single disk drive or an array of disk drives, are logically divided or grouped in to logical units. This is typically accomplished via a controller (not shown) associated with each physical device. The controller is configured for this purpose by an administrator, by factory default, or otherwise, in a manner conventional in the art and not further discussed herein. Once configured, the controller responds to queries (e.g., directed to Page 83h; and/or Standard Page commands of the SCSI protocol) to identify the logical units—typically by way of, for example, an identifier referred to as a logical unit number or LUN—and (to the extent relevant) the physical device(s) on which they are contained.

The controller attends to data accesses directed to those logical units by retrieving and/or storing data at locations allocated to those units within the physical devices—typically, without applications program, file system or operating system concern for the specifics (or even the existence) of such allocations. In this light, unless otherwise evident from context, the term "storage device" in relation to the illustrated embodiment refers to logical units, though in alternate embodiments it can refer to physical devices.

In the illustrated embodiment, hosts 12 are coupled for communication with one another, as well as with a SAN manager 20, via a local area network (LAN) 18 that utilizes the TCP/IP protocol. Other networks configurations, types and/or protocols may be used for this purpose, including, by way of non-limiting example, wide area networks, metropolitan area networks, regardless of media (wired, wireless, satellite or otherwise) and protocol.

Hosts 12 are coupled to storage devices 14 via interconnect 16 for purposes of transferring data and commands therebetween. In the illustrated embodiment interconnect 16 comprises a fiber channel fabric, including fiber channel media, switches, and other componentry necessary, typical and/or otherwise used to provide fiber channel connectivity between the illustrated devices 12, 14. In alternative embodiments, interconnect 16 utilizes other fabrics, networks or other communications media for transfers between hosts 12 and devices 14, with high-speed fabrics. Indeed, such transfers can be conducted over LAN 18, which also couples these devices.

SAN Manager and Agents

The illustrative SAN environment 10 includes a SAN manager 20 that can include one or more software modules that collectively manage SAN 10 by collating that information to discern the makeup, topology and status of the SAN and its components, to apprise an administrator or other operator of the same (and of changes thereto), and to implement an administrator-defined or other policy, e.g., by way of non-limiting example, for assignment and unassignment of storage devices to the hosts. These software modules can reside on a common digital data processor platform, or can alternatively be distributed over a number of different platforms. Those platforms may comprise any digital data processor suitable for connectivity, e.g., with the hosts 12 (via the agents), as illustrated and otherwise for programming, configuration and/or operation in the role of a manager, as described below.

The illustrated manager 20 is connected to the hosts 12 and to the storage devices 14 via the LAN 18. A connection (not illustrated) to the storage devices can also be provided through the interconnect 16. As described in more detail below, the manager 20 communicates with a plurality of agents, each of which resides on one of the hosts 12, to discover and gather information about the hosts, the interconnect fabric, and/or the storage devices. This can include inband discovery, i.e., utilization of the hosts (via the agents) to gather information regarding inter alia the storage devices and interconnect fabric via queries through the respective host bus adapters (HBAs), or other respective interconnect 16 interfaces. It can also include outband discovery, e.g., utilization of the agents to gather host status/configuration information from the hosts themselves and/or to gather storage device status/configuration information from the storage devices themselves (e.g., using an SNMP protocol).

Figure 2:
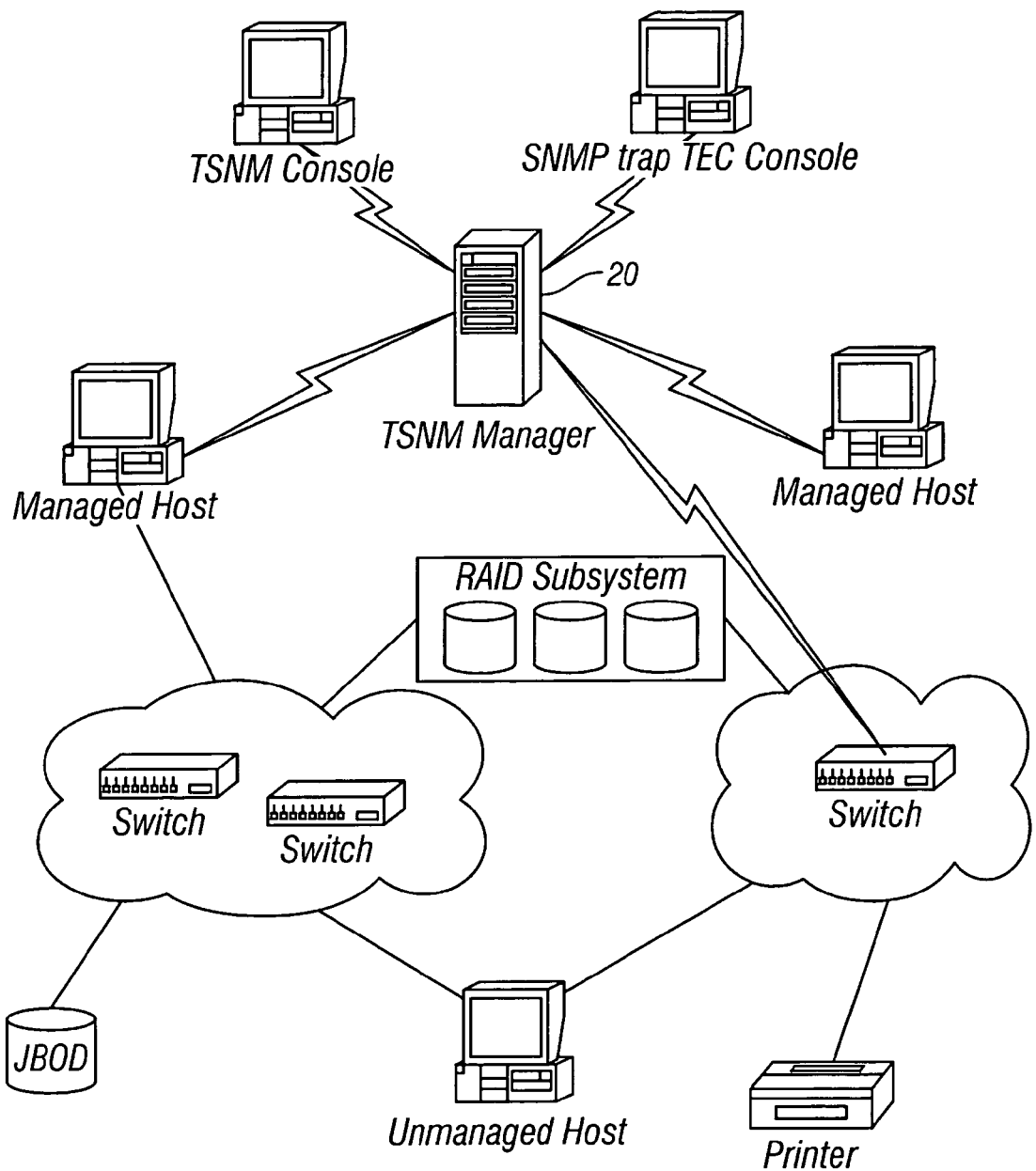
FIG. 2 is another schematic view of a SAN management environment according to the invention having a manager and two consoles that allow an operator to interact with the manager.

As shown in FIG. 2, a SAN management environment according to the invention can include one or more consoles, such as consoles 22a and 22b, to present/accept information to/from an operator, such as a SAN administrator. Of course, other human machine interface (HMI) devices of the variety known in the art may be used in addition or instead (e.g., personal digital assistants, teletype terminals, touch pads, and so forth). To this end, SAN manager 20 can utilize a graphical user interface (GUI) to drive information to the operator/administrator console and/or collect information therefrom. For example, the manager GUI can present a SAN topology on a console 22 and accept therefrom operator commands regarding host-to-storage device assignments or unassignment. Though reference is made throughout the specification to graphical user interfaces and GUIs, those skilled in the art will appreciate that this embraces non-graphical (e.g., textual or voice-synthesized) interfaces, where otherwise appropriate in view of context.

As discussed above, the manager 20 communicates with a plurality of agents, each of which is associated with one of the hosts 12, to gather information regarding attributes of the SAN. The manager 20 collates and utilizes this information to manage the SAN (e.g., inter alia, to discern the makeup, topology, and status of the SAN and its components, to apprise an administrator or other operator of the same and of changes thereto, and to implement an administrator-defined or other policy)

Figure 3:
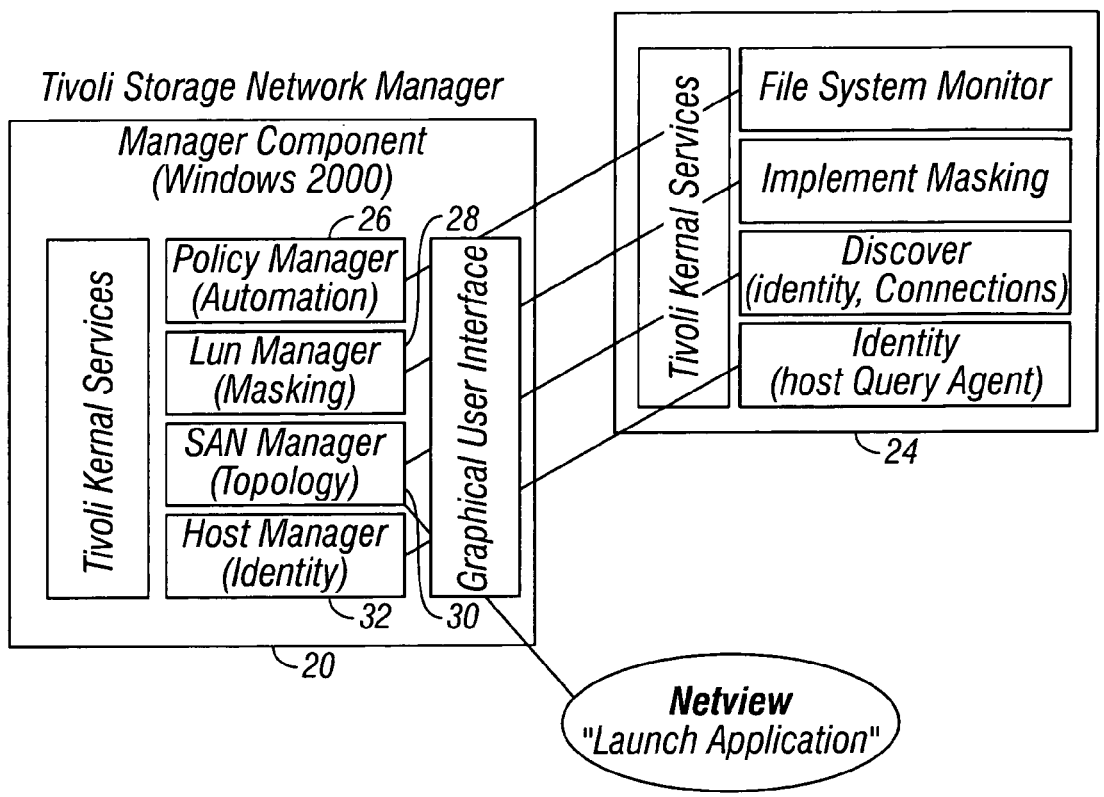
FIG. 3 schematically depicts functional components of an exemplary manager in a SAN management environment of the invention and those of an agent residing on a host connected to the SAN.

FIG. 3 schematically depicts functional components of the manager 20 and an agent 24 in the illustrated embodiment of the invention. In particular, the manager 20 includes a policy manager module 26, a logical unit number (LUN) manager module 28, a SAN topology manager module 30, and a host manager module 32. In addition, the manager 20 includes a module 34 for providing kernel services, and a graphical user interface 36. The functionality of the modules can, of course, be divided differently.

Figure 5:
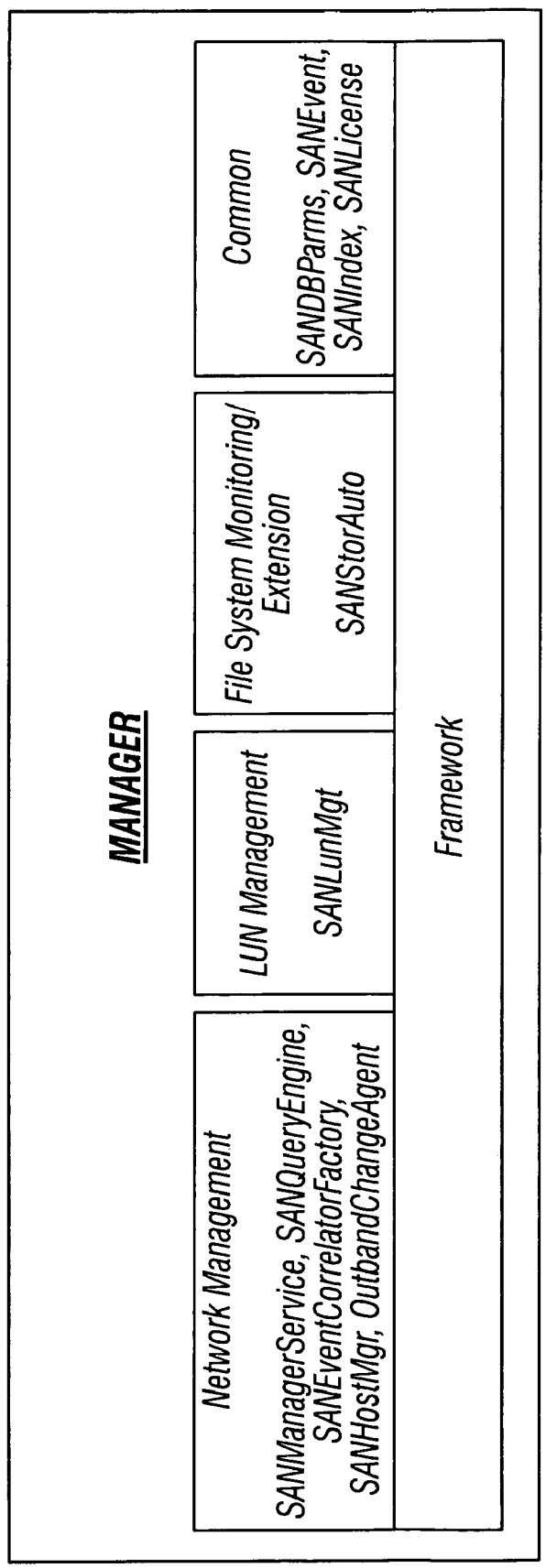
FIG. 5 lists various services provided by an exemplary embodiment of a manager in a SAN in accord with the teachings of the invention.

Turning now to FIG. 5, the services provided by the manager 20 can generally be grouped into Network management, LUN management, File System monitoring and extension and general services. An exemplary list of some of these services follows:

SANDBParms. Utility Service used for accessing database tables. Used by File Monitoring/Extension and LUN Management functions.

SANEvent. Utility Service that extends the TKS event service by providing logging and SNMP/TEC event forwarding.

SANEventCorrelatorFactory. Converts SNMP traps, reported by the Outband Change Agent, and HBA detected events, reported by the Inband Change Agents, into TSNM events. Also publishes the events.

SANHostMgr. Maintains the list of Managed Hosts by receiving information from the SANAgentHostQuery services.

SANIndex. Utility Service used to maintain indices for accessing information in database tables. This service is utilized in conjunction with SANDBParms, and is used by File Monitoring/Extension and LUN Management functions.

SANLicense. Maintains the current license state (try and buy, fully licensed, not licensed)

SANLunMgr. Service that maintains the LUN assignments.

SANManagerService. Service that maintains the SAN topology and attribute information.

SANQueryEngine. Generic service that maintains a list of queries to be performed against a set of inband and outband agents and performs the queries through the SANAgentScanners and Outband Scanners.

SANStorAuto. Service that maintains the file monitoring and extension policy. Receives events from the SANAgentFSMonitor agent and performs the extension actions through the SANAgentFSExtend.

The agents 24 provide serve as proxies for the manager, providing services such as host file system monitoring, implementation of LUN assignment (e.g., via masking of non-assigned LUNs), and, as noted previously, discovery of host, storage device and/or interconnect fabric components connected to the host on which the agent resides.

Each of the illustrated agents includes an agent framework and several subagents, though alternate divisions of functionality may be utilized in other embodiments. A subagent represents a major service or function. Such a service or function can relate, for example, to host LUN masking via a host Device Driver, as discussed in more detail below. Alternatively, a subagent can scan a host attributes. In one embodiment of the invention, an object oriented programming language, such as, Java, is utilized for implementing the agent framework and subagents.

In the illustrated embodiment, the agents provide the services listed below. Greater or fewer services may be provided in agents of alternative embodiments:

SANAgentDiskPool. Service that receives LUN assignments from the SANLunMgr service and sends the requests to the SAN Disk Manager Agent Interface.

SANAgentFSExtend. Service that receives extension requests from the SanStorAuto service and extends the specified file system to the specified physical volumes.

SANAgentFSMonitor. Service that monitors the File System utilization and posts events if the monitoring policy is exceeded.

SANAgentHost Query. Service that sends host information to the Host Manager Service. Maintains a heartbeat healthcheck with the Host Manager Service.

SANAgentInbandChangeAgent. Service that receives events from the Event Scanner and sends the information to the Event Correlator Service. Maintains a heartbeat healthcheck with the Event Correlator Service.

SANAgentScanner. Service that receives scan requests from the Query Engine, sets up the environment for the scanner executables, executes the scanners and returns the results.

SANAgentScheduler. Service used by the other agent services, which maintains a schedule of activity requests and initiates actions.

SdaDiskPool. Executable that performs LUN assignments at a platform dependent level. Some platforms require at least one filter device driver to mask unavailable LUNs at boot. Dependent upon the specifics of the platform, the filter fails attempts by the host file system to mount unassigned LUNs and, thereby, prevents I/O with them.

Msdiscover. Executable that performs Management Server queries to the switches in order to obtain the topology information.

Sandiscover. Executable that performs operating system queries to the managed host and SCSI queries to the endpoint devices in order to obtain attribute information.

Event & EventDaemon, Event Protocol Driver (AIX). Executable and daemon that perform HBA queries in order to obtain event information.

Figure 4:
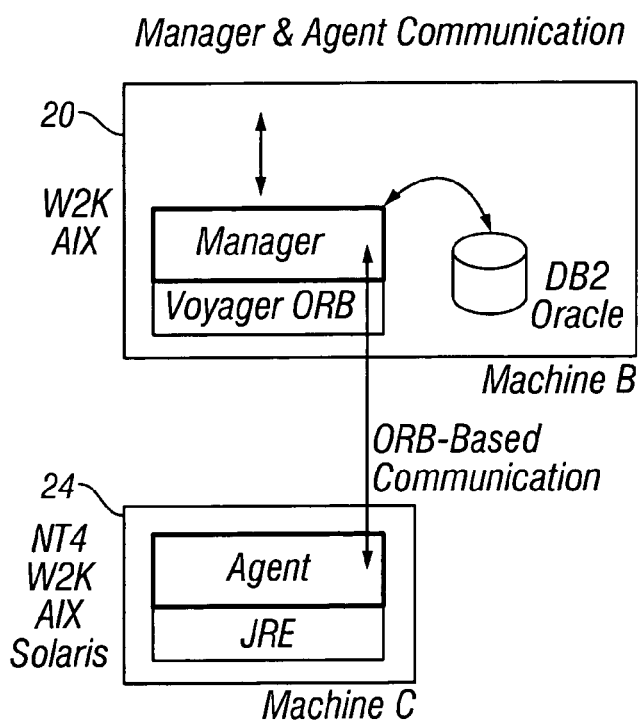
FIG. 4 schematically depicts that a manager and an agent residing on a host in a SAN according to the invention can run on different platforms and are in communication with one another.

Referring back to FIG. 4, the manager 20 and each agent, such as the agent 24, can run on platforms having different operating systems, such as, Windows NT, Solaris, etc. Further, the manager can communicate with an agent by utilizing object request broker-based (ORB-based) function calls with XML over a TCP/IP connection (though, an alternative protocol, such as HTTP can be used instead of the ORB calls). Moreover, a format other than XML can be used to transmit data and requests between the manager and agents. An abbreviated example of XML contained in an agent's response to a request from the SAN manager is provided below:

ager Service module 38 that (a) effects decisions (e.g., host-to-storage device assignment) on behalf of the SAN in view of policy established by the operator/administrator; (b) correlates the aforementioned inband and outband data into a single composite view (e.g., component makeup and topology) of the SAN, and (c) serves as a primary interface to the administrator and to other applications.

LUN/SAN Topology Discovery

SAN Manager Service 38 assigns tasks to the illustrated engines, such as, discover engine or engines 40, and reassigns the assigned tasks, if needed, based on changes, e.g., in the interconnect fabric components, services load and operator/administrator requests. Further, the SAN Manager Service 38 performs the aforementioned correlation function. For example, as discussed in more detail below, each discover engine 40 can provide a portion of information regarding the topology of the SAN based on its scope. Some of this information may overlap information provided by other discover engines or may complement it. For example, a host may contain Fiber channel (FC) host bus adapters (HBA) and SSA HBA. Consequently, both the FC discover engine and the SSA discover engine can detect and report information regarding this host. The Manager Service 38 collates such fragmentary pieces of information received from the various discover engines to obtain a composite image of the topology of the SAN.

In addition to creating a composite image of the SAN, the SAN Manager Service 38 provides a high level interface with other applications for accessing this composite image. Thus, the SAN Manager 'owns' the objects in the composite image and provides references that other applications can utilize to access these objects, such as a reference to the fabric level objects which contain the component objects.

Figure 6A:
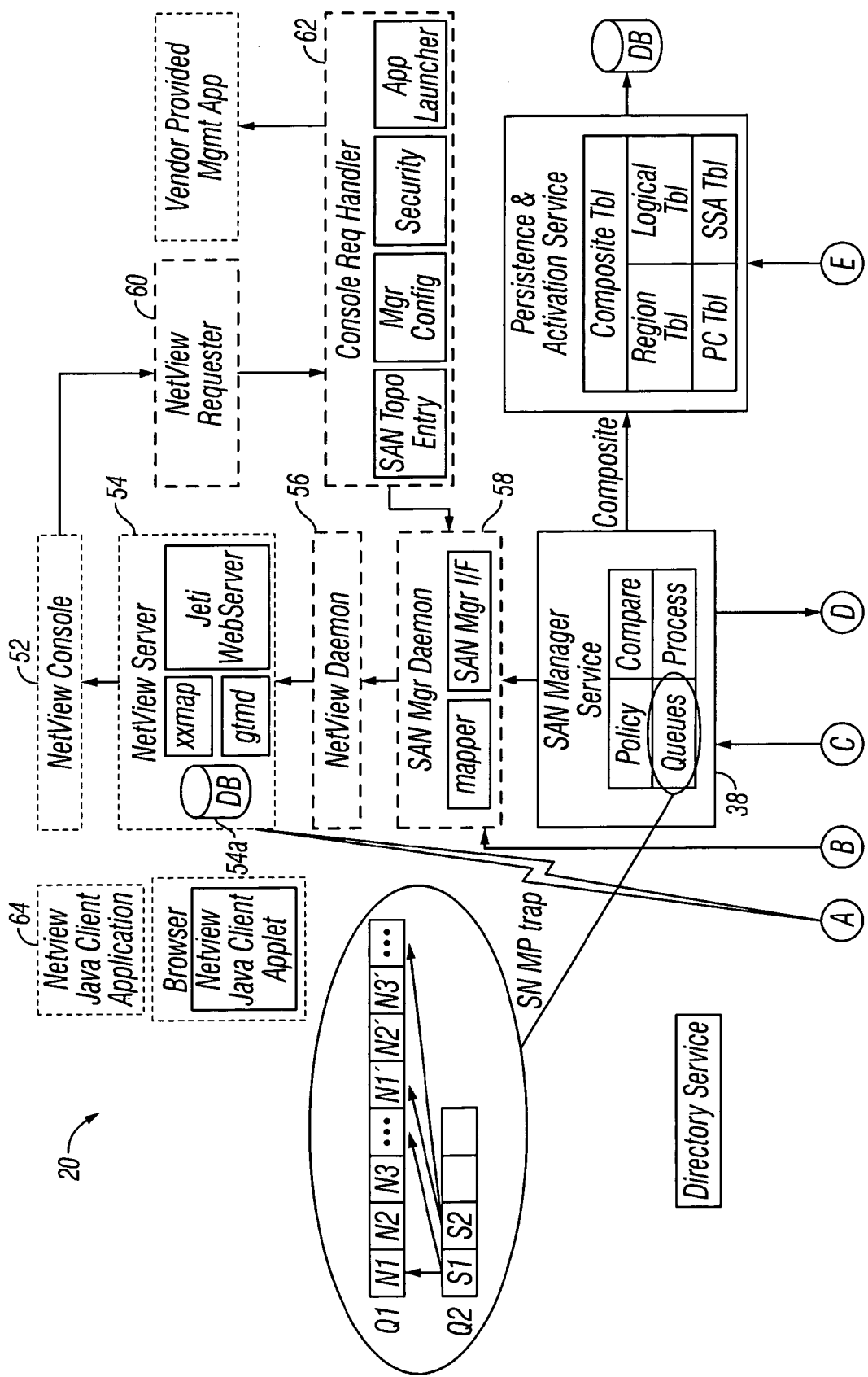
FIG. 6 is a diagram illustrating a number of modules of a SAN manager of the invention and their architectural interconnectivity.
Figure 6B:
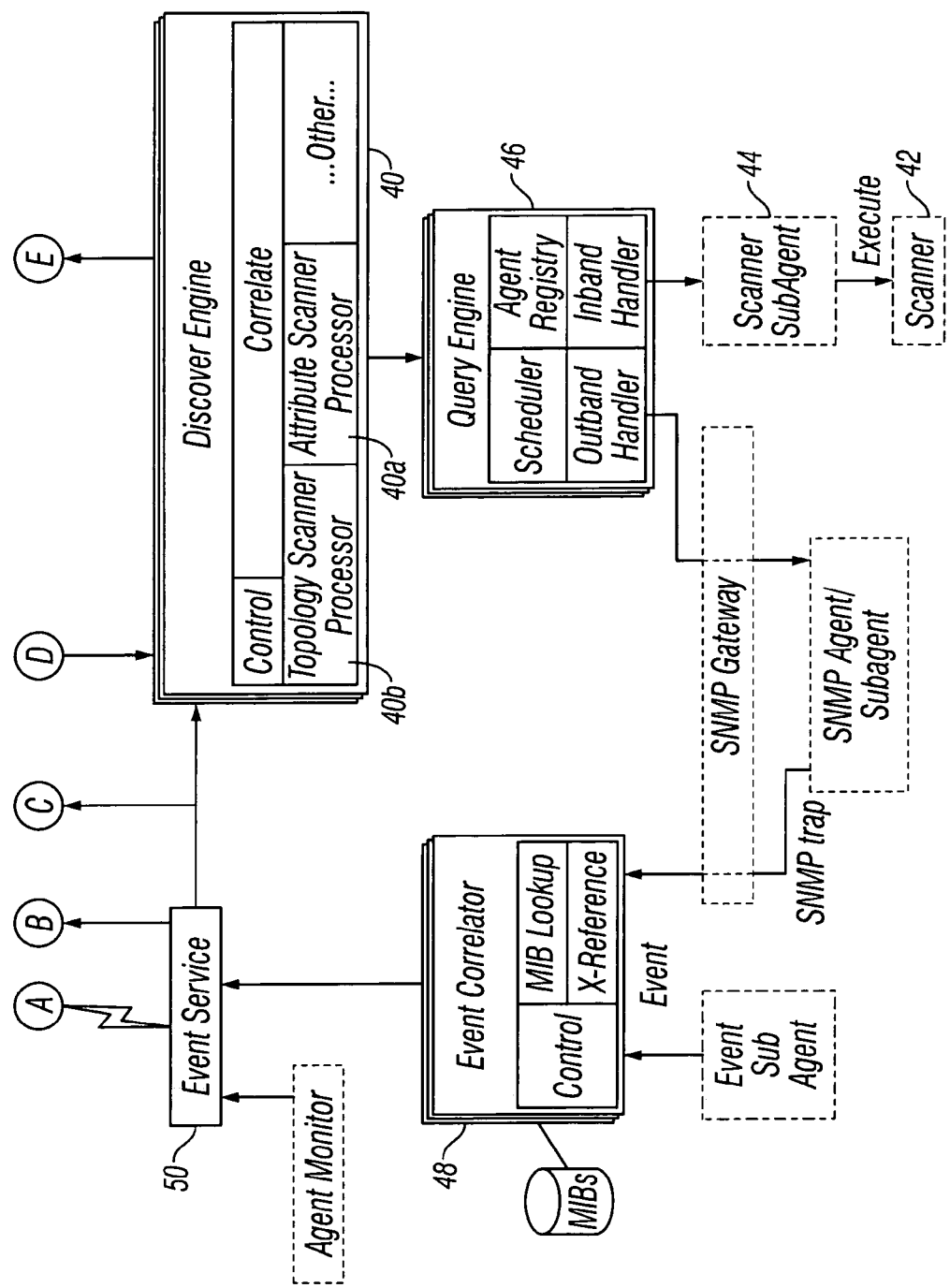

With continuing reference to FIG. 6, the SAN manager 20 includes one or more fiber channel (FC) discover engines, such as the discover engine 40 responsible for gathering topology and attribute information for the SAN components. The FC discover engine is subdivided into the following functional areas: (1) Control: which coordinates the activity of the other areas; (2) Correlations: which pulls together the information from various subprocesses and creates a composite image within the scope of a single discover engine, and (c) Attributes: which processes the information from various attribute scanners, as described in more detail below (in addition to processing attribute information from upper level protocol commands utilized by the scanners, the attribute processor also identifies some topology information based on inferences from the devices available to the

```
<?xml version="1.0"?>
<DOCTYPE LegacyXml SYSTEM "legacy.dtd">
<LegacyXml>
    <SystemXml>
        <UniqueIdXml>SystemXml:SystemXml:saigon.sanjose.ibm.com</UniqueIdXml>
        <ParameterXml>
            <NameXml>Hostname</NameXml>
            <ValueXml>saigon.sanjose.ibm.com</ValueXml>
        </ParameterXml>
        <ParameterXml>
            <NameXml>IP Address</NameXml>
            <ValueXml>9.113.212.78</ValueXml>
        </ParameterXml>
```

FIG. 6 schematically illustrates the architecture of an exemplary manager 20. The manager includes a SAN Manhost systems); (4) Topology: which processes the information from the Topology scanners (inband and outband).

The discover engine 40 receives and processes information gathered by one or more scanners, such as scanner 42, which are executables that interact with the hosts by performing system calls and IOCTL calls to gather information. Since each scanner needs to directly interact with the operating system of the host on which it resides, each scanner is custom to the operating system of its host, and hence may not be portable. To restrict this non-portability, each scanner runs within an environment set up by a Scanner Subagent, such as exemplary subagent 44, and returns information to the subagent, which in turn forwards the information to other services.

The function of gathering information can be split among several scanners, for example, an attribute scanner and a topology scanner. An attribute scanner can execute queries received from an attribute discover processor 40a of the discover engine 40. This can include issuing Name Server Queries, walking loops and issuing upper level protocol queries. This can result in gathering host and device attributes as well as rudimentary topology information, e.g., connectivity group level information. The attribute scanner also gathers file system level information used by Storage Automation agents. The topology scanner executes queries received from a Topology Scanner Processor 40b. This includes issuing Management Server/Name Server queries and RNID queries.

The discover engine 40 has preferably a separate process for each type of scanner. For example, the attribute scanner information is processed by the attribute processor 40a that understands the format of information received from the attribute scanner. Each discover engine is responsible for presenting an image to the SAN Manager of the objects within its scope. Thus, the discover engine 40 receives events and performs rediscovery and/or gathers attributes to update a SAN image. Since the discover engines are distributed, or at least have the capability to be distributed, they need not automatically extend their scopes. If a discover engine detects additional information beyond its scope, it will report it to the SAN Manager process which determines whether the discover engine should expand its scope or the new data should be covered by another discover engine.

The SAN Manager 20 can also include a query engine 46 that is a helper service which manages inband and outband scan requests. A client, such as the discover engine 40, registers scan requests with the Query Engine 46 which specifies target, scanner name and period of execution information. The query engine 46 coordinates running of the scanners and returning information to the client. A portion of the query engine 46 includes outband scanners which perform Simple Topology and Topology scans.

A Simple Topology scanner gathers interconnect element information by utilizing FE MIB queries. This provides rudimentary switch information that can be combined with inband attribute scanner information to identify which switches constitute the individual SANs. An outband Topology scanner provides the same information as the inband Topology scanner, with the exception of zone information, using the FC MGMT MIB and FE MIB. This scanner provides connection level information.

With continuing reference to FIG. 6, an Event Correlator 48 is responsible for ensuring that Event SubAgents are running, creating rich SAN management events from the raw event information provided by the Event SubAgents or in SNMP traps and delivery of the SAN management event to interested services via an event service 50. The information received from the Event Subagent or provided in the SNMP trap may be self-contained. However, in most cases, it will require processing to provide a richer SAN management event that can be used by various services. As an example, an SNMP trap from an IP address will need to be mapped to an object in the SAN Manager's composite image and parsed based on the MIB associated with that object type (e.g., once it has been determined that a trap came from a Brocade switch, the Brocade switch MIB is utilized to determine the meaning of the trap).

SAN Manager Console

The exemplary manager 20 can also include a console, herein referred to as SAN manager console 52, herein referred to as Netview console 52. A Netview server 54, a Netview Daemon 56, a SAN manager Daemon 58, a Netview Requester 60, and a Console Request handler 62 allow the Netview console 52 to interact with the SAN manager service 38.

The NetView server 54 and console 52 provide a topology console for SAN Manager. The primary interface for SAN Manager into the NetView Server uses interfaces provided by a gtmd daemon. The server maintains a persistent store of the information that can be displayed by the NetView console X and/or NetView Java Client 64.

Another interface between the SAN Management applications and the NetView server/console is the SNMP Trap interface. The Event Service can be configured to send SNMP Traps to the NetView Server 54 which will be displayed on the NetView console 52.

The SAN Manager/NetView daemons 56/58 provide a bridge between SAN Manager services and NetView. The SAN Manager daemon 58 can communicate with the SAN Manager service 38 by utilizing, for example, a Voyager ORB interface. The NetView daemon 56 can communicate with NetView server 54 by utilizing, the gtmd interfaces, NVOT, OVW and OVWDB. These are C interfaces requiring that the daemon also bridge from Java to C. The mapper portion of the daemon is responsible for mapping the entity objects in the SAN Manager composite image into the NetView server. Although in some embodiments of the invention, the daemon does not have a persistent store of the information sent to the Netview, it can have such a store of information to optimize communication.

Communication from NetView to SAN Manager is initiated through the NetView Requester 60, which is an executable launched by the NetView console 52. This executable receives callback requests from NetView and forwards these requests to the Console Request Handler 62.

Communication from NetView to SAN Manager can be performed by the Console Request Handler Application. Although shown as a single block, the launched application performs several distinct functions and may be implemented as separate applications. In some embodiments, all menu operations, such as launching a management application, are performed via the Console Request Handler 62. Additionally, any custom screens or dialogs, such as an administration console, can be part of the Request Handler. The Console Request Handler 62 communicates with the SAN Manager and other services via the NetView daemon. Although the Netview daemon and the Console Request Handler are shown as separate blocks, they are preferably packaged as a single service.

Policy Engine and Action Automation

Figure 7A:
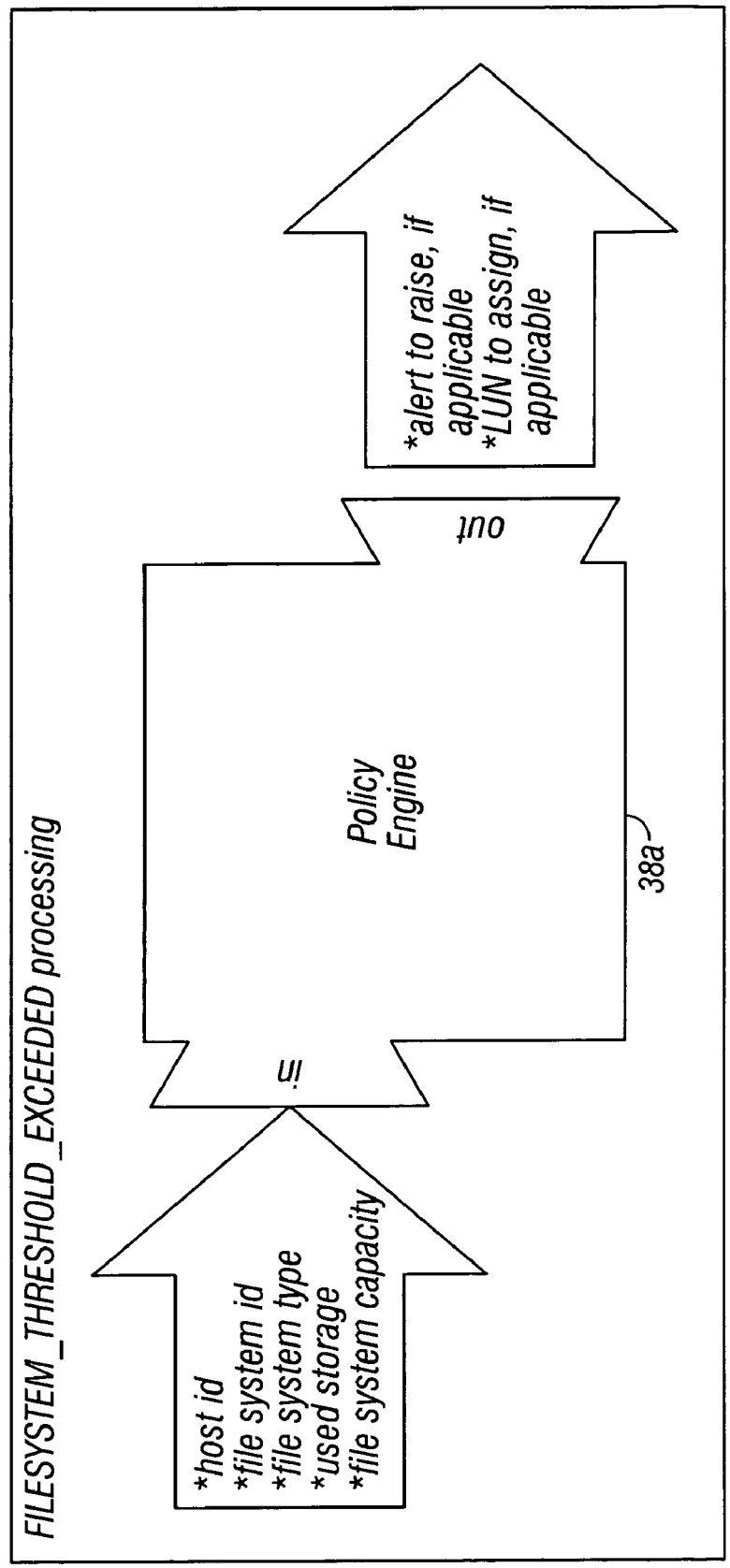
FIG. 7A schematically depicts the functionality provided by a policy engine of a SAN manager of the invention for extending the file system of host connected to the SAN.
Figure 7B:
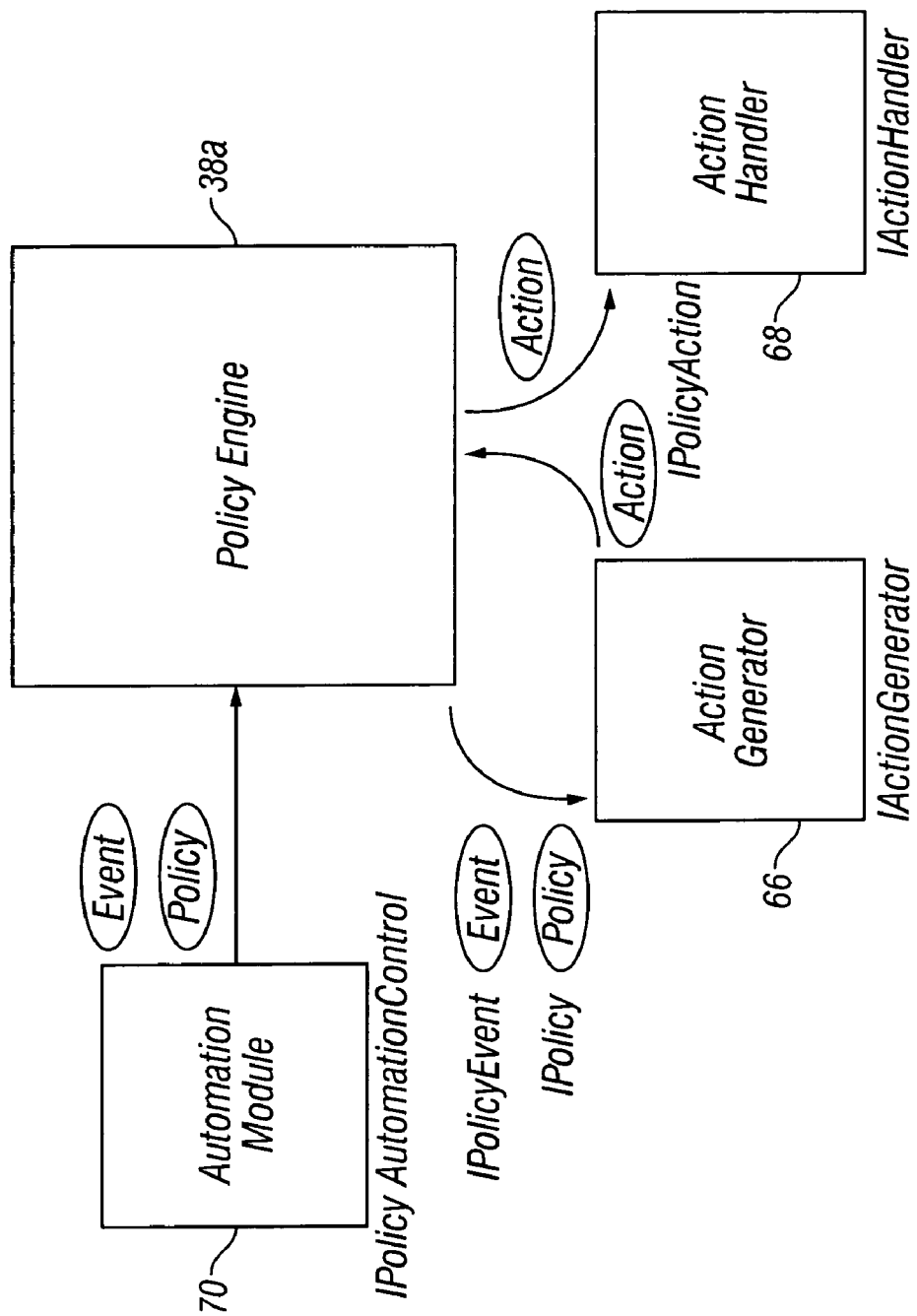
FIG. 7B schematically illustrates processing of events by the policy engine of FIG. 7A.

Illustrated SAN manager 20 detects whether a host 12 has exceeded a utilization threshold of its file system (e.g., as defined by the host operating system, the SAN administrator, or otherwise), and dynamically assigns new LUNs to that host. This function of the SAN manager is herein referred to as storage automation service. As shown in FIGS. 7A and 7B, the SAN manager can include a policy engine 38a that is responsible for carrying out policies relating to assignment of LUNs to hosts based on criteria set by the SAN administrator. In particular, the policy engine is responsible for deciding whether or not to assign LUNs to a host, which LUNs should be assigned and whether or not to issue an alert.

With reference to FIG. 713, more generally, the policy engine 38a processes events. In particular, the policy engine maps (event, policy) pairs to an action generator 66 and maps actions received from the action generator 66 to an action handler 68. An automation module 70 provides the association between an event and a policy that applies to that event. The event and policy objects are passed to the policy engine which consults its map to find any action generators that have been registered to handle the given (event, policy) pair.

The automation module 70 includes a set of classes (usually from a single Java package) that provide functionality in the policy engine framework. The following classes are utilized:

IpolicyAutomationControl. Classes that implement this interface initialize the automation modules by creating subscribers and registering action generators and action handlers with the policy engine. This interface can be implemented to create an automation module.

IactionGenerator. Classes that implement this interface also implement a generatActions method by convention. This method can take two parameters. The first is an event class that implements IpolicyEvent and the second is a policy class that implements IPolicy. The generateActions method will evaluate the policy as it applies to the event and will generate action objections as appropriate. The generate action objects will be passed back to the policy engine which will dispatch them to the appropriate action handler.

IactionHandler. Classes that implement this interface also implement a handle action method which takes as its sole parameter a class which implements IpoliyAction. The action handler will execute the appropriate measures for the given action.

IPolicy, IPolicyEvent, IpolicyAction. Classes that implement these interfaces wrap information that the action generators and action handlers need in order to perform their functions.

During startup, the policy engine 38a reads a list of classes from its preferences. Each class implements IpolicyAutomationControl and represents an automation module. The policy engine will create an instance of each class and call its initialize( ) method, which is responsible for registering action generators and action handlers. In addition, the initialize( ) method can also create subscribers for certain types of events from the event subsystem. These events can form part of the input to the policy engine.

With reference to FIG. 7A, one type of event handled by the policy engine is indicative of the file system of a host having exceeded a threshold (FILESYSTEM_THRESHOLD_EXCEEDED). That is, the ratio of the used space to the total capacity of a file system or logical drive has exceeded a defined threshold. A threshold subagent can raise such an event when the threshold has been exceeded. Upon receipt of such an event, an action handler, i.e., created by the policy engine based on (event, policy) pair, will determine whether or not to raise an alert.

This decision can be made as follows:
Step 1)
Determine values for Monitor, Extend, Maximum file system size, Threshold, Alert Interval, and File System Extension Criteria by querying the policy database. Start by filling in any specific file system settings, then up through Hosts and Host Groups. Anything not yet determined should be set to the Enterprise defaults (values not explicitly set will propagate up through the hierarchy).
Step 2)
If Monitor value is no, exit.
Step 3)
Compare observed utilization (used space/capacity) as reported in the event to the defined threshold. If the observed utilization is not greater than the defined threshold, exit—no alert is raised and no LUN is assigned. Update the agent.
Step 4)
If this is not extendable file system go to step 5, else go to step 6.
Step 5)
Determine the amount of time, T, that has elapsed since an alert was raised for this condition and compare that to the alert interval stored in the policy database.
If T is less than the alert interval, no alert is raised, otherwise indicate an alert should be raised and record the time it was done. Then exit.
Step 6)
If this file system has reached its maximum file system size send an alert, else go to step 7.
Step 7)
Attempt to extend the file system, as follows:
(i) Obtain the list of available LUNs matching the LUN type defined for the host from the SAN Disk Manager
(ii) If the list is empty, exit—no LUN is assigned, raise an alert and log that there are no LUNs of this type available.
(iii) Sort the list by size in descending order.
(iv) Traverse the list until a LUN is found that is less than or equal to File System Extension upper bound but greater than or equal to File System Extension lower bound. If one is found, the selection process ends, and that LUN is used for assignment.
(v) If a LUN was not selected in step 7 (iv), and there are LUNs in the list that are smaller than File System Extension lower bound, select multiple LUNs from the list until the total capacity of the selected LUNs exceeds File System Extension lower bound, but is less than File System Extension upper bound if no combination of LUNs can be built to satisfy the LUN Assignment Criteria (File System Extension lower bound<combined capacity of selected LUNs<File System Extension upper bound), the selection process ends, and no LUNs are assigned, and an alert is raised and logged.
Step 8)
Returns one or more LUNs to be assigned to the Storage Automation Service.

LUN Management

The SAN manager 20, as noted above, provides LUN management for the SAN 10. This includes disambiguating logical unit identification information supplied by the agents (e.g., from inband discovery), assigning LUNs to hosts in manner consistent with policy defined by an administrator or otherwise (and effecting those assignments via the agents), deallocating LUNs, e.g., at operator/administrator request.

Figure 8:
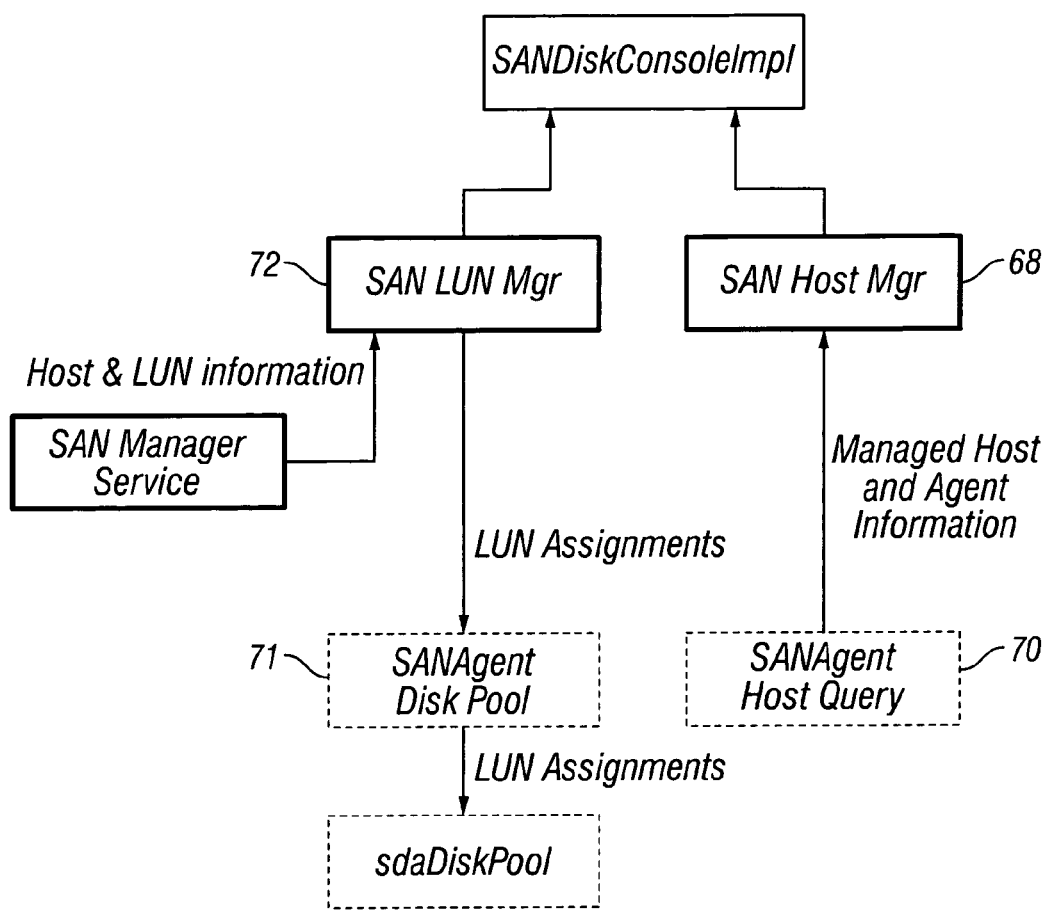
FIG. 8 is a diagram illustrating various modules for implementing LUN management services in a SAN manager according to the teachings of the invention.

FIG. 8 illustrates various modules in the SAN manager that implement LUN management services. A SAN host manager module (SANHostMgr) 68 maintains a list of managed hosts, for example, by IP address, in a Host Table. This list enumerates machines configured as managed hosts. A SAN agent host query module (SANAgentHostQuery) 70 provides host identification information at startup and on demand to the SANHostMgr 68. For example, at start of service, it sends Agent Registration Event to the SANHostMgr 68. Further, it can be called by services, such as, SANHostMgr 68, SAN LUN Manager module (SANLunMgr) 72, or other services, to provide host information. The SAN LUN manager module (SANLunMgr) 72 maintains a list of Host-LUN assignments, for example, by IP address or LUN ID, is an Assignment Table. This list is typically frequently updated by function calls from other services, such as, GUI or SAN Automation. It is also occasionally updated according to conditions reported by a SAN Agent Disk Pool service module 74.

The SANLunMgr 72 also monitors and reports the existence of SAN-attached hosts that do not have LUN masking enabled. These hosts, herein referred to as called "Rogue Hosts", can potentially compromise the SAN data integrity and security. Rogue hosts that are known to the SANHostMgr X are called "LUN Manager Rogue Hosts." Those known only to the SAN manager are called "SAN Manager Rogue Hosts." SANLunMgr can enumerate LUN Manager Rogue hosts, and can provide an "existence" notification for the Rogue hosts. A list of the LUN Manager Rogue hosts is kept in a Rogue Host Table. The SANLunMgr 72 can also include a property change listener that adjusts SANAgentDisk polling interval, and enables Rogue Host handling only when SANAgentDiskPool agents are "deployed". It further queries SANAgentDiskPool for agent status, updates Rogue Host Table, queries SANManager for SAN Manager Host status, and notifies other services (GUI) of change in SAN Manager Rogue Host status.

With continuing reference to FIG. 8, the SANAgentDiskPool 74 provides basic host information to the SANLunMgr 72, services request to assign and un-assign LUNs, and refreshes LUN assignments according to the current status recorded in the Assignment Table.

LUN IDs

In the illustrated embodiment, scanners running on the hosts query the storage devices to gather raw information regarding attributes, e.g., logical units, of the storage devices. The scanners transmit this raw information via the agents to the SAN manager, which utilizes this information along with an algorithm and support information, as well as previous scan information, to assign identifiers to the storage logical units, as described in more detail below. The SAN manager passes the LUN ID information as well as an algorithm identifier, for example, through a Disk Manager, to filter drivers associated with the hosts. These filter drivers intervene whenever the host file system or operating system attempt to mount a storage device on the interconnect fabric, failing all attempts except those for assigned LUNs.

Figure 9:
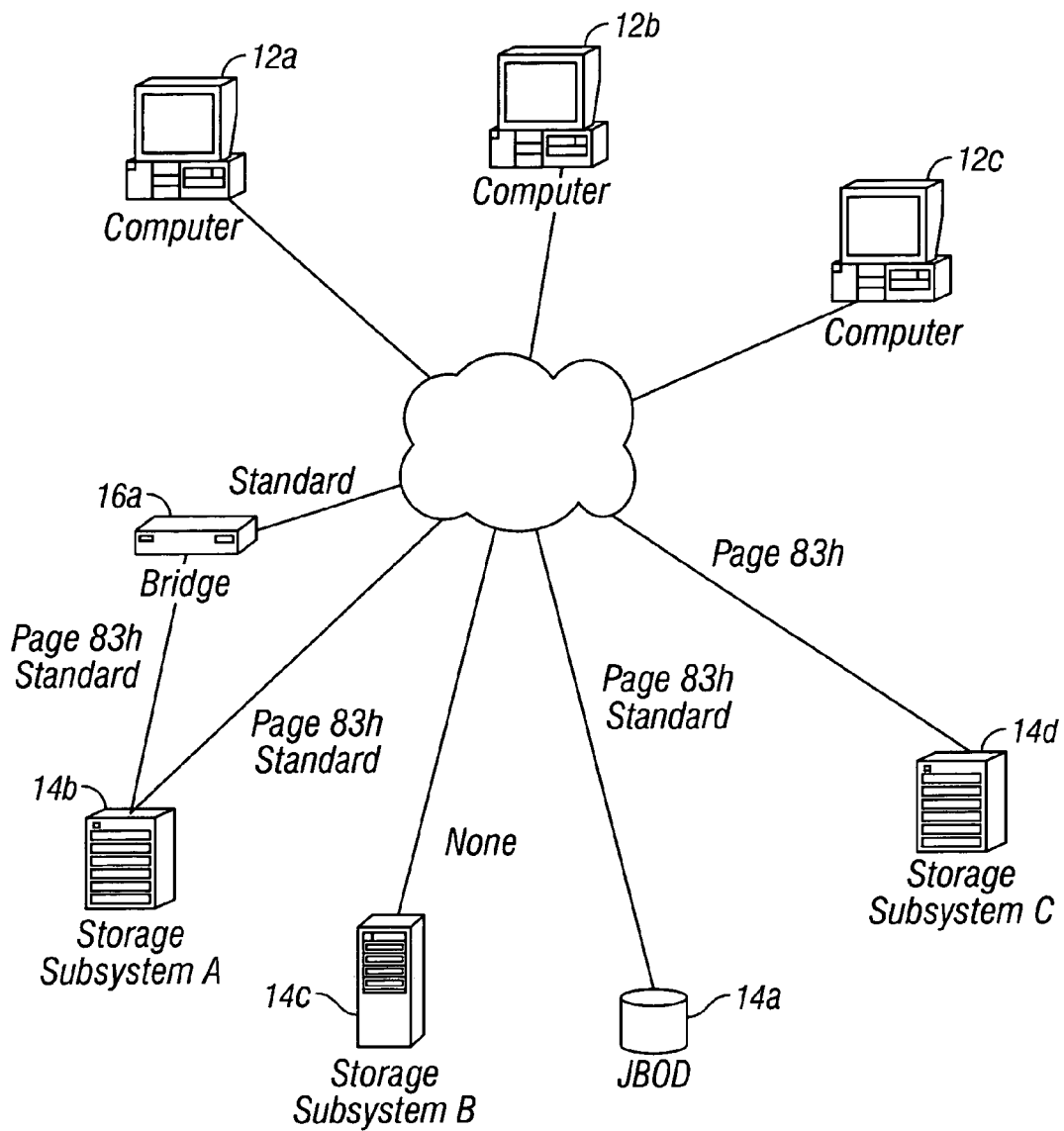
FIG. 9 schematically illustrates that scanners running on hosts connected to a SAN of the invention can utilize SCSI protocol to query storage devices attached to the SAN.
Figure 10A:
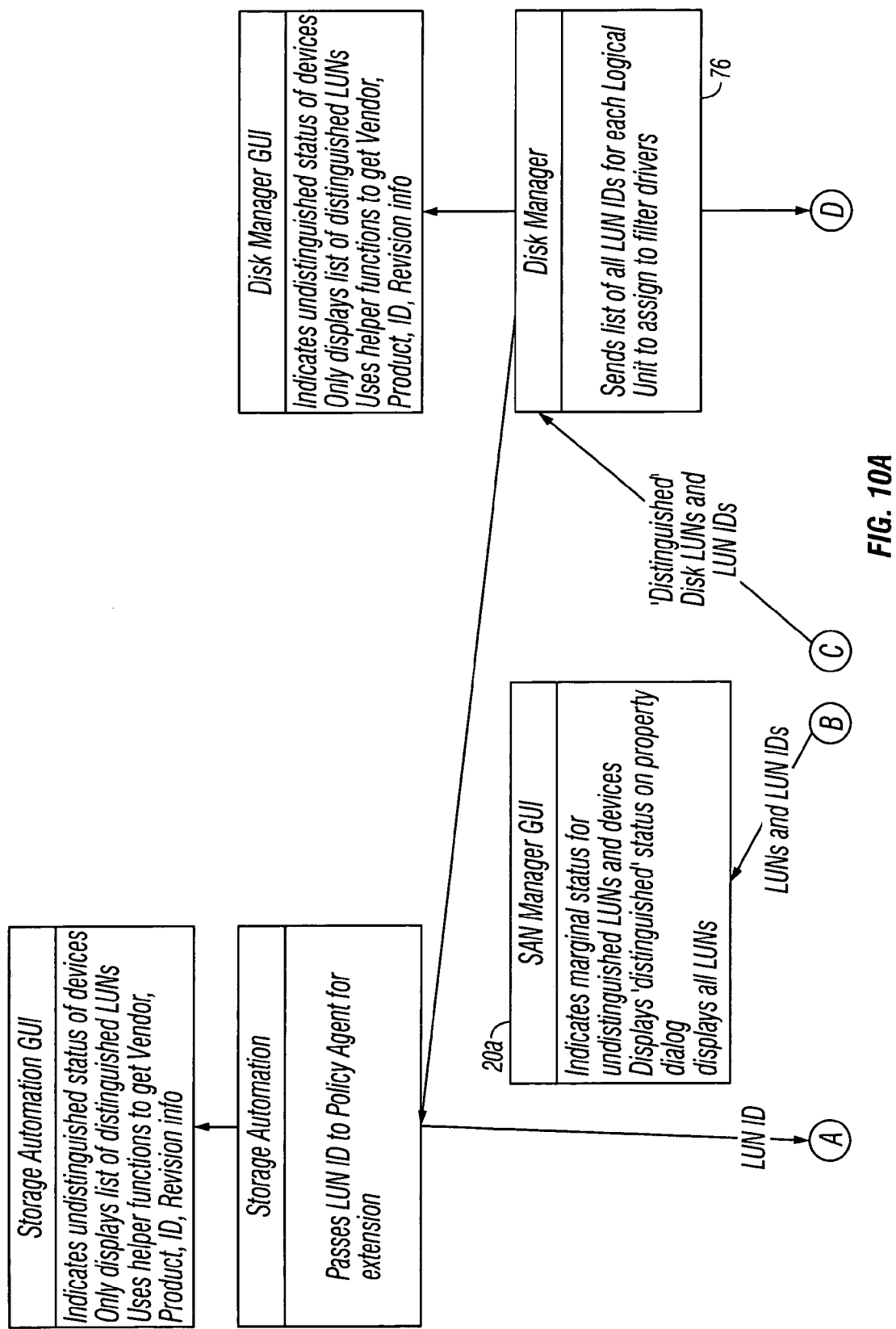
FIG. 10 is a diagram illustrating a number of modules in a SAN of the invention that implement LUN ID generation and LUN masking.
Figure 10B:
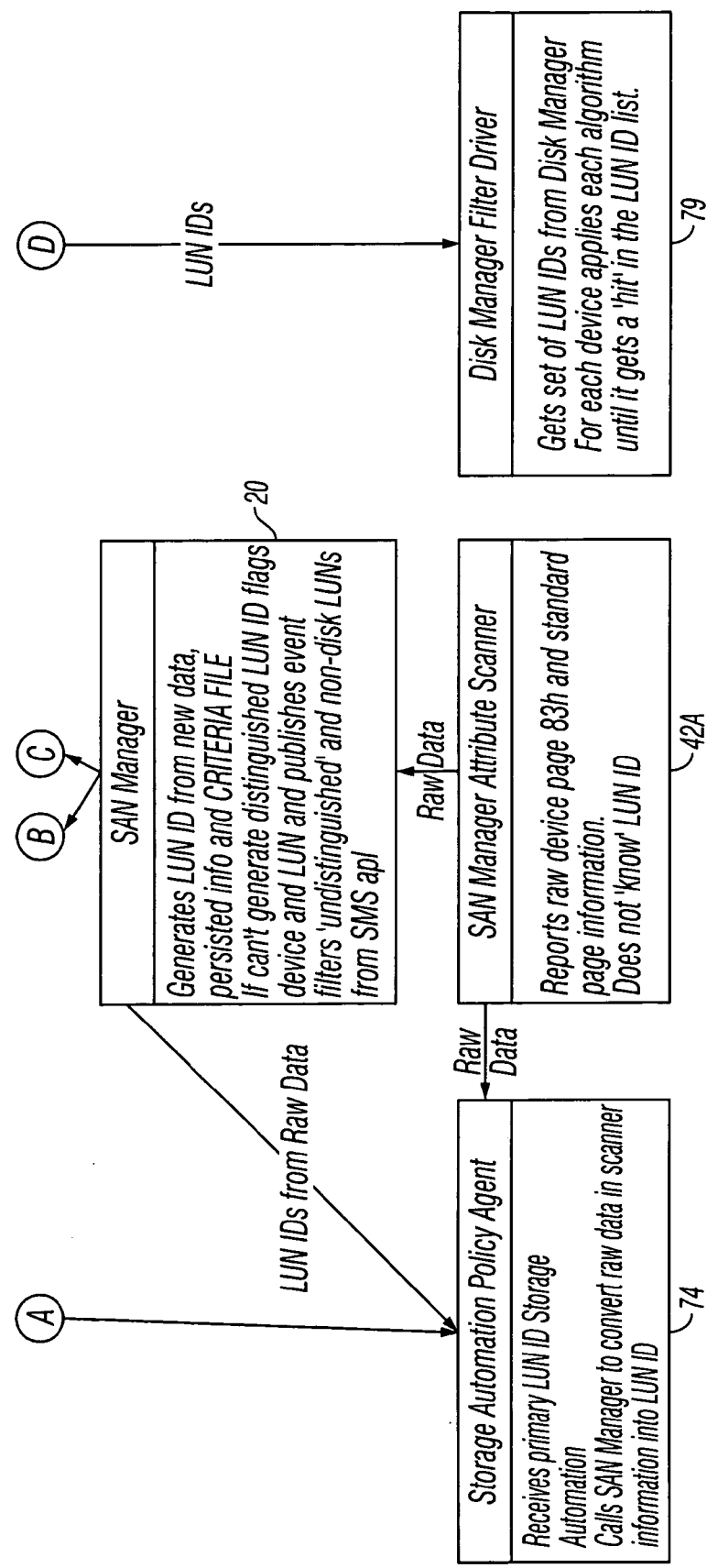

With reference to FIGS. 9 and 10, in this illustrated embodiment, the scanners running on exemplary managed hosts 12a—12c, such as an Attribute Scanner 42a, utilize Page 83h and/or Standard Page commands of SCSI protocol to query exemplary storage devices 14a, 14b, 14c, and 14d regarding attributes of storage logical units present on these devices. Vendor and product identification data can be separated into the following distinct fields:

(Unique ID) Unique ID generated as "LunXml:"+node WWN+"LUN"+lun#
(Vendor ID) Vendor ID from Standard Inquiry fields 8–15
(Product ID) Product ID from Standard Inquiry fields 16–31
(Revision) Revision level from Standard Inquiry fields 32–35
(rawSTDdata) STD data is the entire set of Standard Inquiry data returned by the device.
(raw83data) 83h data is the entire set of Inquiry VPD page 83h returned by the device. If the device does not support page 83h, then the raw83data stanza will not be included in the data.

While those skilled in the art will appreciate that other combinations of fields may be used, the UniqueID, VendorID, Product ID, Revision, rawSTDdata and raw83data are returned in the manager portion of the scanner results. The rawSTDdata and raw83data are also returned in the Storage Automation portion of the scanner results. The unique ID field is utilized for relative identification within the XML. Identifying the logical unit based on reporting node WWN may result in identification of the same LUN in the XML data multiple times with distinct unique IDs. These LUNs will be resolved into a single entity at the manager level applying the LUN ID algorithms, described below.

The Attribute Scanner 42a reports the raw device Page 83h and Standard Page data to a Storage Automation Policy Agent 74 that calls the SAN Manager 20 to convert this raw data into LUN IDs.

The SAN manager generates LUN IDs, as discussed in more detail below, from the raw data received from the policy Agent. If the SAN manager fails to generate distinguishable LUN IDs, it flags the device and the LUN associated therewith, and publishes an event. The SAN manager further sends the generated LUN IDs to a Disk Manager 76 and the SAN Manager GUI 20a.

The general format of a LUN ID formed by the SAN manager is a combination of an algorithm identifier, a vendor ID, a product ID, and an ID number that can be, for example, the serial number of a device. Although the world wide ID returned in the page 83h information is generally sufficient to guarantee uniqueness, the algorithm identifier is included to ensure uniqueness across algorithms. Further, the vendor ID and the product ID are employed to ensure uniqueness across vendor and product families.

Although a LUN ID is composed of various fields, it is not typically intended to be parsed for accessing its individual fields. In some embodiments, the LUN IDs will be 113 characters in length when represented in percent (%) notation and will be padded with trailing spaces, if necessary. Though alternate embodiments may use different field and overall lengths, in the illustrated embodiment, the 113 character limit ensures that the LUN IDs can be persisted as unique identifiers within the SAN manager persistence service. In the illustrated embodiment described herein, the lengths of various portions of a LUN ID is as follows

| | |
|---|---|
| algorithm identifier | 2 characters; |
| vendor ID | 8 characters; |
| product ID | 16 characters; |
| Id number | 29–87 characters depending on % conversion usage. |

Various exemplary algorithms utilized by the SAN manager to form unique LUN are described below. Each is based on different data obtained from Page 83*h* or from the Standard Inquiry page of the storage devices:

LUN Generation Using Page 83*h* Data—Type 1 (0)

Page 83*h* may contain one or more one or more identifiers. The process for all of the Page 83*h* queries is to parse the page and step through the list of Identification Descriptors until a match is encountered. The validity of generating a LUN ID with this algorithm is verified by comparing the following fields:

| Field | Value |
| --- | --- |
| Byte 0 (reserved/code set) of the Identification Descriptor from page 83h | '01' or '02' |
| Byte 1 (reserved/association/ID type) of the Identification Descriptor from page 83h | '01' |

The LUN ID is generated by concatenating the following fields:

| Field | Value |
| --- | --- |
| Algorithm | '00' |
| Vendor ID | Bytes 8–15 of Standard Inquiry Data |
| Product ID | Bytes 16–31 of Standard Inquiry Data |
| ID | Bytes 4–n of the Identification Descriptor from page 83h |

LUN Generation Using Page 83*h* Data—Type 2 (1) The validity of generating a LUN ID with this algorithm is verified by comparing the following fields:

| Field | Value |
| --- | --- |
| Byte 0 of the Identification Descriptor from page 83h | '01' or '02' |
| Byte 1 of the Identification Descriptor from page 83h | '02' |

The LUN ID is generated by concatenating the following fields:

| Field | Value |
| --- | --- |
| Algorithm | '01' |
| Vendor ID | Bytes 8–15 of Standard Inquiry Data |
| Product ID | Bytes 16–31 of Standard Inquiry Data |
| ID | Bytes 4–n of the Identification Descriptor from page 83h |

LUN Generation Using Page 83*h* Data—Type 3 (2)

The validity of generating a LUN ID with this algorithm is verified by comparing the following fields:

| Field | Value |
| --- | --- |
| Byte 0 of the Identification Descriptor from page 83h | '01' or '02' |
| Byte 1 of the Identification Descriptor from page 83h | '03' |

The LUN ID is generated by concatenating the following fields:

| Field | Value |
| --- | --- |
| Algorithm | '02' |
| Vendor ID | Bytes 8–15 of Standard Inquiry Data |
| Product ID | Bytes 16–31 of Standard Inquiry Data |
| ID | Bytes 4–n of the Identification Descriptor from page 83h |

LUN Generation Using Standard Inquiry Data (3)

The Validity of generating a LUN ID with this algorithm is verified by comparing the following fields:

| Field | Value |
| --- | --- |
| Bytes 36–45 | Non zero values |

The LUN ID is generated by concatenating the following fields:

| Field | Value |
| --- | --- |
| Algorithm | '03' |
| Vendor ID | Bytes 8–15 of Standard Inquiry Data |
| Product ID | Bytes 16–31 of Standard Inquiry Data |
| ID | Bytes 36–45 of Standard Inquiry Data |

The following is an example of a LUN ID generated by utilizing the Standard Inquiry data algorithm. Note that the data is shown in % notation: "03EMC SYMMETRIX 123456789"

LUN Generation Using Standard Inquiry Data—Extended Fields(4)

The validity of generating a LUN ID with this algorithm is verified by comparing the following fields:

| Field | Value |
| --- | --- |
| Bytes 36–55 | Non zero values |

The LUN ID is generated by concatenating the following fields:

| Field | Value |
| --- | --- |
| Algorithm | '04' |
| Vendor ID | Bytes 8–15 of Standard Inquiry Data |
| Product ID | Bytes 16–31 of Standard Inquiry Data |
| ID | Bytes 36–55 of Standard Inquiry Data |

Assigned LUN IDs are communicated to agents by the SAN manager 20 for use in effecting LUN assignments, or "LUN masking," on the respective hosts. Specifically, the Disk Manager 76 updates a filter driver 79 residing within a respective agent on each host with a list of assigned LUN IDs. When an attempt is made to mount a storage device otherwise visible to the host, the filter driver 79 intervenes, applying the LUN ID algorithm indicated in the manager-supplied IDs (e.g., from among the algorithms described above) and failing for any device for which there is not a match (and succeeding for any device for which there is a match). In this way the filter driver "masks" LUNs, i.e., prevents the host from accessing unassigned LUNs.

Figure 11:
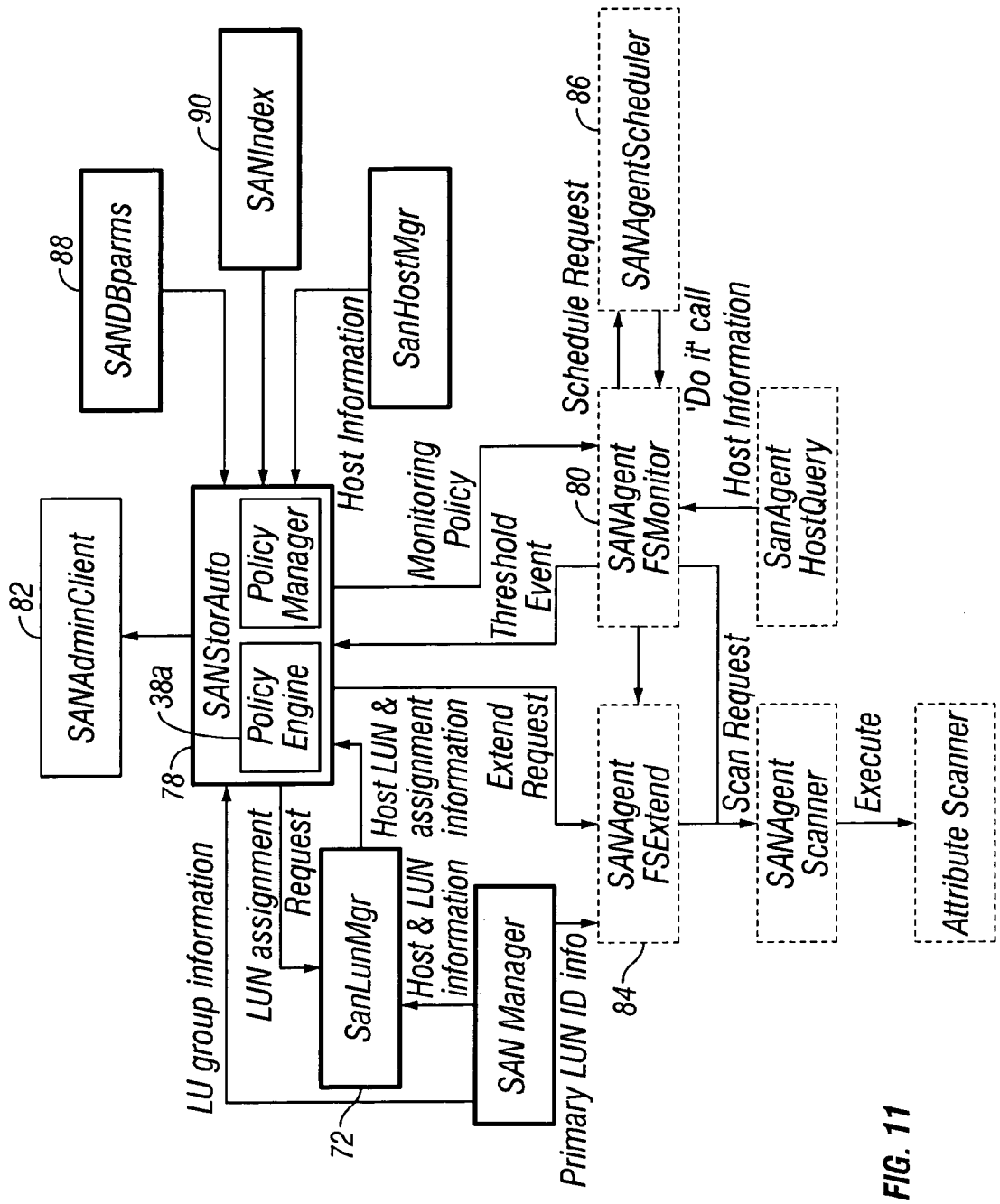
FIG. 11 is a diagram illustrating various modules of a SAN of the invention and the interactions among them for implementing file system extension services.
Figure 14A:
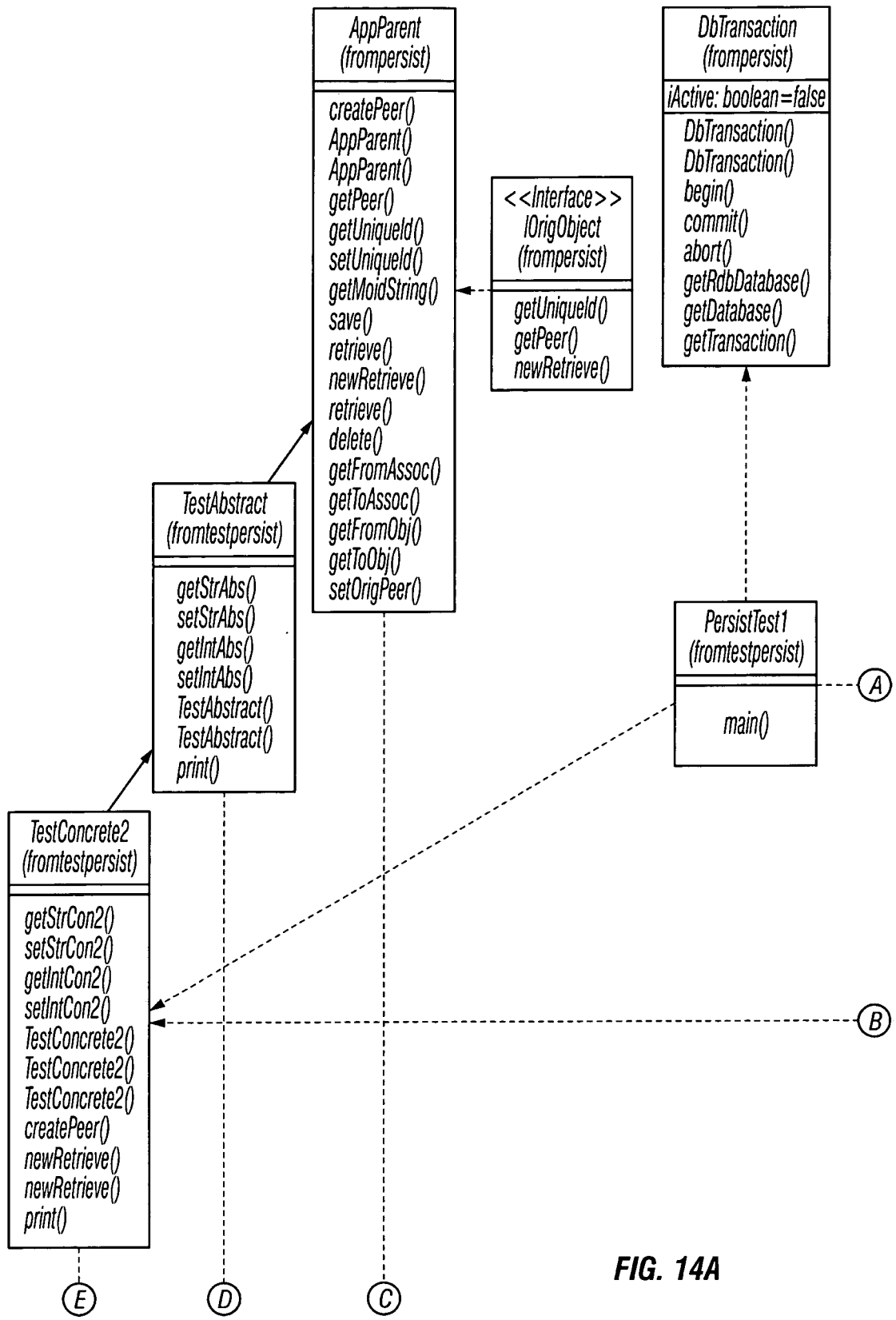
FIG. 14 is a flow chart that describes the method of FIG. 13 in more detail.
Figure 14B:
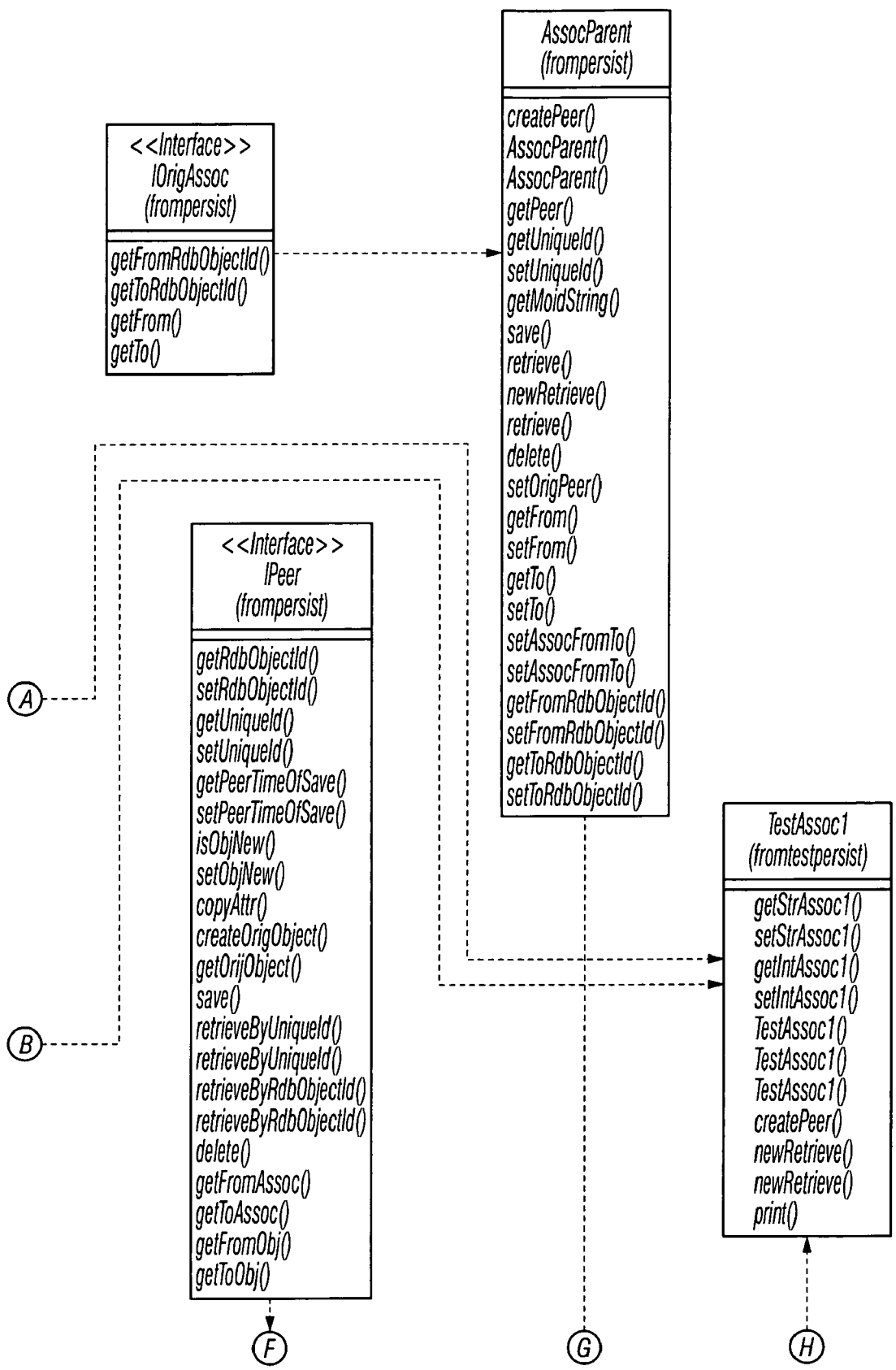
Figure 14C:
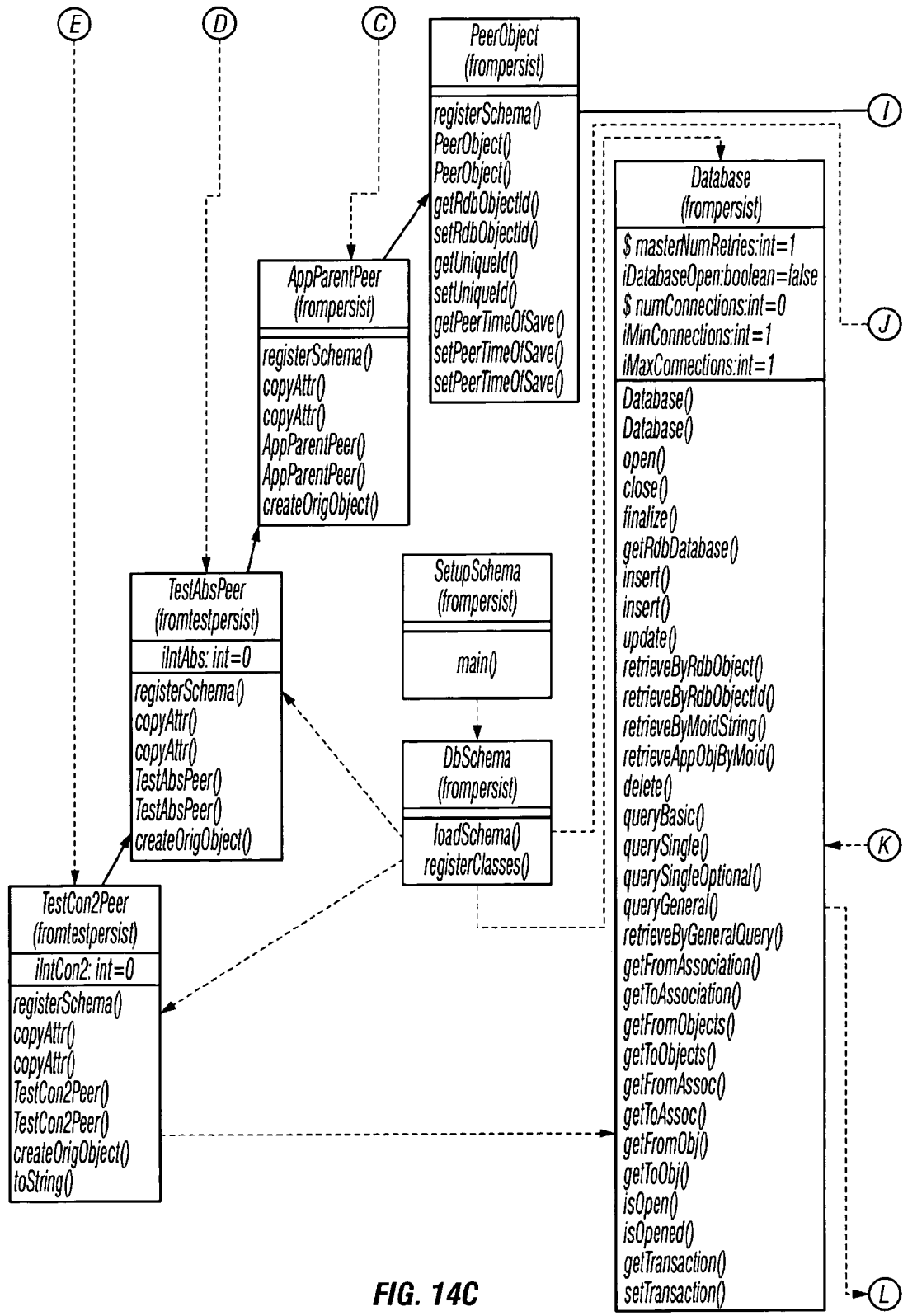
Figure 14D:
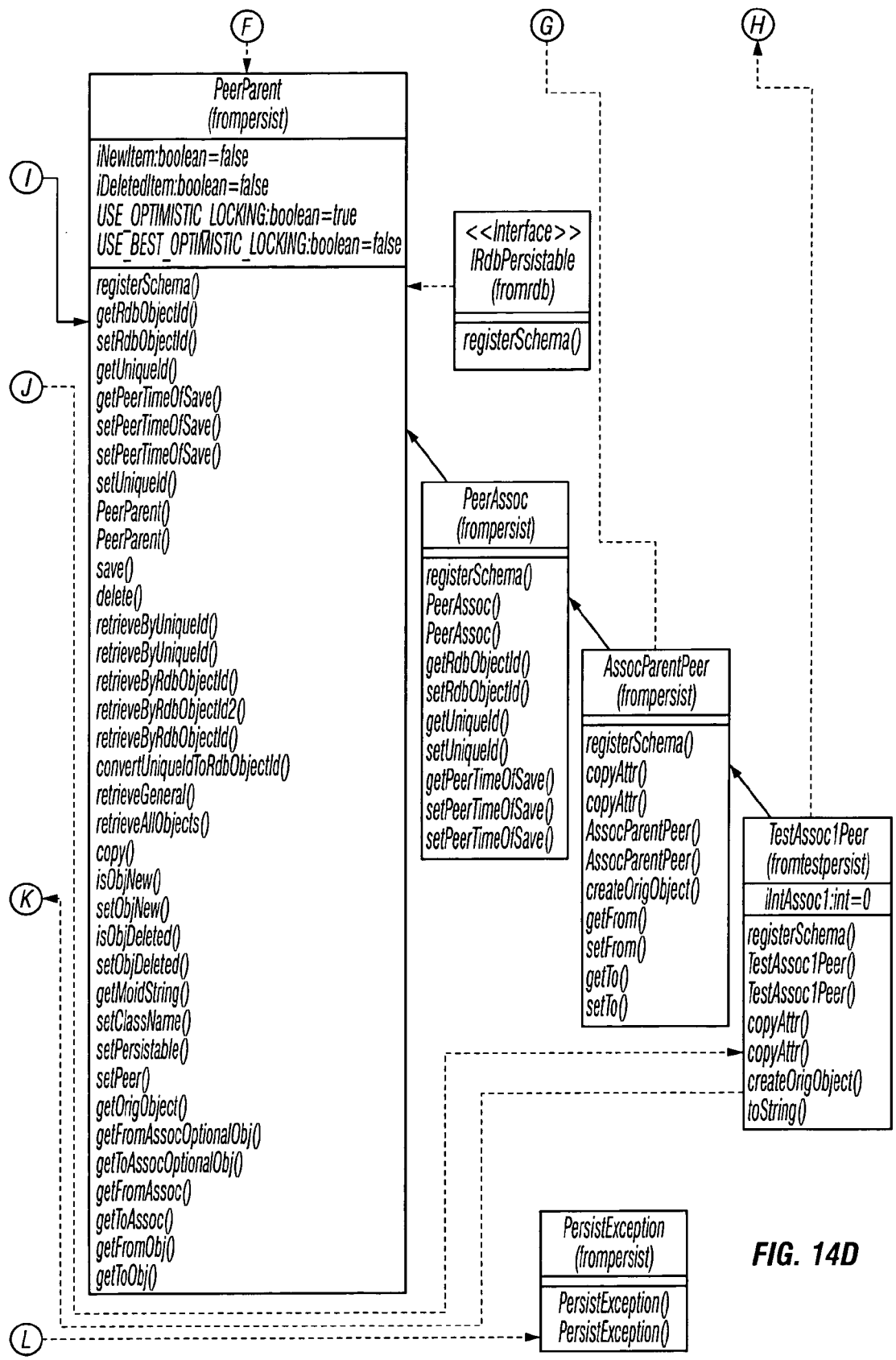

Another service provided by the SAN manager of the invention relates to File System monitoring and extension. With reference to FIG. 11, A SAN Storage Automation Service module 78 (SANStorAuto) functions as a controller for policy information. In that capacity, it has three main functions, namely, (1) maintenance of policies, (2) notification to File System monitor module 80 (FSMonitor) of policy changes, and (3) processing events when policies are exceeded.

The SANStorAuto 78 maintains a set of database tables that indicate the current policy definitions for each managed host. This policy includes a monitor flag, extend flag, maximum file system size, threshold, alert interval, LUN type, lower bound and upper bound.

A SAN Administrator Client module 82 (SANAdminClient) can request policy information from SANStorAuto 78 to be displayed on a graphical user interface console (not shown) and can send policy updates back to be saved in a database. When policy updates are made via the GUI, they are pushed down to the corresponding file system monitors.

When a file system monitor detects that a policy has been exceeded, an event is sent to the SANStorAuto 78. The policy engine 38a receives this event and determines if the file system can and/or should be extended, or if only notification is required. If the file system should be extended, then the policy engine determines what LUN to use and requests that the LUN be assigned to by the SANLunMgr 72. Once the LUN is assigned, a File System Extension service (SANAgenFSExtend) 84 is called to perform the extension by utilizing the host local operating system to extend the file system onto the newly assigned LUN.

A SANAgentScheduler 86 is a utility function that lets other functions schedule actions to be started some time in the future. It maintains a list of activity requests and the action to be performed when the request time is reached.

At startup, a SANDBParms utility service 88 retrieves database parameters from the TMD and stores them as an object. Other services can then access the object to create database connections. There is also a helper functions for creating a pool of database connections that can be reused.

A SANIndex 90 is a utility service that maintains a database table that other services can create, named sequences in. It will return the next index value given a sequence name.

A SANEvent is a utility service that can perform 3 functions, namely, (1) logs all SANEvents, (2) forwards events to SNMP and TEC, and (3) maintains the location of the SNMP and TEC event consoles.

SANEvent service subscribes to all SANEvents. All other events published by TSNM extend SANEvent. When a SANEvent is received, it is logged in the TKS message log.

SANEvent service will look inside each SANEvent it receives and if there is SNMP and or TEC information in the SANEvent, the events will be forwarded to the SNMP or TEC consoles.

Another function of SANEventService is to maintain the location of the SNMP and TEC consoles. The SANCommonAdminClient requests the location information to be displayed on the Console and sends updates back.

Peer Classes and Component Data Persistence

The SAN manager of the invention preferably utilizes an Object Oriented (OO) data model, but employs a relational data model for storing persistent data. The SAN manager employs peer classes, as discussed in more detail below, to map the OO model onto a relational model. The use of peer classes advantageously isolates the business logic from the relational database logic while allowing the use of inheritance in the business and database logic. This has the added advantage that different third party products for mapping an OO model to a relational model can be utilized without impacting the business logic.

With reference to FIGS. 12 and 13, the use of peer classes in accord with the teachings of the invention for mapping an OO model to a relational model can be better understood by considering an example. FIG. 12 illustrates a simple object model 90 including an inheritance tree with two abstract classes 92 and 94 and a concrete class 96. Each class 92–96 includes persistable data (a1, a2, and a3).

In the method of the invention for mapping the persistable data contained in the classes 92–96 onto a relational database, for each class 92–96, a corresponding peer class (peer classes 92a, 94a, 96a) is formed, and the persistable data in each of the classes 92–96 is passed to its corresponding peer class. The peer classes 92a–96a in turn map the persistable data onto a relational database to be stored in as persistent data.

The peer classes 92a–96a form an inheritance hierarchy. There is only one reference between the classes 92–96 and their corresponding peer classes 92a–96a, namely the pointer iPeer in the root object (Abstract 1). The iPeer value is overwritten as classes are constructed down the At inheritance tree (from top to bottom). Attributes stored in intermediate classes are still accessible from all the left hand column objects, since the (bottom right hand) object pointed to by the iPeer will inherit the attributes of all the classes above it in the right hand column. This advantageously saves a great deal of complexity in the code by obviating the need for every class on the left to have its own pointer to a corresponding class on the right. When an object on the right is retrieved from a database, code in "PersistablePeer1" can simply call "createOrigObject( )", which will automatically call "createOrigObject" in the bottom right hand class, to automatically construct the correct object (& tree) in the left-hand column, matching the object retrieved.

Further understanding of the use of peer classes in the SAN management system of the invention can be obtained by reference to FIG. X.

Administrator Notification

The SAN management system of the invention can notify the SAN operator/administrator of the occurrence of a condition, e.g., the utilization of a file system exceeding a threshold (e.g., defined by the host file system, the SAN administrator or otherwise). The SAN manager notifies the administrator of the first occurrence of the condition, but allows the administrator to define a time interval, herein referred to as alert interval, before the administrator is notified of subsequent occurrences of the same condition.

For example, the SAN management system may be monitoring a condition every 15 minutes, but the administrator may require a notification every two days. When the system detects an occurrence of the condition, it will determine whether it is the first time that the condition has been detected by consulting a database for date and time of a previous notification, if any, of the occurrence of the same condition. If there is no saved date and time corresponding to a previous notification, the manager transmits a notification to the SAN administrator, and saves the date and time of the transmittal. Alternatively, if the database contains a date and time corresponding to a previous notification of the same condition, the manager determines whether the time elapsed since the previous notification exceeds the alert interval. If the elapsed time exceeds the alter interval, a notification is transmitted. Otherwise, no notification is transmitted.

The use of an alert interval by the SAN management system of the invention allows an administrator to control the frequency of notifications sent by the manager thereto regarding the occurrences of various conditions. Further, the SAN management system preferably provides a graphical user interface to the administrator for efficient and convenient setting of the alert interval.

Graphical User Interface

Figure 15:
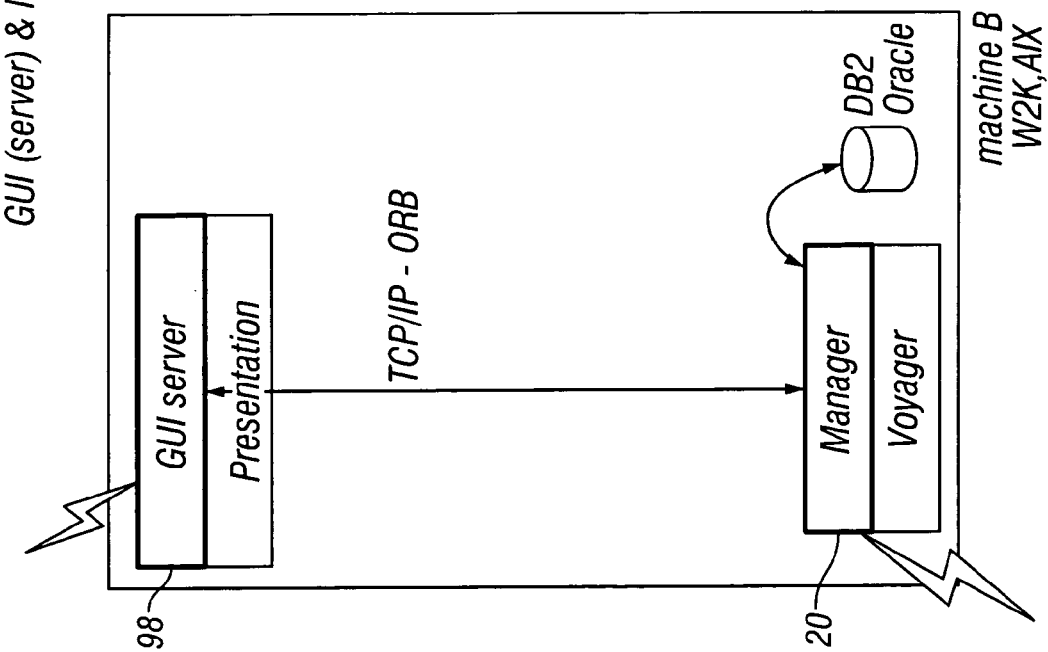
FIG. 15 illustrates that a SAN manager of the invention can communicate with a GUI server by utilizing an object request broker (ORB) over a TCP/IP connection.

The SAN manager console employs a variety of graphical user interfaces (GUI) for displaying various components of the SAN, such as, the hosts, the storage devices, and their selected attributes to the SAN operator/administrator. As shown in FIG. 15, a GUI server 98 communicates with the SAN Manager by utilizing, for example, an Object Request Broker (ORB) over a TCP/IP connection. The Manager can create objects (services) and "bind" them to the ORB directory service. GUI can "look up" an object by name in the directory service and get the object "proxy". GUI can invoke object methods to obtain information or to perform operations.

Figure 16:
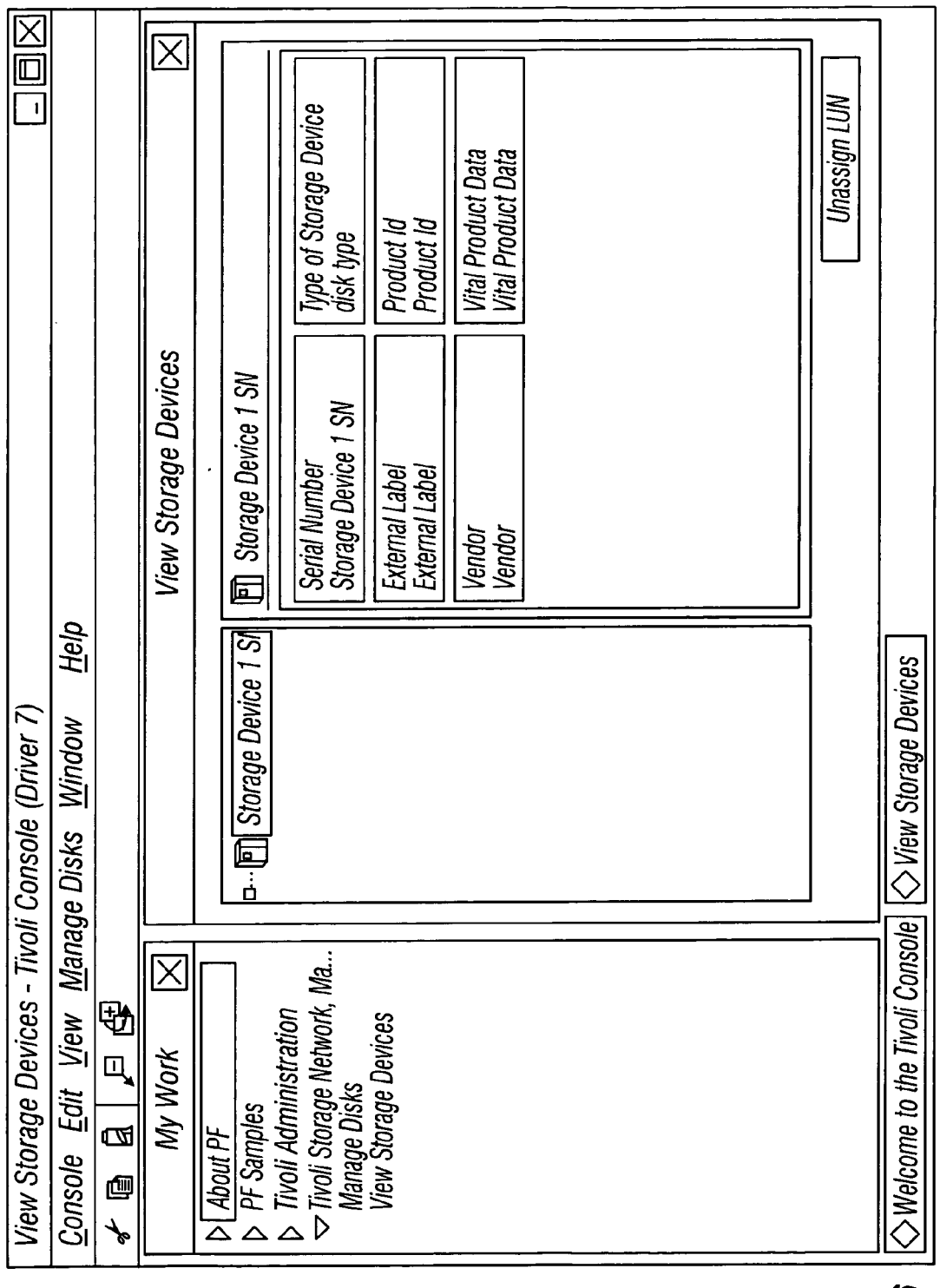
FIG. 16 illustrates an exemplary display for displaying one or more storage devices connected to the SAN of the invention and presenting information regarding selected attributes thereof.

As an example of a GUI utilized by the SAN manager of the invention, FIG. 16 illustrates a display 100 in a portion of which a storage device, and its selected attributes, such as, its serial number, its product Id, are shown. The display is presented on consoles or other graphical HMI devices of the type discussed above in connection with FIG. 2. The Storage device is identified in a first panel, and its selected attributes are displayed in a second panel vertically separated from the first panel. In this illustrated embodiment, the selection of the storage device in the first panel, for example, by clicking on the icon representing the storage device, results in the display of its properties in the second panel.

Figure 17:
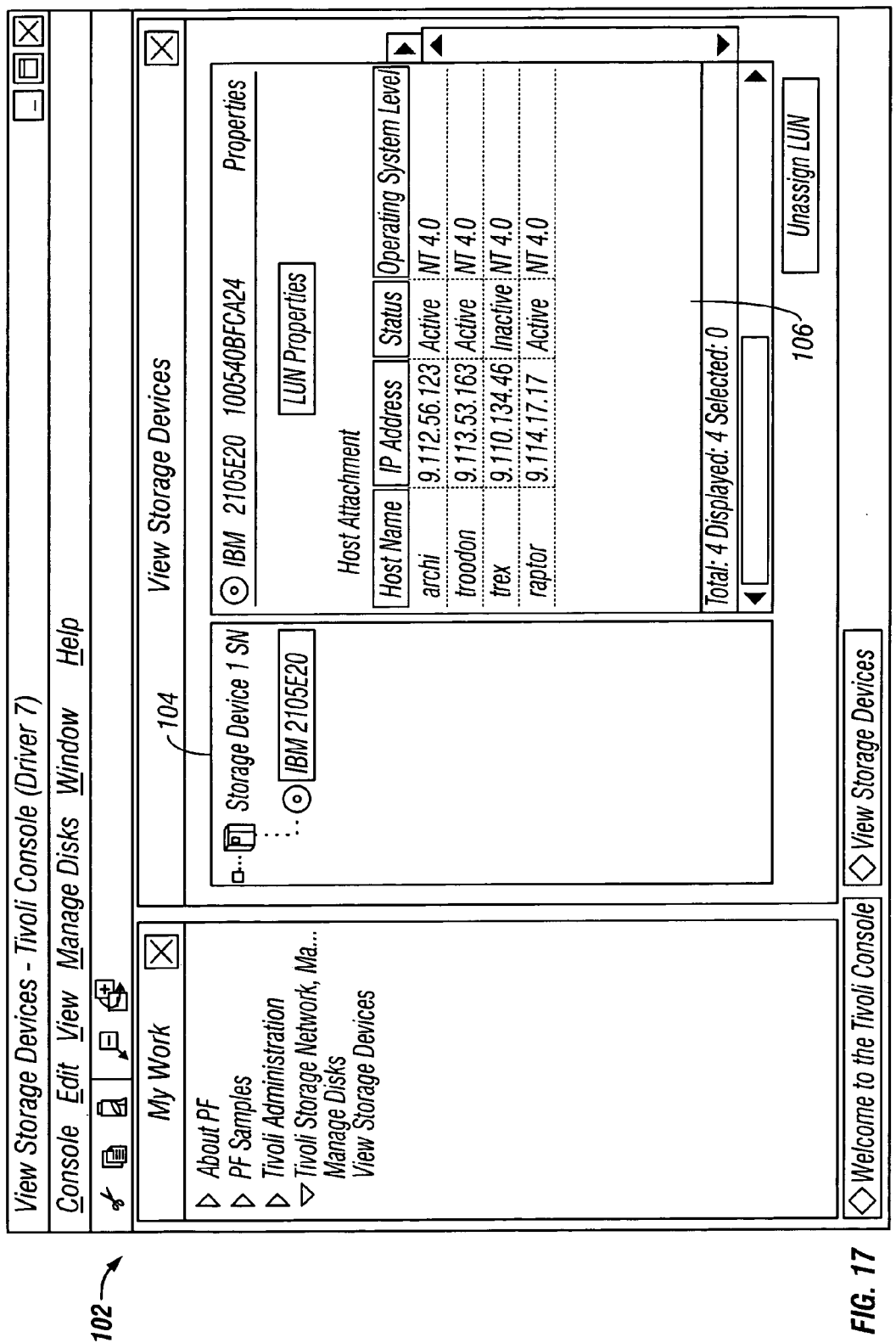
FIG. 17 illustrates a display in accord with the teachings of the invention displaying a containment tree hierarchy including a storage device, a LUN contained in the storage device, and selected properties of the LUN.

As another example of a GUI utilized by the SAN manager of the invention, FIG. 17 illustrates a display 102 illustrating a panel 104 that includes a containment tree hierarchy having a storage device at the top, and a LUN contained in the storage device at a level beneath the storage device. This provides a convenient visual representation of the LUNs within a storage device. The selection of an object in the panel 104 results in the display of selected attributes of the selected object. For example, in this exemplary illustration, the selection of the displayed LUN results in the display of selected properties of the LUN in another panel 106 vertically separated from the panel 104. These selected LUN attributes include, among other items, the names of the hosts to which the LUN is assigned, the IP addresses and the operating systems of these hosts. In a preferred embodiment, the LUN attributes are displayed in the panel 106 only if the icon representing that LUN is selected in the panel 104. This can minimize the retrieval of information regarding the LUN attributes from a database, which can be a remote database.

Those skilled in the art will appreciate that the formats for the display of the various hosts and storage devices, and the associated LUNs and their attributes are not limited to those presented above. For example, horizontally separated panels rather than vertically separated panel can be utilized to present a LUN and its associated attributes. Further, the selection of the attributes of the storage devices and the LUNs to be displayed to a operator/administrator can be different or can complement those described above.

Use of GUI for LUN Assignment, Unassignment and other Functions

In one aspect, the invention provides a graphical user interface (GUI) in a SAN management environment of the type described above that allows the operator/administrator, to efficiently assign (and unassign) one or more LUNs to each host connected to the SAN. More particularly, the selection of a host and a LUN accessible to that host from a display containing objects representing the host and the LUN results in enabling an Assign function, or an Un-assign function and/or a Re-assign function. The administrator can utilize the enabled functions to assign, un-assign and/or re-assign the LUN to the host.

Figure 18:
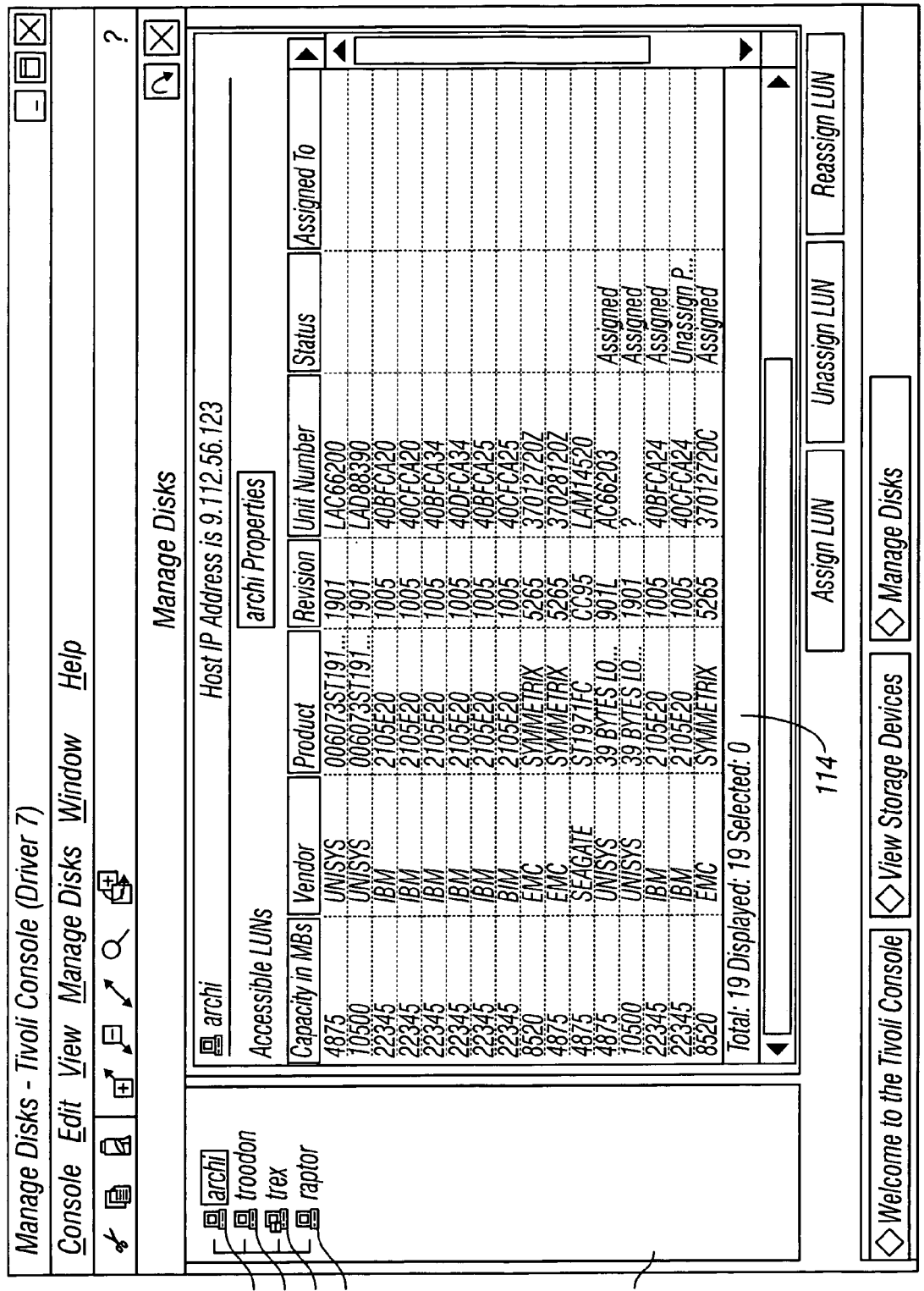
FIG. 18 illustrates an exemplary display presented by a GUI in a SAN of the invention displaying a list of hosts connected to the SAN and LUNs accessible to a host selected from the list.

FIG. 18 further illustrates this aspect of the invention by presenting a GUI 108 that includes a panel 110 in which a plurality of icons 112*a*, 112*b*, 112*c*, and 112*d* represent the various managed hosts connected to the SAN. The selection of an icon representing a host, e.g., archi, results in the display of the LUNs accessible to that host in a separate panel 114, which is vertically disposed relative to the panel 110. In this illustrated embodiment, the information regarding the LUNs accessible to the host archi is presented in a table format which includes information regarding the storage capacity of each LUN, its vendor, product id, and revision. In addition, for a selected number of LUNs, a status parameter indicates whether the LUNs are assigned or not assigned to the host, in this case archi.

Figure 19:
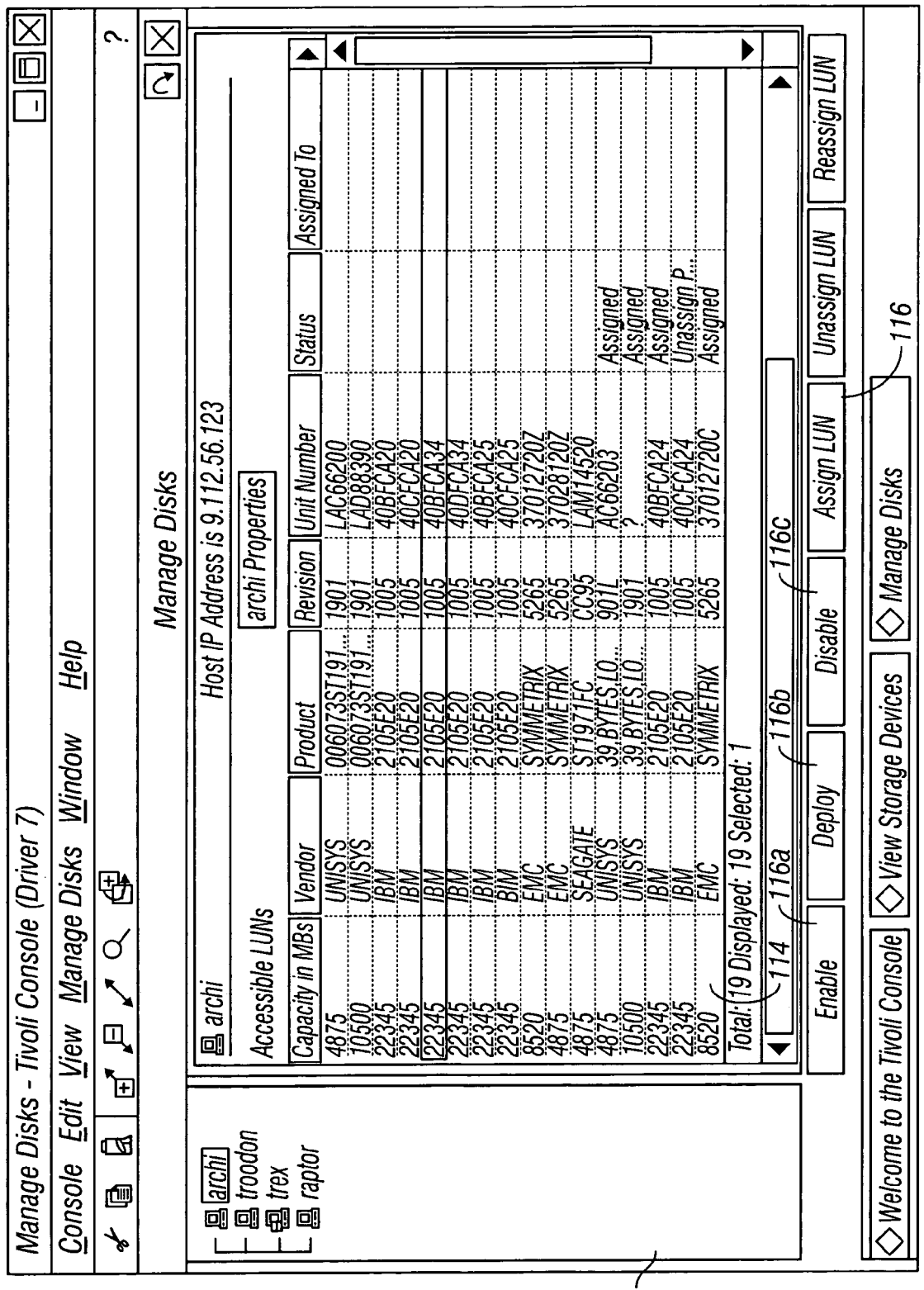
FIG. 19 illustrates the use of a GUI in a SAN of the invention for assigning a LUN to a host.

FIG. 19 illustrates that the selection of one of the displayed LUNs, namely, the LUN having a unit number 40BFCA34, results in activation of a an Assign LUN button 116 indicating that the Assign function has been enabled. Hence, the selection of the Assign button 116 results in effecting the assignment of this LUN to the host "archi."

Figure 20:
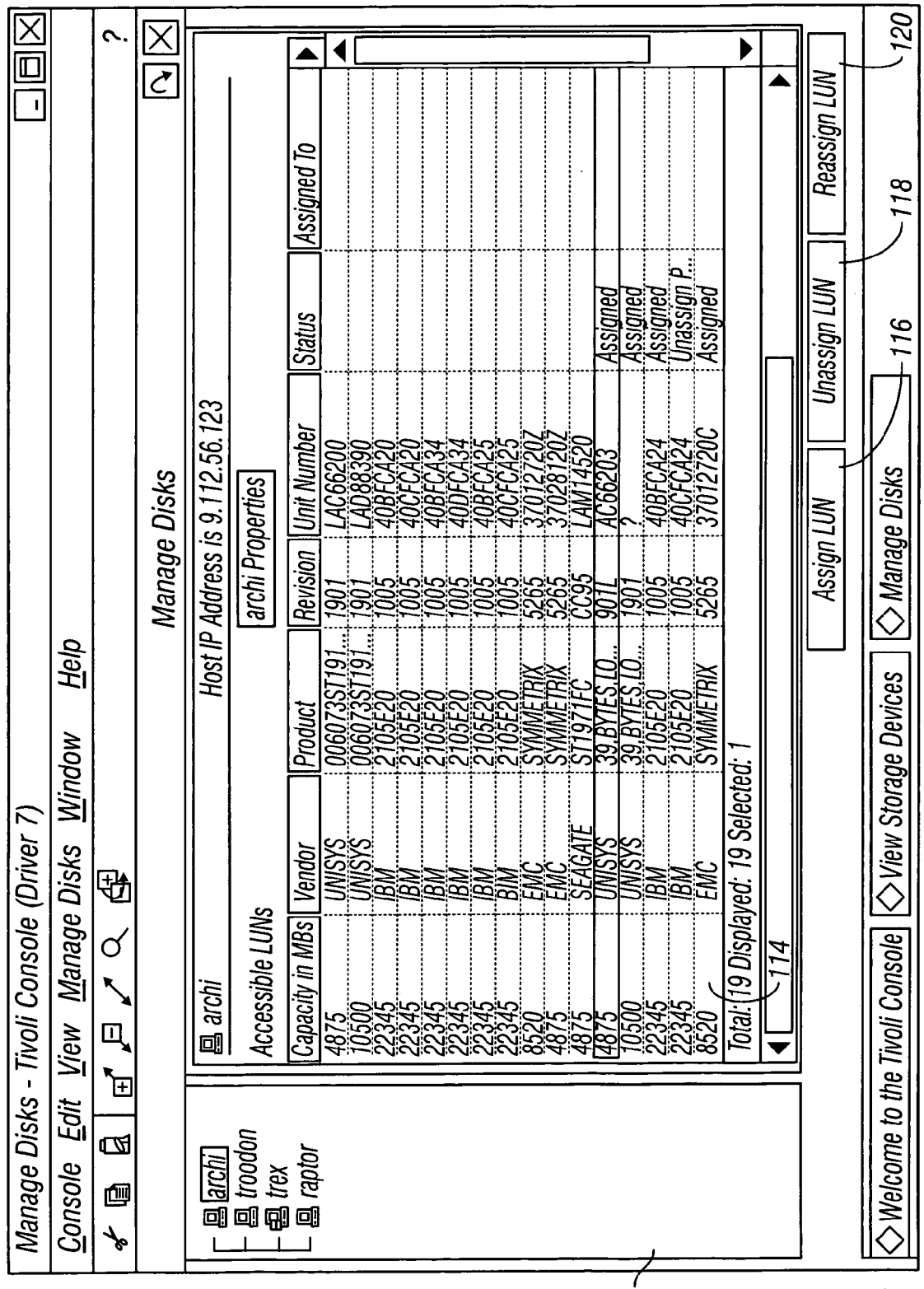
FIG. 20 illustrates use of a GUI in a SAN of the invention for unassigning and reassigning a LUN to a host.

Alternatively, as shown in FIG. 20, the selection of the displayed LUN having a unit number AC66203, which has been previously assigned to the host archi, results in activation of the Unassign LUN button 118 and Reassign LUN button 120. The operator/administrator can select the activated Unassign function to un-assign this LUN from the host archi. Alternatively, the operator/administrator can select the activated Re-assign function to re-assign the selected LUN to the host archi.

GUI Filtering

The system SAN management system of the invention allows filtering the LUNs displayed in a graphical user interface by utilizing one or more selected criteria. For example, in one embodiment, a set of displayed LUNs can be filtered to provide a display of those LUNs whose capacity exceeds an operator/administrator-defined threshold.

Figure 21:
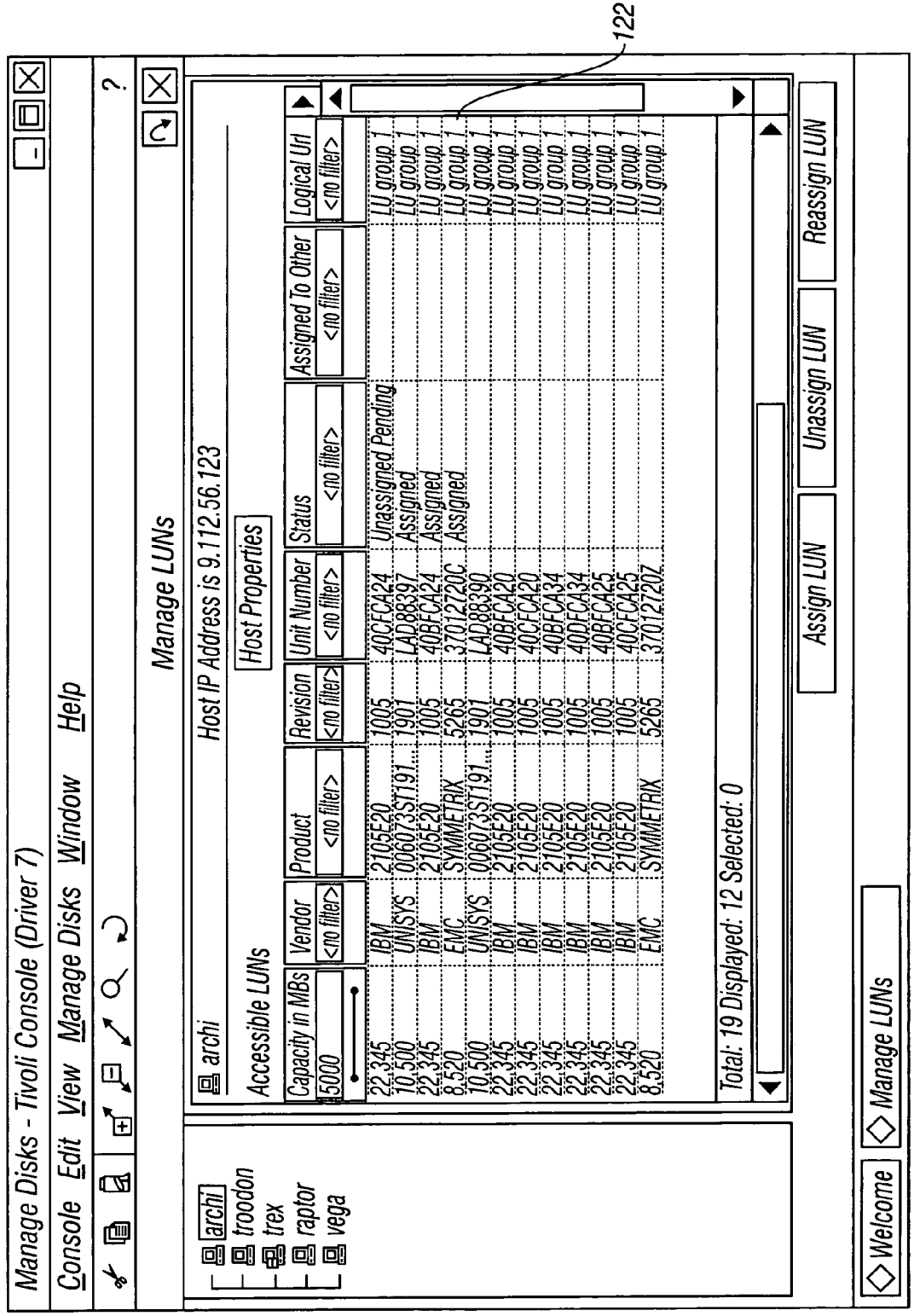
FIG. 21 illustrates a display containing a list of accessible LUNs.
Figure 22:
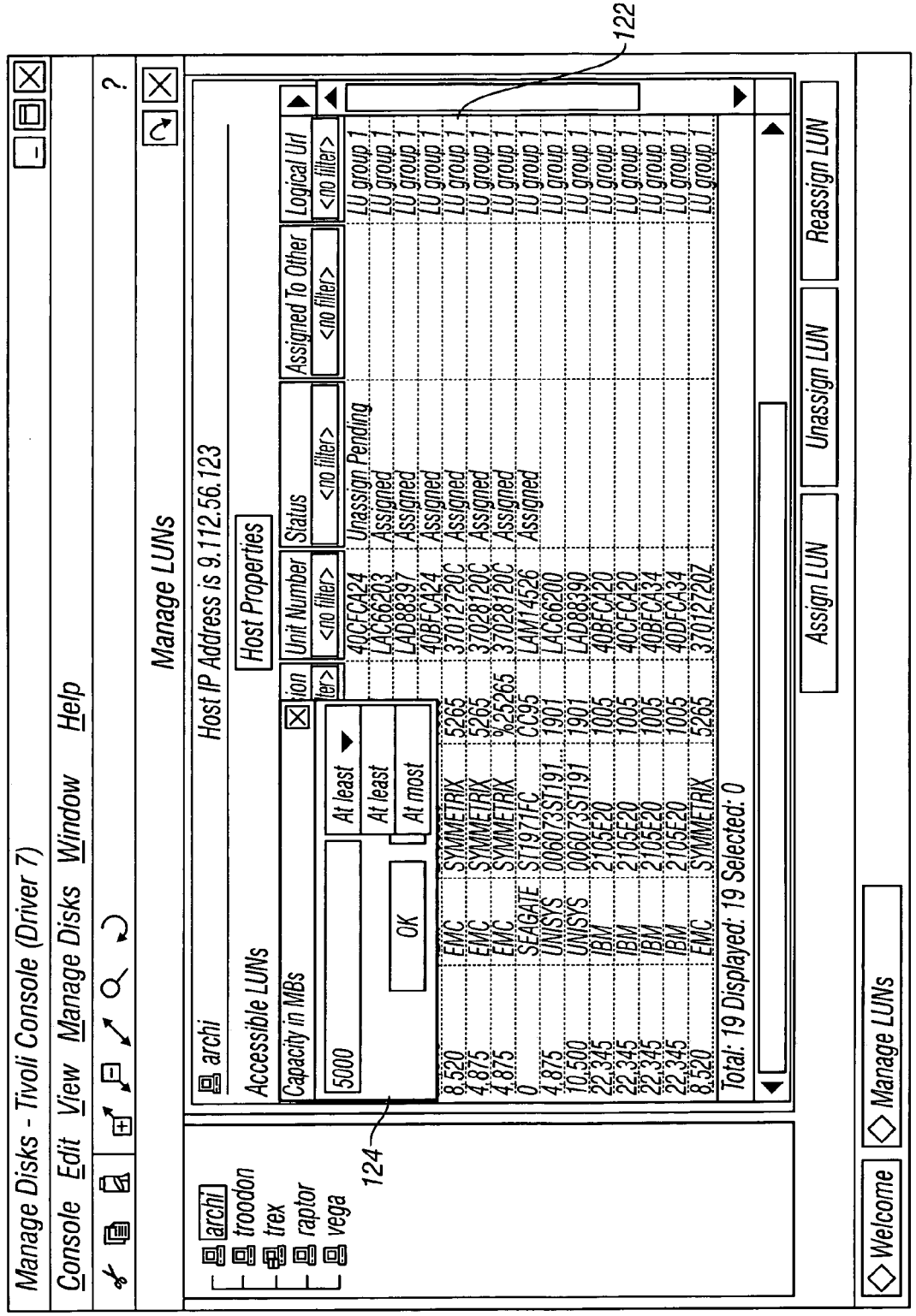
FIG. 22 depicts a dialogue box presented in the display of FIG. 21 for entering a numerical threshold for selective filtering of the LUNs presented in FIG. 21.

For example, FIG. 21 illustrates a table 122 of accessible LUNs. FIG. 22 illustrates the accessible LUNs of FIG. 21, and it further illustrates an object 124 in the form of a pop-up window that allows the operator/administrator, to enter a criterion for filtering the LUNs. In this illustrated embodiment, the operator/administrator can filter the LUNs based on whether a LUN capacity is greater than or less than a operator/administrator-defined threshold. In this case, the operator/administrator has chosen a value of 5000 kilobytes as capacity threshold. The application of this threshold value to the accessible LUNs in table 122 results in displaying only those LUNs whose capacities exceed this threshold.

Event Processing

Referring to the discussion in connection with FIG. 6, the SAN manager 20 includes one or more fiber channel (FC) discover engines (or other such engines corresponding to the interconnect 16 and/or host-to-storage device communication protocol), such as the discover engine 40 responsible for gathering topology and attribute information for the SAN components. Each discover engine 40 receives and processes information gathered by one or more scanners, such as scanner 42, which are executables that interact with the hosts 12 by performing system calls and IOCTL calls to gather information. The SAN Manager 20 includes a query engine 46 that is a helper service which manages inband and outband scan requests. The discover engine 40, registers scan requests with the Query Engine 46 which specifies target, scanner name and period of execution information. The query engine 46 coordinates running of the scanners and returning information to the client. A portion of the query engine 46 includes outband scanners which perform Simple Topology and Topology scans.

The function of gathering information is split among several scanners, e.g., an attribute scanner, topology scanner, a simple topology scanner and an outband topology scanner. Together, these collect inband and outband information including host and device interconnectivity (e.g., which storage devices are accessible to which hosts and host file system utilization), host attributes (e.g., file system information, including identities of mounted storage devices), storage device attributes (e.g., storage capacities), and interconnect element information. The scanners can perform information gathering, or discovery, on boot-up of the hosts and periodically thereafter, e.g., at a preset interval set by the system administrator or by default. They can also perform discovery on occurrence of events detected by their respective hosts, e.g., resulting from insertion or removal of a storage device, or at the request of the SAN manager 20. In the illustrated embodiment, complete scans are transmitted by the scanners 42 to the discover engine 40. That information is transmitted in XML format over via a TCP/IP connection, e.g., via network connection 18. In alternate embodiments, communications can be in other formats and/or via alternate network or other communication connections.

Discover engine 40 maintains a one level-deep history of scans from each scanner 42. It discerns changes in the SAN by comparing each scan as it is received from each respective scanner with a prior scan from that same scanner. If the engine 40 identifies differences affecting the topology of the SAN, it generates and forwards to the SAN manager 20 service module 38 notifications reflecting those changes. These can include, for example, notifications indicating addition of a new host or storage device, modification of attributes of a host or storage device, removal of a device, or change or removal of a relationship between a host and a storage device. In one embodiment of the invention, the discover engine 40 generates a single notification for each change identified when comparing a newly received scan with a prior scan from the same scanner 42. In alternate embodiments, it can forward multiple notifications and/or data for each identified change.

In the illustrated embodiment, when all the notifications resulting from comparison of a newly received scan with a prior scan from the same scanner 42 are completed (i.e., transmitted to the service module 38), the discover engine generates a further notification. This "scan complete" notification (or other termination notification) signals the service module 38 that the prior notifications just generated pertain to a single scan. In alternate embodiments, e.g., where the discover engine generates multiple notification and/or data for each identified change, the engine 40 can generate a "scan complete" or another such termination message following generation of those multiple notifications/data.

Due to the nature of the SAN 10, scans are typically generated by the scanners 42 asynchronously with respect to one another. Moreover, scans conducted following processing by the service module 38 of the topology changes identified by the discover engine 40 can result in generation of further notification. To avoid an excessive backlog of notifications, the module 38 queues the received notifications in groups. It processes the groups only after receiving the scan complete or other termination notification for that group. Moreover, it processes each group of notifications one at a time and atomically. To accomplish this, processing is effected through execution of tasks created for handling each respective group of notification and placed on a separate queue by the service manager 38.

The SAN service module 38 places on a first queue Q1 notifications N1, N2, N3, . . . received from the discover engine during processing of a newly received scan. Upon receiving a scan complete notification for that scan, the service manager creates a task S1 for (i) processing the notifications N1, N2, N3, . . . , and (ii) updating the manager 20 representation of the SAN topology. It queues that task to a second queue Q2 and, if no other tasks are ahead on it, invokes task S1 to effect such processing and updating.

In the meanwhile, SAN service module 38 places on a first queue Q1 further notifications N1', N2', N3', . . . received from the discover engine during processing of a different newly received scan. Upon receiving a scan complete notification for that scan, the service manager creates a task S2 for processing those notifications and updating the manager's SAN topology representation. It queues that task to a second queue Q2 and processes it in order. In the illustrated embodiment, the second queue is a first-in-first-out queue. Thus, task objects S1, S2 are executed in FIFO manner. In alternative embodiments, the second queue may be implemented as a priority queue or otherwise.

Illustrated tasks S1, S2 are represented by respective object-oriented programming (OOP) objects. Each includes method and data members that process the corresponding queued notifications N1, N2, N3, . . . ,N1', N2', N3', . . . in FIFO manner. Thus, once an element on the second queue is invoked, the notifications associated therewith on the first queue are processed one at a time by invoking actions, e.g., in the manner discussed above in regard to the policy engine and action automation engine, that, inter alia, update the SAN topology maintained by the manager 20 or otherwise accommodate the indicated change.

Though illustrated notifications N1, N2, N3, . . . are processed on a FIFO basis, in alternative embodiments, the notifications of each respective group may be processed based on priority or otherwise with respect to other notifications of the same group. Moreover, though OOP objects are utilized in the illustrated embodiment, those skilled in the art will appreciate that other constructs may be utilized instead and/or in addition to represent the tasks.

In addition to tasks S1, S2, . . . , that are generated by the service 38 as a result of notifications from the discover engine, further tasks (not shown) may be queued to the task queue Q2 representing operator/administrator requests. These include, for example, requests to change the name of a storage device (e.g., LUN), and so forth. Such tasks are queued in FIFO, priority, or other order, for execution. Unlike the other tasks S1, S2, . . . , the operator/administrator-effected tasks do not involve processing of notifications in the first queue.

This dual approach to handling changes in the SAN, namely, placing asynchronously received scan complete events on a first queue and placing tasks for processing thereof on a second queue allows maintaining a stable representation of various attributes of the SAN, and further ensures that the task notification queues are kept at a reasonable size.

Conflict Resolution in Event Processing

Continuing with the above discussion, a task object, e.g., S1, may retrieve further data from the discover engine during processing of its corresponding notifications, N1, N2, N3, . . . For example, a notification N1 can indicate that a storage device has been added. To update the topology representation maintained by the manager 20, the manager service 38 retrieves the identity of that storage device from the corresponding scan representation maintained by the discover engine. That information, once obtained, is used by the service 38 to update the topology representation.

In the event the discover engine representation has been modified since the notification N1 was issued, for example, as a result of a later received scan indicating that the newly added storage device was subsequently removed, the manager service 38 detects a logical conflict (e.g., between the event notification N1 indicating that the device has been added and the discover engine database indicating that no such device exists). In such instances, the service 38 employs a conflict resolution mechanism and takes action based on the class of conflict. In the illustrated embodiment, classes of conflicts include modifications of the discover engine representation, e.g., as a result of newly received scans, or corruption of the service manager representation, e.g., as a result of improper action taken on previous events, missed events, database save failures, etc.

Scenarios that indicate corruption and those that indicate a probable change to the underlying representation are identified and documented below. When corruption is absent, no action may be required on the part of the manager service whose goal it is to keep its representation "in sync." However, as a precautionary measure, the manager service can record that an event was received that did not result in an update, and then verify that the expected subsequent event did indeed follow sometime later.

Handling Events that Appear Inconsistent with Current SAN Manager Services or Discover Engine Database Contents New Device Event Received Problem Scenario #1) Device is not in discover engine database.

Probable Cause: The discover engine removed the object from its database prior to when the SAN manager 20 service started processing the new device event. A subsequent "device-missing event" should be forthcoming.

Action: Discard the new device event. Alternatively, see if it is present in the SAN manager 20 service database, and if so, change the state to "suspect".

Problem Scenario #2) Device is already listed in the SAN manager 20 system database and its state is not "missing".

Probable Cause: The databases are out of sync.—missed a device-missing event.

Action: Perform database recovery actions. (See list of possible actions below.)

New Relationship Event Received

Problem Scenario #1) Relationship Object is not in discover engine database.

Probable Cause: The discover engine subsequent to transmitting a notification to the SAN manager 20 service removed the object from its database prior to the SAN manager 20 service processing of the new relationship event. A subsequent "relationship-missing event" should be forthcoming.

Action: Discard the new relationship event. Alternatively, see if it is contained in the SAN manager 20 database, and if so, change the state to "suspect".

Problem Scenario #2) Relationship object is already listed in the SAN manager 20 service database and its state is not "missing".

Probable Cause: The databases are out of sync.

Action: Perform database recovery actions: (See list of possible actions below.)

Problem Scenario #3) One of the corresponding devices is not listed in the SAN manager 20 service database.

Probable Cause: (small) timing window.

The following example further illustrates how a small timing window can cause such a problem scenario:

at time t1, a device, herein referred to as Dev2, is added to the discover engine database and a new device notification is sent to the SAN manager 20 service, at time t2, a relationship R12 is added to the discover engine database, at time t3, Dev2 is removed from the discover engine database, at time t4, the SAN manager 20 service attempts to retrieve Dev2 from the discover engine database as a result of the event at time t1. Dev2 is not present, and the SAN manager 20 service takes no action, at time t5, the SAN manager 20 service receives R12, but it fails to add R12 to its database because Dev2 is not in the SAN manager 20 database.

Action: If adding the relationship object fails because the "to or from" object is not there, take no action on this event and assume that a Relationship Missing event will be received.

ModifiedAttribute Event

Problem Scenario #1) Device is not contained in the SAN manager 20 service database.

Probable Cause: Missed processing one or more events—the SAN manager 20 database is corrupted.

Action: Perform database recovery actions. (See list of possible actions below.)

Problem Scenario #2) Device is contained in the SAN manager 20 service database, but its state is "Missing".

Probable Cause: Missed processing one or more events—the SAN manager 20 service database is corrupted.

Action: Perform database recovery actions. (See list of possible actions below.)

Missing Device Event

Problem Scenario #1) Device is not contained in the SAN manager 20 database.

Probable Cause: The device went missing before a New Device Event could be processed.

Action: Discard the event.
Problem Scenario #2) Device is in the SMS DB and its state is "Missing".
Probable Cause: Very similar to Scenario (1), except in this scenario earlier new & missing events were handled.
Action: Discard the event.
 Missing Relationship Event
Problem Scenario #1) Relationship is not contained in the SAN manager 20 service database.
Probable Cause: The relationship went missing before a New-Relationship Event could be processed.
Action: Discard the event.
Problem Scenario #2) Relationship is in the SAN manager 20 service database, but its state is Missing".
Probable Cause: Very similar to Scenario (1), except in this scenario the earlier new & missing events were handled.
Action: Discard the event.
 Possible Actions to Take when it is Determined that the SAN Manager System Database is Out of Sync with the Discover Engine Database
 In the illustrated embodiment, if the SAN manager database is sufficiently out of synch with the discover engine database to require recovery, e.g., as determined above, the following procedures can be executed by the SAN manager 20 to rebuild the former in whole or in part, optionally, followed with error logging and/or event notification.

1. Clear out SAN manager 20 system database and copy in the discover engine database, thus rebuilding the SAN manager database in entirety.
2. As an alternative to (1), compare the databases in entirety and add in any objects from Discover engine database and delete or mark as missing any objects unique to the SAN manager 20 service database.
3. As an alternative to (1) and (2), which require a pass through one or both databases in their entirety, fix the problem locally. For example, if a Modified Attribute event occurs for an object not in the SAN manager 20 service database, the object is retrieved from the discover engine database ignoring any other discrepancies.
4. Alternative (3) can be expanded to not only get the absent object, but to also look for immediate relationship objects and other neighboring objects that might also be absent. A threshold can be set (and then resort to option (1) or (2)) making it unnecessary to try to match the discover engine database via traversing around the entire SAN Region.
5. A still further alternative to (3) is to rebuild the topology representation from the scan histories of hosts actually or likely to be coupled to, or in the region of, the device represented by an object that is missing or in connection with which the discrepancy arose. A related alternative is to compare a portion of the topology representation containing that object with a corresponding portion of the discovery engine database (e.g., the scan histories of hosts actually or likely to be coupled to, or in the region of, the device represented by an object) and to add, mark or delete objects in the manner described in alternative (2).
6. Take no action. With proper coding, no events lost or out of order, etc, this situation should never arise. In addition, if an administrator came to distrust the SAN manager 20 service database, he or she can clear the database and issue discovers.
7. In the event of a significant problem with mismatches between the databases, a severe error message can be generated recommending that the administrator exercise an option similar to options (1) and (2) rather than perform one of these steps automatically.

Alternate Embodiment for Event Processing
 To obviate the need for the service 38 to retrieve further data from the discover engine during processing of tasks and notifications, N1, N2, N3, . . . , and to engage in conflict resolution as discussed above, the discover engine 40 of alternative embodiments of the invention transmits to the manager service, in addition to a notification, data sufficient for its processing.
 By way of illustration, referring again to FIG. 6, in this alternative embodiment, the discover engine 40 communicates a notification regarding one or more changes in topology of the SAN to the manager service 38 in combination with the data that the manager service 38 needs to handle the notification. For example, if the notification relates to a missing storage device, the discover engine 40 not only transmits a "missing device" notification, but it also transmits, with the notification, the identity of the storage device that is missing. This allows the manager service to update its SAN topology database without a need to request additional data from the discover engine. The combination of notification and data, or "smart event" notification, can take the form of an OOP object or any other data construct or mechanism sufficient to carry the requisite information between the services.
 In another example, the use of "smart event" notifications obviates the conflict presented in problem scenario #1 above under the heading "New Relationship Even Received", by transmitting, from the discover engine to the manager service, a newly discovered relationship object with a notification that a SAN topology change has occurred. Similarly, other conflict scenarios listed above can be avoided by combining the transmission of a notification with the data needed to process the notification.
 In a still further example, a "smart event" notification can indicate not only that a file system is overutilized but, also, can identify the respective host and the amount of degree of overutilization.
 The use of smart events advantageously allows maintaining a valid representation of the SAN, e.g., a valid topology representation, without a need to "lock" data contained in a database regarding a change until a subsystem that has been notified of the change has had the opportunity to access this data. For example, subsequent to the transmission of a "smart" notification, indicative of a topology change, from the discover engine to the manager service, the discover engine database can be updated without a need to consider whether the manager service has completed handling the notification.

Figure 23:
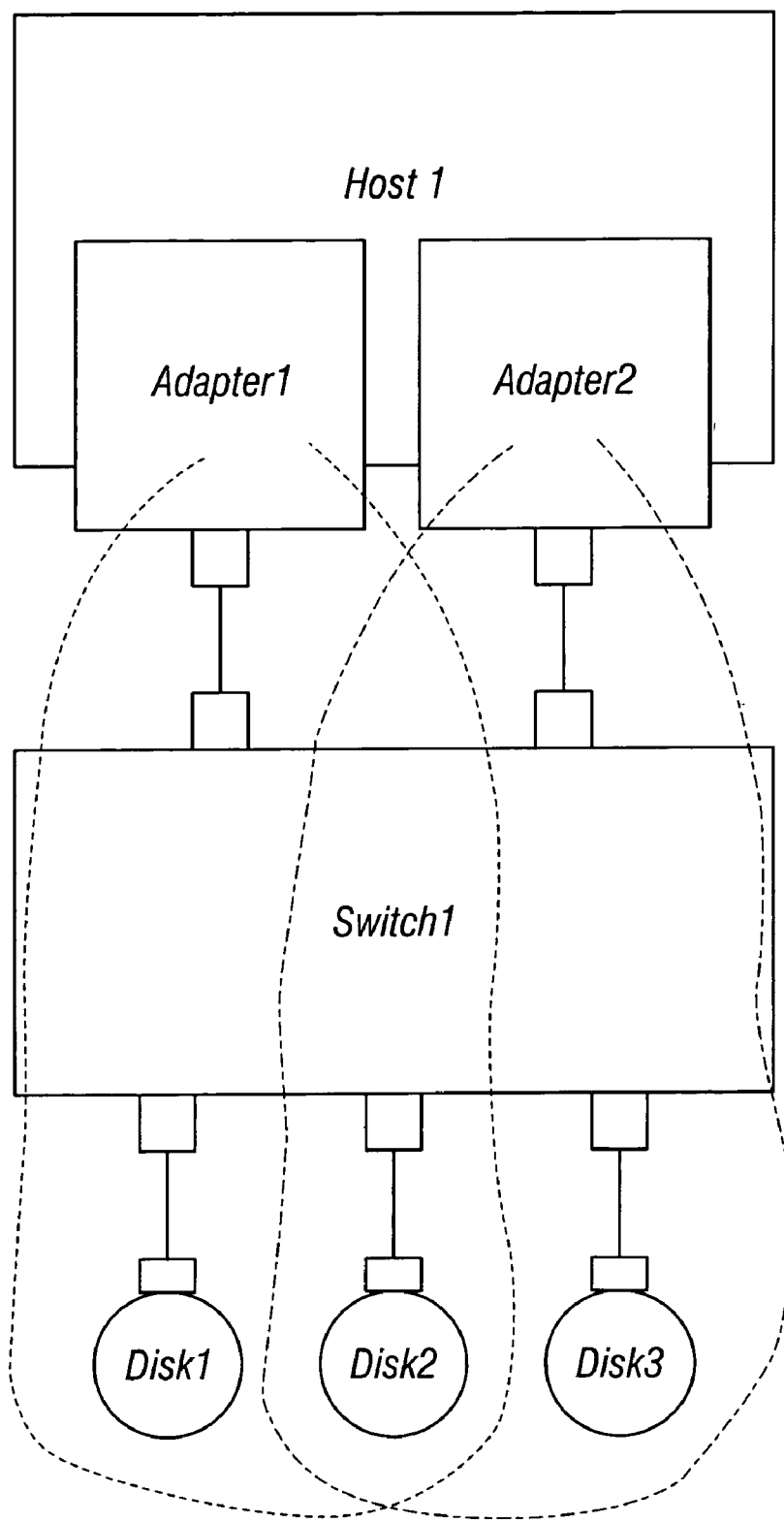
FIG. 23 depicts an example of a virtual SAN of the type that can be detected by host adapters and disambiguated by a SAN manager according to the invention.

SAN Topology Recognition (Virtual SANs)
 As discussed above, according to one practice of the invention, SAN manager 20 receives inband and outband data from scanners associated with hosts, and collates the data to generate a topological representation of the SAN. Each host is connected, via one or more adapters and via interconnect fabric 16, to one or more storage devices. The agent associated with each host utilizes the host's adapter to determine the SAN elements, e.g., storage devices, with which each adapter can communicate, i.e., the elements that the adapter can "see," all as discussed above.
 The information gathered by one host adapter is typically not indicative of all elements, e.g., storage devices, of the SAN to which the host has access. This is because communications between the adapter to any given storage device may be restricted by switches or switch-like interfaces on the interconnect, the storage devices and or the hosts devices themselves. As noted previously, such switches or interfaces are often employed to define "zones" within the SAN. By way of example, FIG. 23 illustrates a host HOST1 having two adapters ADPATER1 and ADAPTER 2. Through adapter ADAPTER1, the host can communicate, that is, it can "see", only storage devices DISK1 and DISK2 via a switch SWITCH1. In contrast, through adapter ADAPTER2, the host can communicate only with storage devices DISK2 and DISK3. Thus, the host can only "see" a subset of the storage devices, and further, the devices seen through one adapter form a different subset of the same "virtual" SAN as the devices than seen by the other adapter.

The SAN manager 20 utilizes a methodology described in more detail below to disambiguate the information gathered through the host adapters ADAPTER1 and ADAPTER2, and similar adapters on other hosts connected to the SAN, to generate a topological model of the SAN. Thus, by way of example, the SAN manager 20 can infer that the reported devices DISK1, DISK2 and DISK3 belong to the same virtual SAN because of the overlap, i.e., DISK2, between the zones (SAN regions) in which they fall.

The term "virtual SAN" is herein utilized to refer to those devices that are likely to belong the same SAN, even if they do not necessarily make up the entirety of the SAN. More particularly, a virtual SAN can be said to comprise endpoints on the interconnect—to wit, storage devices, bridges, routers hosts, and the like,—in a set of regions, each of which has one or more common endpoints (typically, storage device ports) with at least one other region of that set. Elsewhere in this document, the term SAN includes virtual SANs, unless otherwise evident from context.

A more complex scenario than that discussed above arises when multiple adapters of a host are linked via common ports of a fabric element, e.g., a switch. For example, consider a scenario in which scans from a host indicate that its adapters see interconnect fabric switch ports P1–P12, as follows:
  Adapter A1 detects ports P1 & P2,
  Adapter A2 detects ports P3 & P4,
  Adapter A3 detects ports P5, P6, & P1,
  Adapter A4 detects ports P11, P8, P9, P10 & P5,
  Adapter A5 detects ports P3 & P12.

Though they do not have any ports in common, adapters A1 and A4 are in the same virtual SAN, since they both can see one or more ports in common with other adapters (e.g., adapter 3).

A general approach for handling any degree of complexity is to create collections of ports that belong together, and then work with each collection to ensure that all the ports that make up the collection are associated with the same SAN. SAN assignment for each collection is based on the following rules:
  1) If any port in a collection is already known (e.g., by the SAN manager 20) to be on an actual SAN, then all ports in the collection are assumed to be on that SAN and not on any virtual SANs.
  2) If none of the ports in the collection are known (e.g., by SAN manager 20) to be on an actual SAN, then the virtual SAN for the port with the highest port number is used for all ports in that collection.
  3) If none of the ports in the collection are known to be on an actual or virtual SAN, then a new virtual SAN is created and used for ports in the collection.
  4) If as a result of the above steps, a previously created virtual SAN no longer has any ports associated with it, that virtual SAN is discarded.

Figure 24:
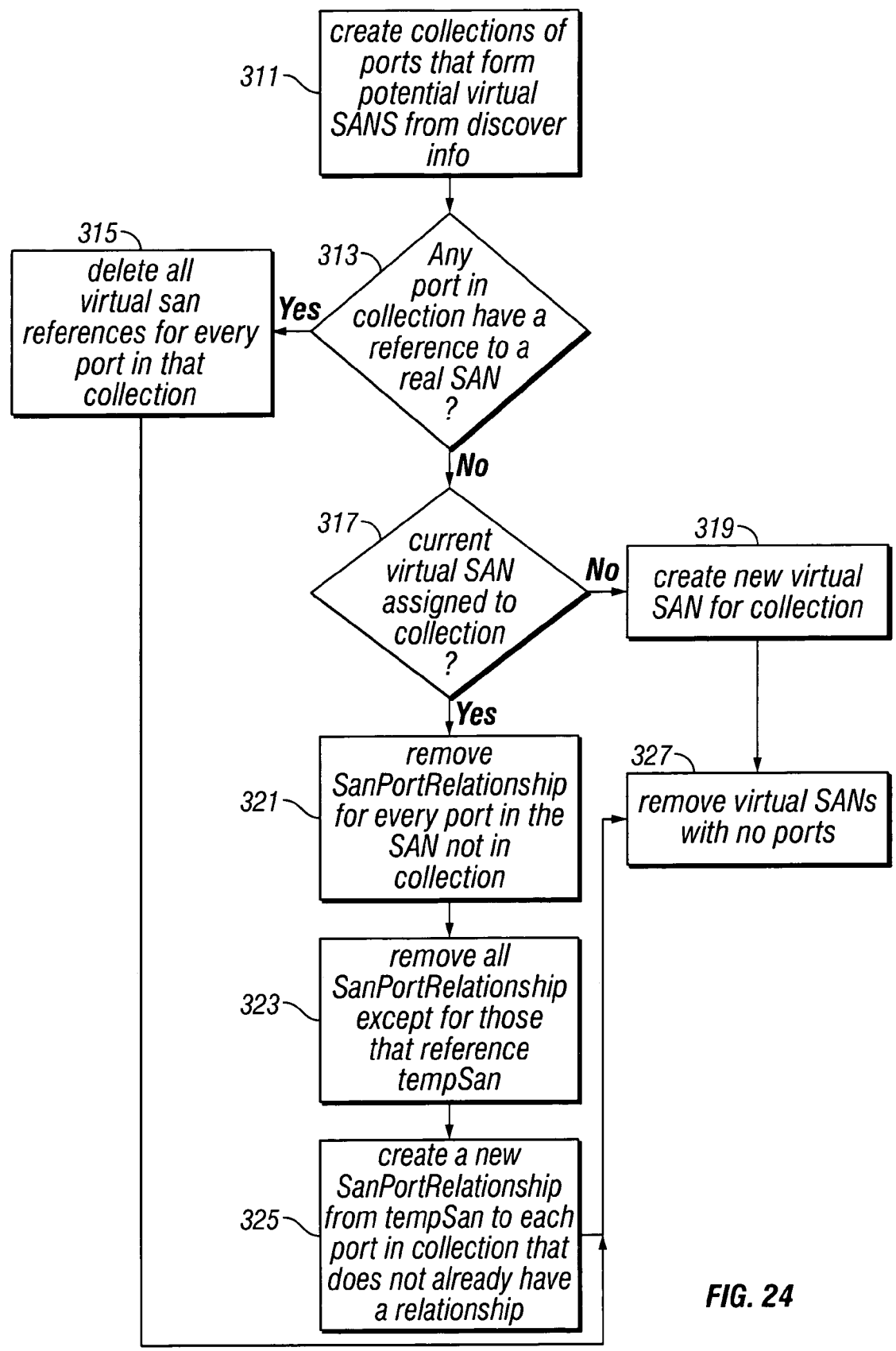
FIG. 24 depicts a methodology according to the invention for disambiguation of virtual SANs in a system according to the invention.

A methodology for implementing these rules is depicted in FIG. 24. A first step 311 is to create collections of ports that are on actual SANs or that form potential virtual SANs based on scan information in the discover engine 40 database. This is done by traversing the database from hosts to internal controllers, gathering all of the controller ports and then making calls via the operating system, to determine which endpoint ports are seen by these ports. The controller ports and the 'seen' ports are all added to this initial collection, referred to here as the fromPortPool.

Once fromPortPool has been populated, the SAN manager 20 creates two more collections called comparePorts and tempcollection. ComparePorts is seeded with a port from fromPortPool and then populated with any other ports in fromPortPool that see any ports in common with the seed port. Tempcollection is initialized with the seed port and any ports seen by the seed port. The ports from fromPortPool that see any ports in common with ports in comparePorts are added to tempcollection, and the ports seen by these ports are also added to tempcollection. Checks are made to ensure that none of the collections—i.e., comparePorts and temp-Collection—contain any duplicates—i.e., a port is not added to a collection if it is already in it.

Once the action described in the preceding two paragraphs has been taken, tempcollection consists of a collection of ports that may constitute a virtual SAN. The procedure described in these paragraphs is repeated by the SAN manager 20 over and over again using new comparePort and tempcollection collections until fromPortPool is empty. This results in a collection of tempcollection port collections. The next steps are to cleanup/establish the correct SAN-Port relationships for every port in each tempcollection as described below.

In a second step 313, for each collection of ports from the first step, the manager 20 determines if any port in the collection is already known to belong to an actual SAN. This can be determined by reference to the aforementioned manager databases, e.g., the discover engine database or, preferably, the topology database. If so, in step 315, the manager 20 deletes all virtual SAN references for every port in that collection and designates them all as being part of that same actual SAN.

If no port in the collection is already known to be assigned to an actual SAN (as determined in step 313), the manager in step 317 determines whether a virtual SAN is currently assigned to any ports in the collection. If not, in step 319, the manager creates a new virtual SAN, tempSan, as associates it with every port in the collection, e.g., by populating the topology database.

If a virtual SAN had been assigned to any ports in the collection (as determined in step 317), the manager in step 321 (i) removes the SanPortRelationships identifier for every port in the SAN that is not in the collection, (ii) in step 323, the SAN manager goes through each port in the collection and removes all SanPortRelationships except for those that reference tempSan, and (iii) in step 325, the SAN manager 20 creates a new SanPortRelationship from tempSan to each port in tempcollection that does not already have a relationship to it.

In step 327, the manager 20 removes all virtual SANs that no longer have any ports.

Though the discussion above is directed to assignment of interconnect fabric ports to virtual SANs, those skilled in the art will appreciate that the techniques are equally applicable to assignment of storage devices or other SAN components seen by the hosts.

Maintaining and Updating SAN History Data

Figure 25:
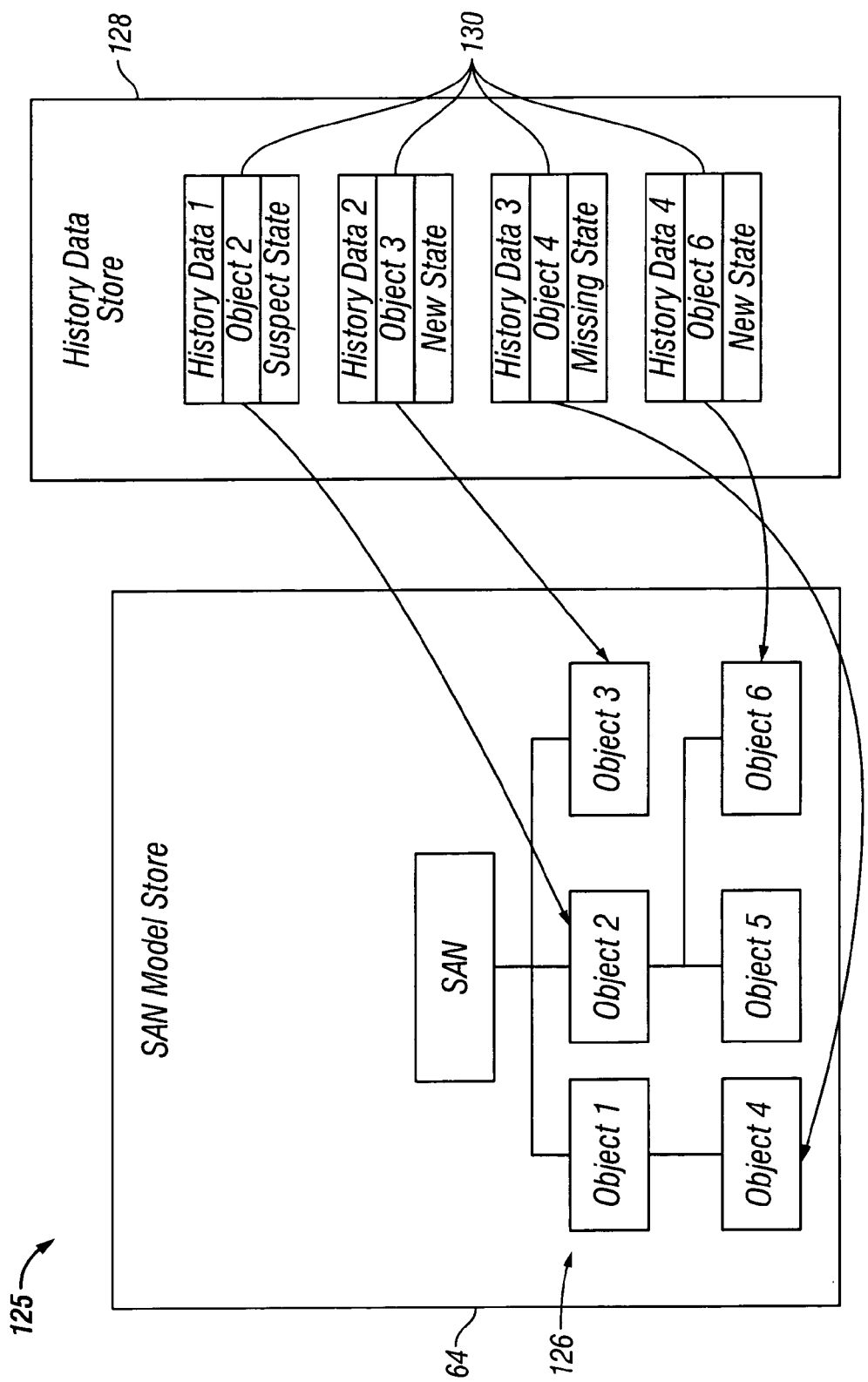
FIG. 25 depicts internal models maintained for purposes of SAN management in a system according to the invention.

As noted above, in the illustrated embodiment, the SAN manager stores an internal model store 125 of the SAN topology. As illustrated in FIG. 25, that model store contains objects 126 representing components of the SAN (e.g., hosts 12, storage devices 14, interconnect element 16a), their attributes and the interrelationships therebetween (e.g., assignment and/or accessibility of a host 12 to a storage device 14). These objects can be arranged hierarchically or otherwise (e.g., via link lists or other associations) to reflect relationships among the SAN components.

In the illustrated embodiment, the objects are object-oriented programming "objects," though other programming constructs can be used in addition or instead. Moreover, in the illustrated embodiment, the objects are maintained both in a persistent database, as well as in a runtime form (e.g., in the random access memory of manager 20).

The SAN manager 20 additionally includes a historical model store 128 that reflects a one-deep history (or, in alternate embodiments, still deeper) about specific components and/or relationships within the SAN—to wit, components and/or relationships that have recently changed. This information is used to during generation of displays enumerating (e.g., listing) the SAN componentry and/or showing its topology (collectively, "topology"), e.g., on the administrator console 52.

Specifically, in the illustrated embodiment, it is used to identify (by way of non-limiting example, via highlighting, graying out or otherwise altering the appearance of) graphical objects representing components and/or relationships that are new, missing, broken, need attention, have a changed attribute, or have attained a "suspect" status, e.g., since the time of the last generated display—and, more precisely, since the time the operator/administrator last asked that such highlighting, graying-out or other identifications be cleared.

Figure 26:
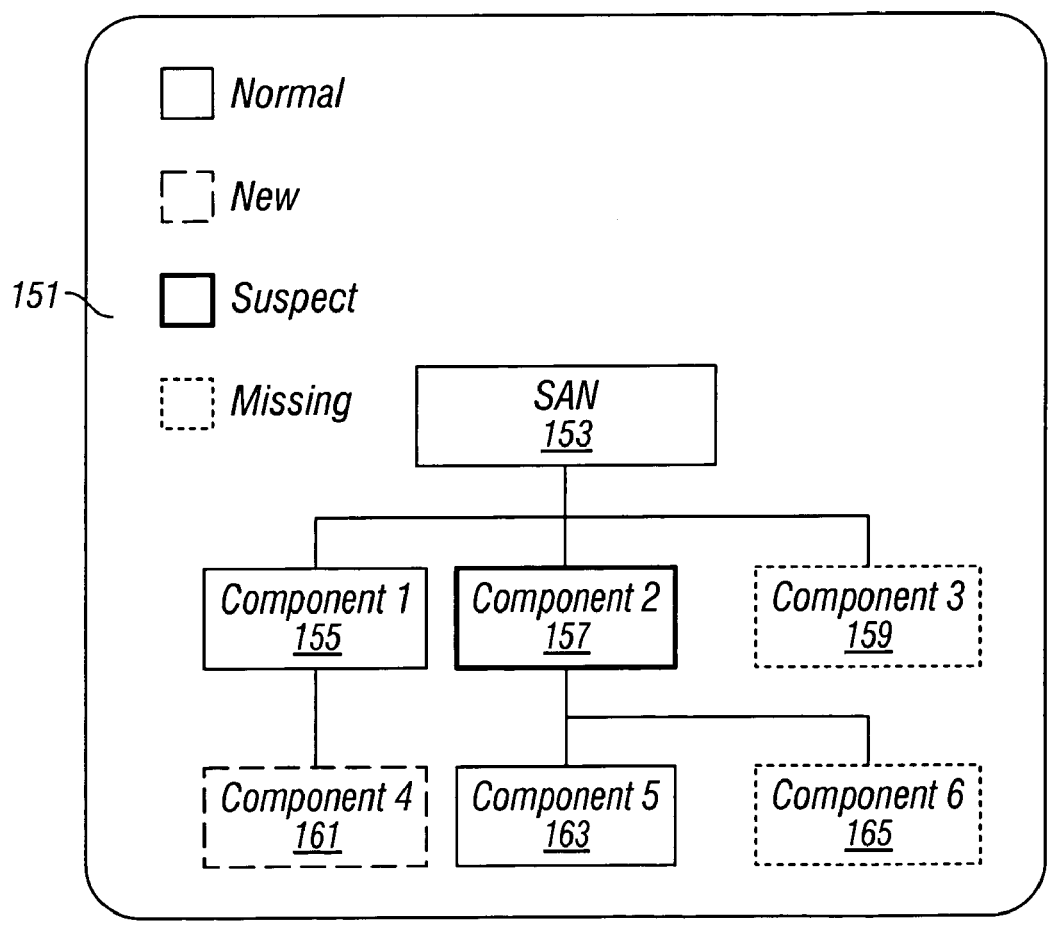
FIG. 26 depicts a display presented utilizing the models depicted in FIG. 25.

Such a display is depicted in FIG. 26. Shown there is a hierarchical display 151 of the type presented on the operator/administrator console. This includes a graphical object (e.g., icons) representing the SAN as a whole, to wit, element 153, and graphical objects representing the components thereof, here illustrated as Components 1–6 (elements 155, 157, 159, 161, 163, 165). It will be appreciated that the specific form of the display can be varied depending on operator preferences and needs. Moreover, it will be appreciated that representations other than graphical objects (e.g., text labels, and so forth) may be used.

In the illustration, Component 3 (element 159) and Component 6 (element 165) are color-coded to indicate that they were newly added to the SAN since the last console presentation to the operator/administrator and/or since the he last cleared the updates. Component 4 (element 161) is identified as missing (e.g., and likely removed from the SAN), while Component 2 (element 157) is identified as suspect. In the illustrated embodiment, a component is deemed "suspect" if its status has been reported inconsistently among the scans in which it appears. Though color coding (or shading) is used in the illustrated embodiment, it will be appreciated that any range of visual, aural or other sensory indicators can be employed to identify the status of displayed, updated components (e.g., Components 2, 3, 4, 6).

In contrast to having every object in model store 125 maintain status history for its respective component, reference objects 130 (hereinafter, "HistoryData" objects) are (instantiated and) maintained in the store 128 for only those SAN components whose statuses have changed, e.g. since the time last displayed to the operator/administrator and/or since the he last cleared the updates. In the illustrated embodiment, each HistoryData object 120 includes a unique identifier referencing the SAN object 126 to which it pertains, and further includes an indicator of the status of the underlying component (e.g., "new", "missing", "broken", "moved", "needs attention", "attribute change" or "suspect"). Those skilled in the art will appreciate that other embodiments may use other statuses in addition or instead (e.g., modified, offline, format degraded, etc.) It will also be appreciated that the HistoryData object may maintain additional information (e.g., time stamps, etc.) Moreover, it will be appreciated that in the illustrated embodiment, no HistoryData object is maintained for objects (and underlying components) in model 125 whose status is "Normal".

As above, the HistoryData objects can be object-oriented programming "objects" or other constructs suitable for these purposes. Also as above, the HistoryData objects are preferably stored in a persistent manner, as well in a runtime form.

The HistoryData objects are generated by the manager service 38 or other functionality in the SAN manager based on a component's prior status and its current condition as reported by discover engine 40 (which, in turn, is based on information contained in the scans the discover engine receives from the agents). Thus, for example, an object whose prior status was "broken" and which is reported by the discover engine as being "new" is assigned a status of "suspect" in a corresponding history object. More particularly, in one embodiment, the status of components as reflected by HistoryData objects is determined in accord with the following table:

| Current State | Reported Condition | Resulting State |
| --- | --- | --- |
| Normal | Normal | Normal |
| Normal | New | Not Valid |
| Normal | Missing | Missing |
| Normal | Off-line | Offline |
| Normal | Broken | Broken |
| Normal | Attribute Changed | Attribute Changed |
| Normal | Needs Attention | Needs Attention |
| Normal | Moved | Moved |
| New | Normal | New |
| New | New | New |
| New | Missing | Missing |
| New | Off-line | Offline |
| New | Broken | Broken |
| New | Attribute Changed | Attribute Changed |
| New | Needs Attention | Needs Attention |
| New | Moved | Moved |
| Missing | Normal | Suspect |
| Missing | New | New |
| Missing | Missing | Missing |
| Missing | Off-line | Offline |
| Missing | Broken | Broken |
| Missing | Attribute Changed | Attribute Changed |
| Missing | Needs Attention | Needs Attention |
| Missing | Moved | Moved |
| Off-line | Normal | Suspect |
| Off-line | New | Not Valid |
| Off-line | Missing | Missing |
| Off-line | Off-line | Offline |
| Off-line | Broken | Broken |
| Off-line | Attribute Changed | Attribute Changed |
| Off-line | Needs Attention | Needs Attention |
| Off-line | Moved | Moved |
| Broken | Normal | Suspect |
| Broken | New | Suspect |
| Broken | Missing | Missing |
| Broken | Offline | Offline |
| Broken | Broken | Broken |

-continued

| Current State | Reported Condition | Resulting State |
|---|---|---|
| Broken | Attribute Changed | Attribute Changed |
| Broken | Needs Attention | Needs Attention |
| Broken | Moved | Moved |
| Attribute Changed | Normal | Attribute Changed |
| Attribute Changed | New | Not Valid |
| Attribute Changed | Missing | Missing |
| Attribute Changed | Off-line | Offline |
| Attribute Changed | Broken | Broken |
| Attribute Changed | Attribute Changed | Attribute Changed |
| Attribute Changed | Needs Attention | Needs Attention |
| Attribute Changed | Moved | Moved |
| Needs Attention | Normal | Suspect |
| Needs Attention | New | Not Valid |
| Needs Attention | Missing | Missing |
| Needs Attention | Offline | Offline |
| Needs Attention | Broken | Broken |
| Needs Attention | Attribute Changed | Needs Attention |
| Needs Attention | Needs Attention | Needs Attention |
| Needs Attention | Moved | Moved |
| Suspect | Normal | Suspect |
| Suspect | New | Not Valid |
| Suspect | Missing | Missing |
| Suspect | Offline | Offline |
| Suspect | Broken | Broken |
| Suspect | Attribute Changed | Attribute Changed |
| Suspect | Needs Attention | Needs Attention |
| Suspect | Moved | Moved |
| Moved | Normal | Moved |
| Moved | New | Not Valid |
| Moved | Missing | Missing |
| Moved | Offline | Offline |
| Moved | Broken | Broken |
| Moved | Attribute Changed | Attribute Changed |
| Moved | Needs Attention | Needs Attention |
| Moved | Moved | Moved |

Of course, those skilled in the art will appreciate that other embodiments might have different resulting states, depending on the current state and reported condition of a component. Moreover, it will of course be appreciated that other embodiments may use other states instead or in addition.

No HistoryData objects are generated for components whose status is "Normal." Nor are any generated for those whose state is "Not Valid." In the event the resulting state of a component is the latter, the manager service 38 generates a notification to the operator/administrator and/or to a log file, at the same time removing the component from the topology representation.

When the operator/administrator requests a topological display of the SAN, e.g., of the type shown in FIG. 26, the manager 20 can generate graphical objects 153, and so forth, representing components (and interrelationships) in the internal model 125. It can, then, scan the objects in the HistoryData object database 128 to determine which graphical objects require color-coding or other modification to indicate the "new," "suspect," "missing" or other statuses. Those skilled in the art will, of course, appreciate that the display generation can proceed in reverse or other order based on the content of the stores 125 and 128.

Likewise, when the operator/administrator requests that the model display 151 be updated to "clear" or incorporate the changes indicated by color coding (or otherwise), e.g., to no longer highlight Components 3 and 6 as new, to no longer display missing Component 4, and to no longer display suspect Component 2, the manager 20 scans the store 128 to determine which graphical objects in the display 151 require updated display (e.g., with no highlighting).

In the illustrated embodiment, a different action is taken depending on the particular state of each displayed graphical object. For example, the table below list some exemplary states of objects in a SAN representation 151, and the actions taken upon administrator/operator request for updating.

| Object's Current State | Action Taken |
|---|---|
| Normal | (no action) |
| New | Change the state to "Normal" and delete HistoryData object) |
| Missing | Remove the object from the model and delete HistoryData object) |
| Suspect | Change the state to "Normal" (and delete HistoryData object) |
| Off-Line | (no action) |
| Broken | (no action) |
| Attribute Change | Change the state to "Normal" (and delete HistoryData object) |
| Moved | Change the state to "Normal" (and delete HistoryData object) |
| Needs Attention | Change the state to "Normal" (and delete HistoryData object) |

In addition to use in connection with presentation of the display 151, objects in the HistoryData store 128 can be used by the manager 20 in connection with internal determination of the SAN topology. For example, the manager 20 can send requests to the agents for re-scanning of components identified as "suspect." By way of further example, the manager can wholly or partially delay processing of "new" or "missing" components pending acknowledgement by the operator/administrator via the aforementioned clear history operation, or the like.

LUN Selection For File System Extension

As discussed above, if a host 12 file system utilization exceeds a pre-defined threshold, its respective agent transmits a request to the SAN manager for file system extension. The agent determines the necessity of transmitting such a request by periodically checking host file system utilization, e.g., at a pre-set interval determined by the operator or otherwise. Alternatively, or in addition, it can monitor requests made by the host to its file system and/or monitor the LUNs assigned to the host as part of that file system.

Upon receipt of an extension request from an agent, the SAN manager 20—and, particularly, policy engine 38A (FIGS. 7A and 7B)—determines if the host is eligible for file system extension and, if so, whether any of the storage devices (LUNs) accessible to it (and available for assignment) meet the extension criterion for that host. If affirmative on both counts, the manager 20 assigns the requisite LUNs to the host in the manner described above.

More particularly, in the illustrated embodiment, when the file system monitor 80 (FIG. 17) detects that a the file utilization of a host has exceeded a pre-defined threshold, for example, via receiving a message from the host's respective agent, an event is sent to the SANStorAuto 78. The policy engine 38a receives this event and determines if the file system can and/or should be extended, or if only notification is required. If the file system should be extended, then the policy engine determines what LUN to use and requests that the LUN be assigned to by the SANLunMgr 72. Once the LUN is assigned, a File System Extension service (SAN-AgenFSExtend) 84 is called to perform the extension by utilizing the host local operating system to extend the file system onto the newly assigned LUN. As used herein, a file system is that aspect of the host operating system or otherwise that manages or otherwise effects access by the host to files and other information on the assigned storage devices (LUNs) in the conventional manner.

In the illustrated embodiment, both the host eligibility and extension criteria are set by the operator/administrator on a host-by-host basis, or based on a hierarchical host group structure, as discussed below, though they can be set by default (e.g., based on characteristics of the host) or otherwise. For example, using the GUI interface 98, the operator/administrator can define certain hosts as ineligible for file system extension, in which case overutilization by those will have the conventional consequences (e.g., file system warnings and/or errors). Likewise, the operator/administrator can define other hosts as eligible for extension and, more particularly, can define the minimum (lower bound) and maximum (upper bound) available storage capacity of any storage devices assigned the host for that purpose.

Figure 27:
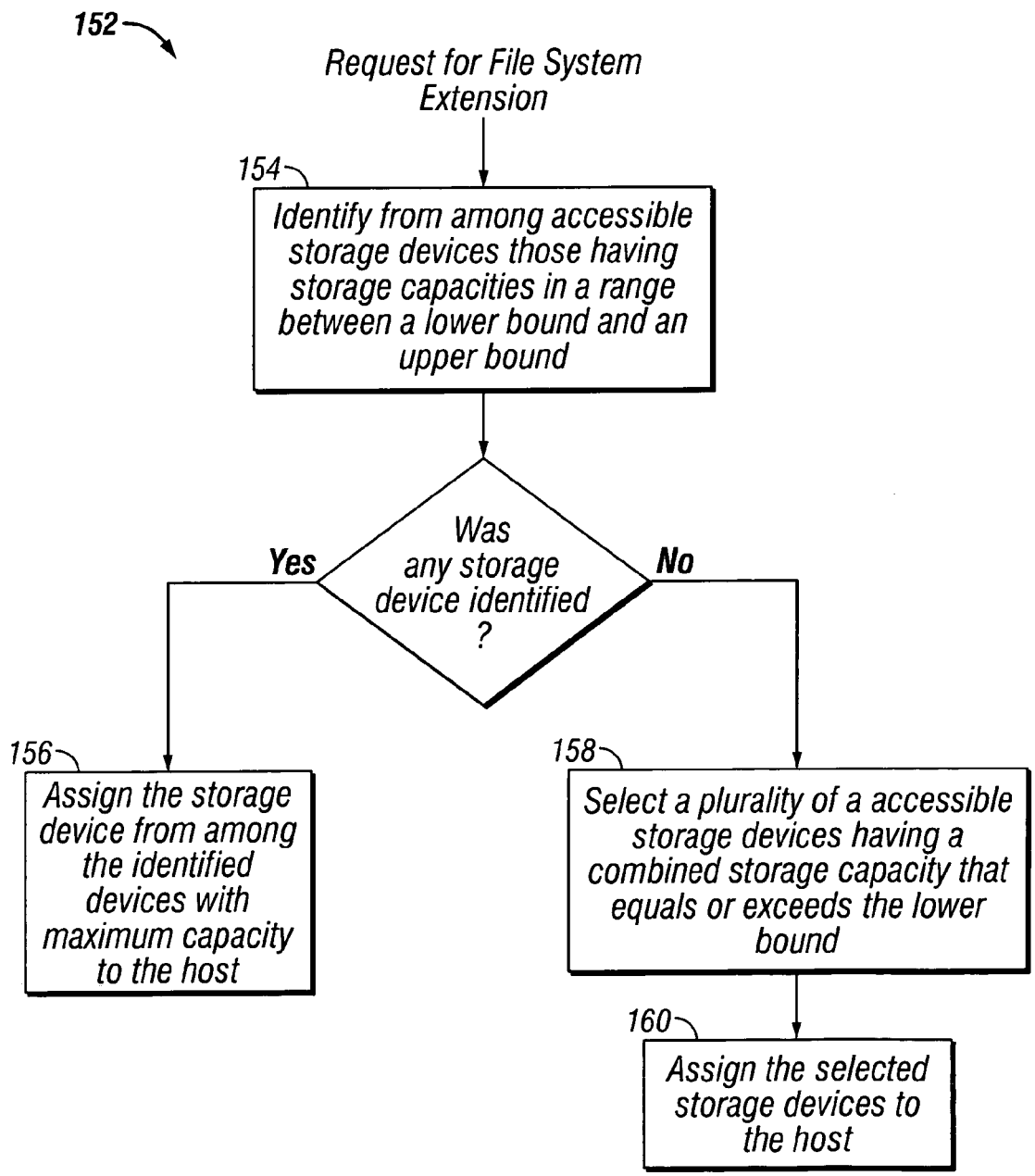
FIG. 27 is a flow chart illustrating a method for responding to a file extension request issued on behalf of a host by its associated agent.

Upon receipt of a file extension request on behalf of an eligible host, the SAN manager selects from among the storage devices accessible to that host based on that minimum and maximum as follows. Referring to the flow chart 152 of FIG. 27, in step 154, the SAN manager identifies individual storage devices (LUNs), accessible to the host and otherwise available for assignment to it (e.g., in the manner described above), whose available storage falls within the range defined by the minimum and maximum. In the case of a host that utilizes a RAID file system with striping, the SAN manager identifies such storage devices where the range of available storage falls between the minimum divided by (s) and maximum divided by (s), where (s) is the number of stripes specified for that file system.

In step 156, the manager selects, from among the identified storage devices (LUNs), the storage device that has a maximum storage capacity, and assigns this storage device to the requesting host, for example, in a manner described above in the section entitled "Lun Management." Further, in some embodiments, the manager can make this selection and assignment from among storage devices of specific type or characteristic (e.g., as defined for the host by the operator/administrator or otherwise).

In the absence of any storage device with a storage size in a range between the lower and the upper capacities (both, divided by (s), in the case of a striped file system), in step 158, the manager selects a pair or other combination of accessible and available storage devices whose combined storage capacity equals or exceeds the minimum (divided by (s), in the case of a striped file system) for the host in question, but does not exceed the maximum (divided by (s), in the case of a striped file system) for that host. In one embodiment, the manager begins this selection process with an accessible/available storage device having the largest storage capacity. The manager continues by selecting additional storage devices, for example, in a descending order by storage size, until the combined storage capacity of the selected storage devices equals or exceeds the minimum storage capacity and does not exceed the maximum (again, where both the minimum and maximum are divided by (s), in the case of a striped file system). If a suitable combination of two or more storage devices is found, in step 160, the manager assigns the selected storage devices to the requesting host.

In addition to storage size, accessibility and availability, the manager can employ other criteria for selecting a storage device for assignment to a host requesting file system extension. For example, the SAN manager can eliminate from the selection process any storage device (LUN) whose assignment to the host in question (or any host) in response to a previous file extension request, had failed—e.g., as a result of hardware failure, software failure or otherwise. The removal of such storage devices from selection menu can advantageously ensure a more efficient file system extension by minimizing the probability that the assignment of a selected storage device that may fail a second (or subsequent) time.

In some embodiments of the invention, one or more storage devices coupled to the SAN utilize RAID (Redundant Array of Independent Disks) storage systems in which part of the physical storage capacity is employed to store redundant data or corresponding control information (e.g., error checking codes). As known in the art, RAID systems are typically characterized under designations such as RAID 0, RAID 1, RAID 2, RAID 5, and so forth.

Typically, the disks are divided into equally sized address areas, typically referred to as "blocks." A set of blocks from each disk that have the same unit address ranges are referred to as "stripes". RAID 0 architecture relates to a disk system that is configured without any redundancy. RAID 1 architecture utilizes mirror redundancy, and RAID 5 architectures employs parity-type redundant storage. For example, in a RAID 5 system, data and parity information are distributed across all of the system disks. In a RAID 5 system, each stripe includes N blocks of data and one parity block. A RAID '0+1' system, as used herein, employs multiple mirror redundancies for each stripe, and a RAID '1+0', as used herein, employs multiple stripes for each mirror redundancy.

When extending a software RAID file system of a host, it is typically necessary to assign multiple storage devices (LUNs) of the same size to allow for redundant data storage. The SAN manager utilizes a methodology described below to determine the number of storage devices (LUNs) of the same size that are needed for assignment to a host, having access to a RAID file system, that is requesting file system extension.

In particular, the SAN manager utilizes the following algorithm to determine the number of storage devices (LUNs) to be assigned for different RAID file systems:

For a Raid='1' file system having a number of mirror redundancies (m), the manager determines the number of LUNs (n) in accord with the relation:

$n=m+1$

For a Raid='0' file system having a number of stripes (s) greater than 1, the manager determines the number of LUNs (n) in accord with the relation:

$n=s$

For a Raid='5' file system having a number of stripes (s) greater than two, the manager determines the number of LUNs (n) by in accord with the relation:

$n=s$

For a Raid='0+1' file system having a number of stripes (s) and a number of mirror redundancies (m), the manager determines the number of LUNs (n) by in accord with the relation:

$n=s*(m+1)$

For a Raid='1+0' file system having a number of mirror redundancies (m) and number of stripes (s), the manager determines the number of LUNs (n) by in accord with the relation:

$n=(m=1)*s$

Large Scale Mechanism for Rendering a SAN Topology

As discussed above, the SAN manager (FIG. 15, item 20) provides a graphical user interface (GUI) to display components of the SAN topology, such as, the hosts, the storage devices, along with their interconnections and attributes. Particularly, as an example of a GUI utilized by the SAN manager 20 of the invention, FIG. 16 illustrates a display 100 in a portion of which a storage device, and its selected attributes (e.g., serial number, product Id) are shown. The storage device is identified in a first panel, while its selected attributes are displayed in a second panel that is vertically separated from the first. Selection of the storage device in the first panel (by clicking on the icon representing the storage device) results in the display of its properties in the second panel.

In the illustrated embodiment of the invention, the SAN manager 20 drives a GUI to render large SAN topology configurations using a hierarchical, multi-view approach. The hierarchy is based on division of the SAN topology into "segments" which are separated from one another by the elements that make up the interconnect fabric 16, e.g., switches, hubs. The segments are then layered in a structural arrangement that allows the manager 20 to generate a display that hierarchically presents the SAN topology. As used here, a segment refers to portion of the SAN containing multiple components (e.g., hosts 12, storage device 14, SAN manger 20)—typically, though not necessarily, interconnected—whether represented as (i) individual components and/or (ii) one or more further segments. At a high hierarchical level, a segment can refer to the entire SAN or even multiple SANs in an enterprise (see, for example, FIG. 28). At a low level, a segment can refer to an individual component. At intermediate levels, it can refer to segments of the type illustrated in the main panels of FIGS. 29–32.

The manager 20, using for example the interface illustrated in FIG. 15 and/or the NetView interface functionality shown in FIG. 6, generates a display of the segment layers comprising the SAN topology representation on the operator/administrator console consoles 22a, 22b (or other graphical HMI devices of the type discussed above in connection with FIG. 2). In the illustrated embodiment, the display contains multiple panels. The main panel depicts a current segment or layer of the hierarchy. One or more navigation panels (each containing one or more icons), e.g., located along the bottom and/or side of the display, permit traversing of the hierarchy.

In the main panel, the manager 20 presents graphical objects (e.g., icons) representing the devices or segments at a current level of the and the elements that make up the interconnect fabric 16 that connect those devices or segments. The manager 20 responds to operator/administrator selection of those icons for selectively presenting lower layers (drilling down) into the hierarchy, or displaying properties of the selected element. Further understanding of the illustrated embodiment can be realized from the discussion below.

Figure 28:
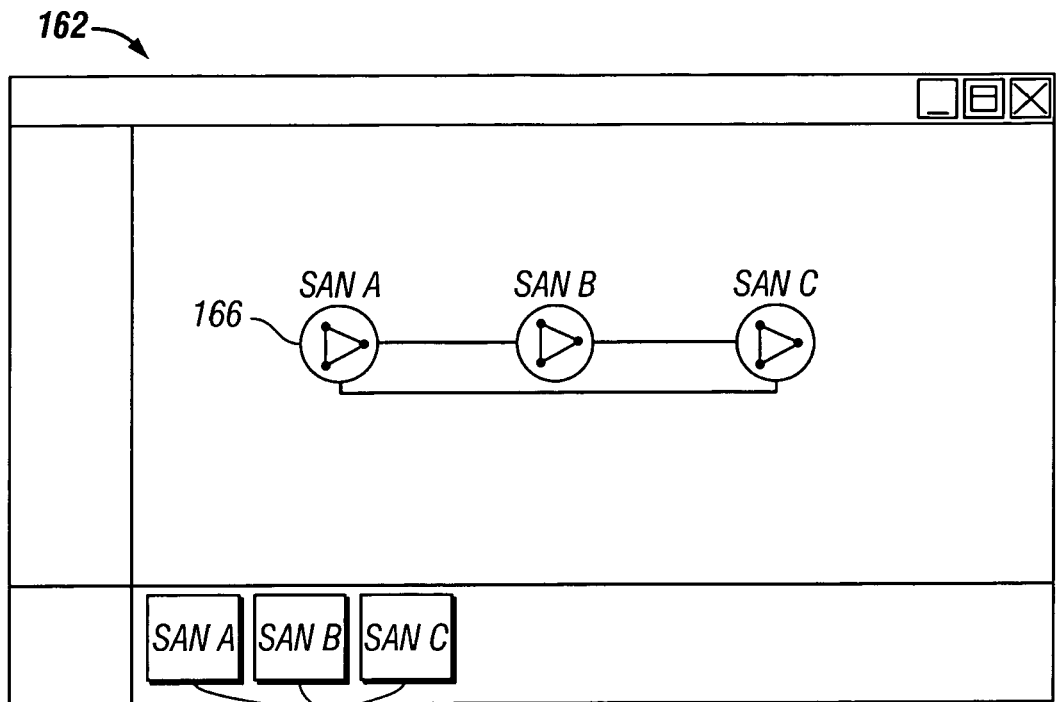
FIGS. 28–32 depict renderings of a SAN topology in a system according to the invention.

FIG. 28 depicts a top-level (root) view 162 that comprises a representation of all the SANs 166 known to the SAN manager described above. The view 162 contains one or more graphical objects (e.g., icons) 164, each representing one of the SANs 166 known to the SAN manager 20. A detailed view of a particular SAN and its components can be displayed by selecting the corresponding graphical object 164 residing in the navigation panel. It will be appreciated that the specific form of the display can be varied depending on operator preferences and needs. Moreover, it will be appreciated that representations other than graphical objects (e.g., text labels, and so forth) may be used.

Figure 29:
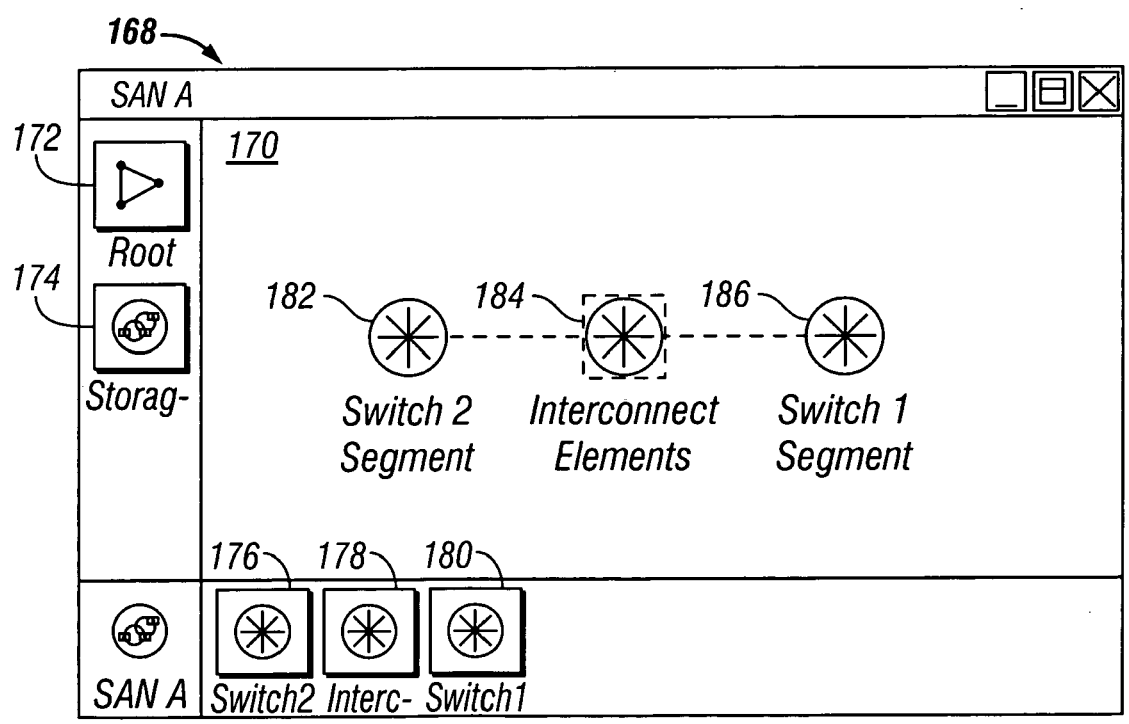

FIG. 29 depicts the detailed SAN view 168 that is displayed upon selection of the corresponding graphical object (FIG. 28, item 164). The SAN view 168 contains a SAN map 170 (located in the main panel of the display) that is a representation of elements 182, 184, 186 that comprise the SAN and are associated with that level in the hierarchy. The displayed elements are graphical objects that represent two switches 182, 186, and an interconnect element 184 that have corresponding segment maps and an interconnect element map.

Graphical objects 176, 178, 180 (located in the navigation panel of the display) are provided for selecting and displaying detailed views of a particular segment map, or interconnect element map. Alternatively, items 182, 184, and 186 (displayed in the main panel) can be selected directly to display a particular segment map. For example, by selecting the interconnect element graphical object 178, the corresponding map (FIG. 30 described below) is displayed.

By selecting the various graphical objects, an administrator can traverse the layers of segments that make up the hierarchy. Recovery back to higher levels of the hierarchy can be achieved by selecting the root graphical object 172 or the SAN graphical object 174, which reverts the display to that depicted in FIG. 28 and FIG. 29 respectively.

Figure 30:
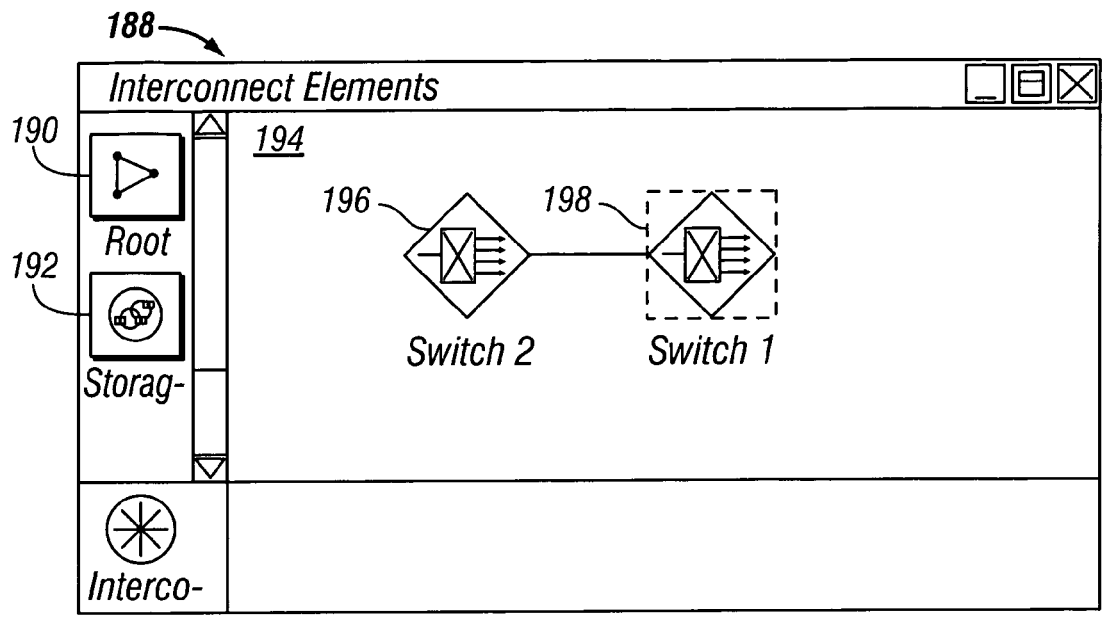

FIG. 30 depicts the interconnect elements 188 that are displayed as a result of selecting the interconnect element graphical objects (FIG. 29, item 178 or item 184). The interconnect element map 194 (located in the main panel of the display) contains graphical objects 196, 198 for each of the interconnect elements (switches and hubs) in the SAN. Graphical objects 190, 192 are also provided in the navigation panel for traversing the different levels of the hierarchy. Selecting a graphical object 196, 198 on the map 194 displays the properties of the specified interconnect element.

Figure 31:
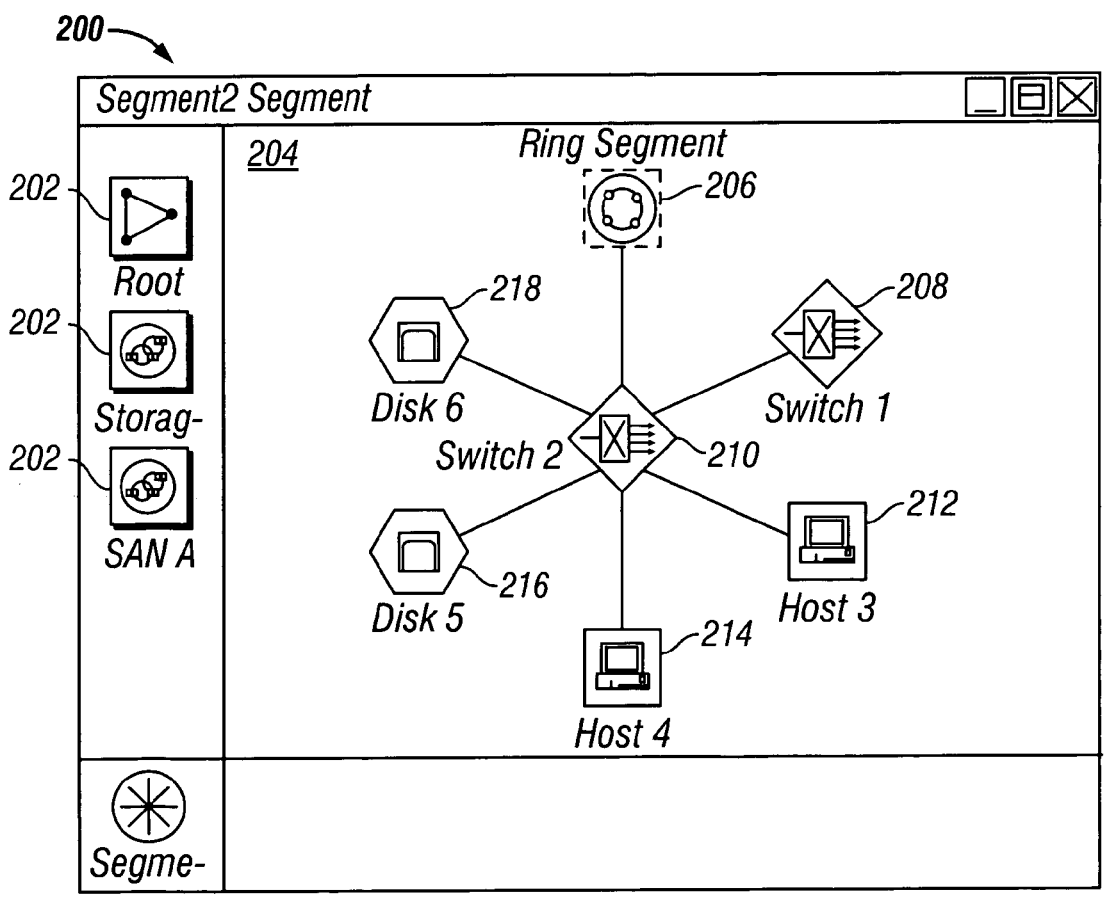

The illustrated embodiment provides multiple types of segment maps. One is the interconnect element segments (FIG. 30, discussed above) which are accessed from the SAN map (FIG. 29, discussed above). These maps contain the interconnect element and the devices directly connected to the interconnect element as well as the connections (FIG. 31, discussed below). Another type of segment map is the default segment that is used when there are no interconnect elements in the SAN. This segment simply contains the set of devices that comprise the SAN.

FIG. 31 depicts a segment map display 200 containing a set of devices 206, 212, 214, 216, 218, and interconnect elements 208, 210. Graphical objects 202 are provided for traversing the associated levels of the hierarchy. The segment map 204 could be displayed, for example, as a result of an administrator selecting the segment graphical object (FIG. 29, items 186 or 180) on the SAN map (FIG. 29, item 170).

The displayed map 204 contains a graphical object for the interconnect element 208, and graphical objects for each of the devices 212–218 connected to the switch 210. The devices 212–218 can comprise hosts, storage devices, and other elements. Each of the devices 212–218 is connected to a respective port on the switch 210. Item 206 denotes that there are multiple devices connected to a particular port on switch 210, and therefore comprises a segment of its own. Selecting item 206 in the main panel displays the corresponding map shown in FIG. 32.

Figure 32:
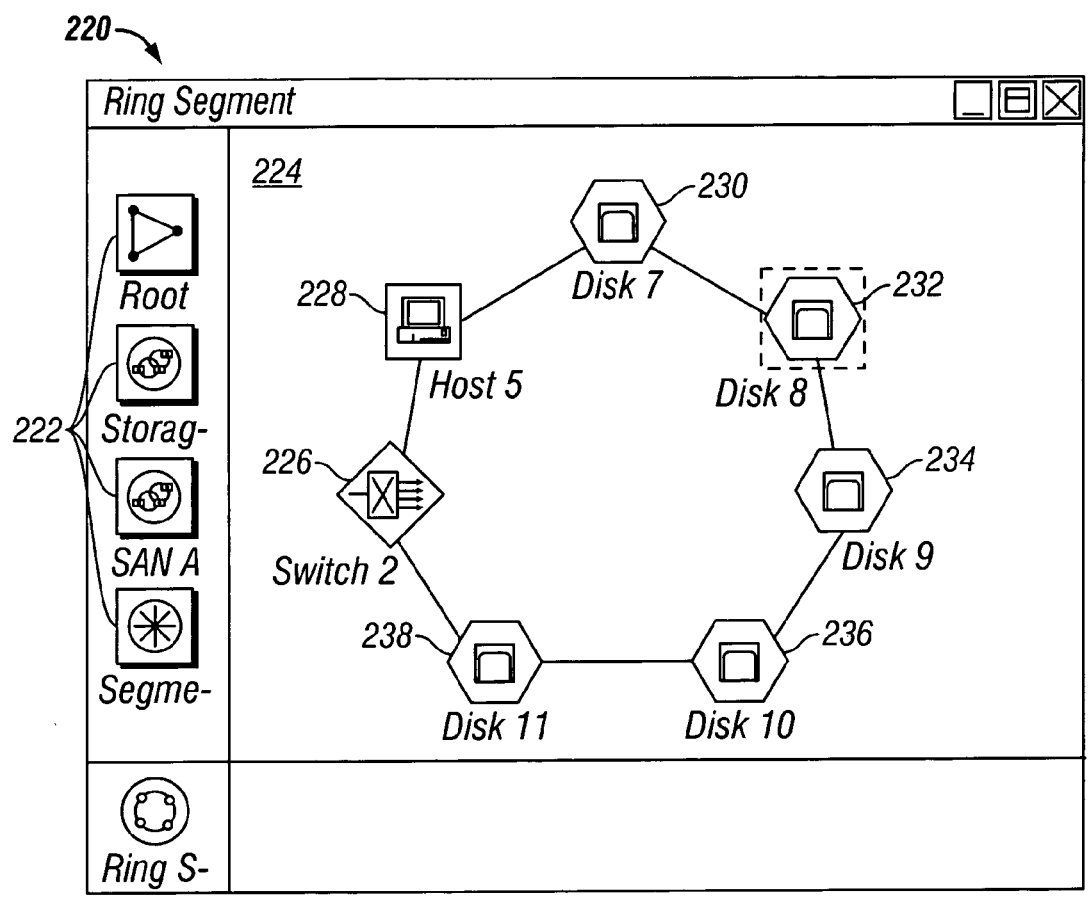

FIG. 32 depicts a ring segment 220, which is another type of segment map that is used when there is more than one device 228–238 connected on a particular port of a switch 226. Instead of displaying all of the devices on the interconnect element map they are instead represented by a nested ring segment graphical object (FIG. 31, item 206). Selecting (drilling into) the graphical object displays the devices 228–238 that comprise the ring segment 224.

In some embodiments of the invention, the selected status of components or interconnects is displayed in alternate form, e.g., highlighted with different colors, blinking, or having a textual message, to indicate the particular status, e.g., failed, missing, suspect, etc. In addition, the display of segments containing such components can be similarly altered to reflect that they contain components or interconnects of such status, e.g. failed. For example, referring to FIG. 32, a failure of item 238 results in the failure status getting propagated through all of the screens presented by the display. The failing device 238 on segment map 224 results in the upper level maps indicating a failure within the hierarchy. Selecting the icons at each level that indicate failure status will eventually reach the map showing the failed component 238.

In still other embodiments of the invention, there is provided a "default" segment that is displayed as containing all devices (e.g., hosts and storage devices) for which the SAN manager 20 does not have connection information.

Hierarchical File System Extension Policy

As noted previously, the manager 20 utilizes a "policy" to extend file systems on host machines 12. Thus, for example, referring to FIG. 27, the manager 20 responds to a file system extension request from an agent 24 to assign storage devices 14 to the associated host 12 based on a policy that establishes maximum and minimum extension size boundaries for that host.

More particularly, in the illustrated embodiment, associated with each host 12 is a set of attributes defining a policy for file system extension. These include a monitor flag indicating whether or not the file system of the host is being monitored by its associated agent;

an extend flag indicating whether or not the host file system can be extended;

a threshold value defining a point at which the host file system is to be extended;

a LUN group defining storage devices onto which the file system can be extended;

an extension minimum size defining the minimum increment by which a file system can be extended;

an extension maximum size defining the maximum increment by which a file system can be extended;

a max file system size defining the maximum size a file system can be; and an alert interval defining how often event notification is provided.

Those skilled in the art will, of course, appreciate that other attributes can be used, in addition and/or instead of the foregoing, to define the policy for each host. Moreover, though the discussion below is primarily focused on definition and application of attributes (and, thereby, policies) for hosts, these teachings are applicable, as well, toward definition of policies for other SAN components, such as storage units (or LUNs) 14, as well as for interconnect elements 16.

Policy attributes for the hosts 12 are defined by default and/or by the operator/ administrator, as discussed below in the section entitled "Display And Management Of A Policy Hierarchy." Those attributes can be defaulted and/or assigned on a host-by-host basis. However, they can also be inherited from attributes assigned (by default and/or the operator/administrator) to any of several hierarchical groupings in which each host, group of hosts, or file systems belongs, so as to facilitate the definition and application of uniform policies among the hosts 12 (or other SAN components).

In the illustrated embodiment those hierarchical groupings are, proceeding from highest to lowest: (i) domain level or default policy; (ii) host group policy; (iii) host policy, and (iv) file system policy. The domain level is the root node in the policy hierarchy and establishes the default attributes for all hosts 12 in the SAN. The host group policy defines policy attributes for each host group, of which there can be zero, one or more—as defined by default (e.g., based on host type, location, or other characteristics) or by the operator/administrator. The host policy defines the policy attributes for a give host and, by default, applies to all of its file systems. A file system policy defines attributes of each file system maintained by a host. In alternate embodiments, greater or fewer hierarchical groups can be employed, as can groupings other than or in addition to those listed here.

In the illustrated embodiment, policy attributes not defined at a specific level in the hierarchy are inherited. Thus, each file system inherits the policy attributes of the host in which it (the file system) resides, except for those attributes defined for that file system. Each host, in turn, inherits policy attributes of the host group in which it resides, except for those attributes defined for that particular host. Each host group, moreover, inherits policy attributes for the domain level, except for those attributes defined for that particular host.

Figure 33:
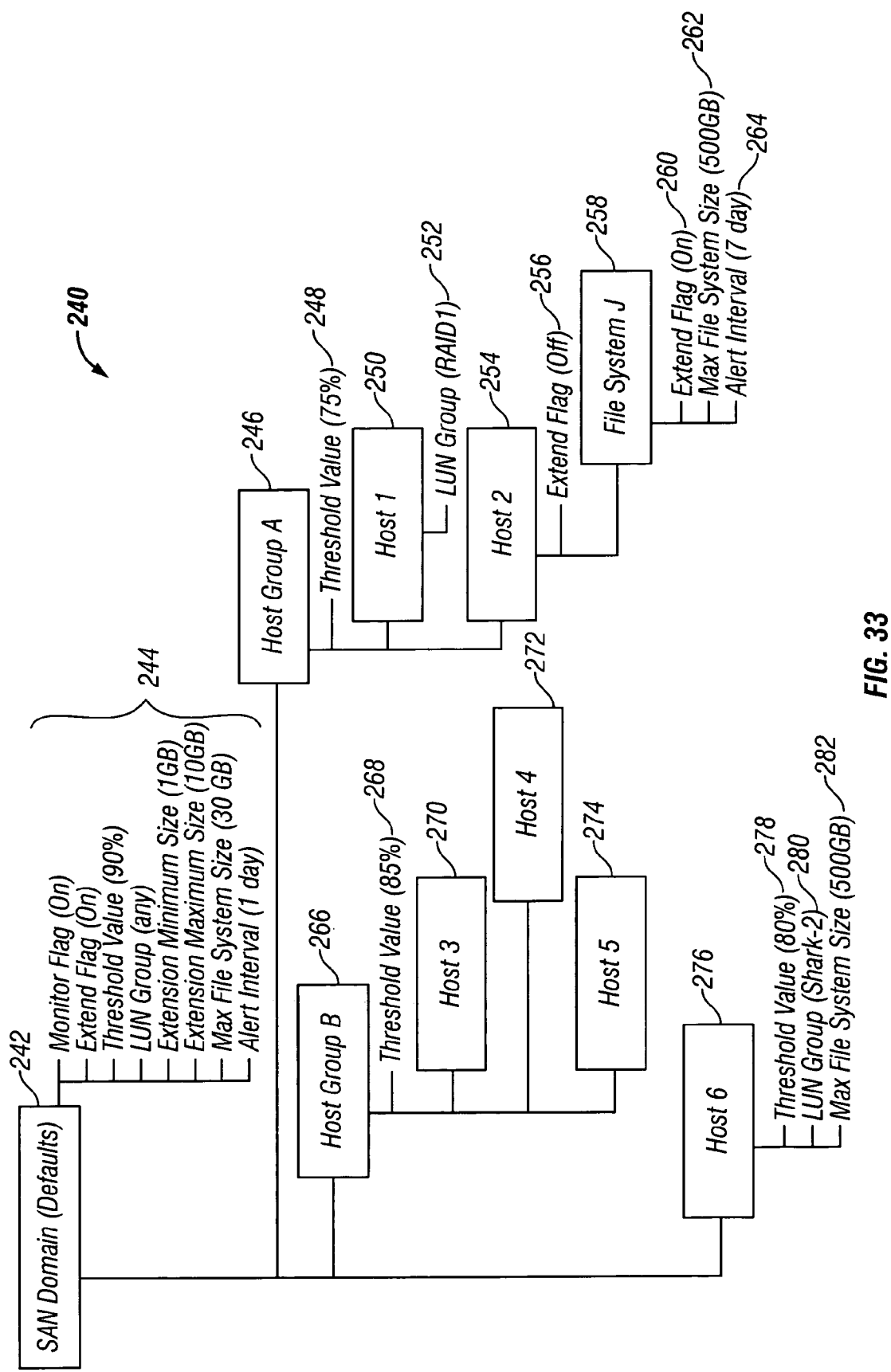
FIG. 33 depicts a hierarchical file extension policy system according to the invention.

FIG. 33 illustrates an example of a policy hierarchy 240 utilized in the SAN manager 20 in accordance with an embodiment of the present invention. The SAN domain 242 is the root level of the policy hierarchy, and contains a set of parameters 244 that represent a fixed set of policy attributes that are inherited by lower levels in the policy hierarchy 240, unless overridden at those levels.

Illustrated attributes 244 include a monitor flag, extend flag, threshold value, LUN group, extension minimum size, extension maximum size, max file system size, and alert interval, all as defined above. Though as noted above other attributes can be used in addition or instead. Sample values for these parameters are shown in parenthesis. For example, in the illustration a default value for the monitor and extend flags is "on"; a default threshold value is 90% and so forth.

Host group 246 defines a policy for two hosts 250, 254. A threshold value 248 is established for this group that overrides the default threshold value 244 that was defined at the domain level 242. Therefore, both hosts 250, 254, and the file system 258 will inherit the new threshold value 248 rather than the default attribute 244.

In the illustration, host 250 itself has a policy attribute that overrides the default LUN group attribute 244: here, specifying that any file system extension will utilize a LUN from the RAID1 group 252. In addition to the selected LUN group 252, the attributes pertaining to the first host 250 include the threshold value 248 defined by the host group 246, and all other default attributes 244 defined in the SAN domain 242. The manager 20 utilizes these attributes when extending a file system associated with the first host 250.

The second host 254 overrides the extend flag default 244 by setting a new value 256. The host 254 also inherits the threshold value 248 from the host group 246. All of the other policy attributes associated with the host 254 are inherited from the established defaults 244 set in the SAN domain 242. The manager 20 to extend file systems associated with the second host 254 utilizes these policy attributes.

A policy is also created on the second host 254 for file system 258. Attribute values are explicitly set for the extend flag 260, max file system size 262, and the alert interval 264. The file system 258 therefore does not inherit the extend flag value 256 that was set by the second host 254, because the explicit setting of the extend flag 260 overrides the earlier setting 256. The remaining attributes are inherited from the defaults 244 set in the SAN domain 242.

Host group 266 defines a policy for multiple hosts 270, 272, 274. A new threshold value 268 is defined that overrides the predefined default threshold value 244. This results in host3 270, host4 272, and host5 274, inheriting the new threshold value attribute 268. However, all other attributes will be inherited from the default list 244 as defined in the SAN domain level 242. Specifically, the multiple hosts 270, 272, 274 associated with the host group 266 have the following attributes in their policy definition: monitor flag (on), extend flag (on), threshold value (85%), LUN group (any), extension minimum size (1 GB), extension maximum size (10 GB), max file system size (30 GB), and alert interval (1 day).

The host 276 is not included in a host group 266, 246, and therefore inherits all the predefined attributes 244 from the SAN domain 242, except for those explicitly set. In this instance, the host 276 has explicitly set attribute values for a threshold value 278, LUN group 280, and max file system size 282.

In the illustrated embodiment, the policy hierarchy is represented by a hierarchy of object oriented programming (OOP) objects or other in runtime data structures. It is likewise persisted to a database (not shown), e.g., in the manner described above in connection with FIG. 13. In operation, the manager 20 access these runtime data structures and/or database to discern a policy for file system extension, e.g., in connection with the processing sequence described above in connection with FIG. 7A.

Display and Management of File System Extension Policy Hierarchy

As discussed above, the SAN manager (FIG. 15, item 20) provides a graphical user interface (GUI) to display components of the SAN topology, such as, the hosts, the storage devices, along with their interconnections and attributes. Particularly, as an example of a GUI utilized by the SAN manager 20 of the invention, FIG. 16 illustrates a display 100 in a portion of which a storage device, and its selected attributes (e.g., serial number, product Id) are shown. The storage device is identified in a first panel, while its selected attributes are displayed in a second panel that is vertically separated from the first. Selection of the storage device in the first panel (by clicking on the icon representing the storage device) results in the display of its properties in the second panel.

Continuing the discussion from the section entitled "File System Extension Based On A Hierarchical Policy Having Attribute Inheritance," the manager 20, using for example the interface illustrated in FIG. 15 and/or the NetView interface functionality shown in FIG. 6, provides a graphical user interface (GUI) on which the policy hierarchy is displayed and through which the policy attributes can be set or modified by the operator/administrator. The manager 20 generates the display so as to present the policy hierarchy and corresponding attributes in a first panel, while presenting list controls, dialog boxes or other editable fields for each policy and attribute value in a second panel (e.g., separated vertically from the first panel). As fields of the second panel are modified by the operator/administrator, those modifications are immediately presented in a refreshed hierarchical policy view on the first panel. In the illustrated embodiment, the manager maintains a constant display of policy attributes values at each level in the hierarchy, making the policy visible for all levels simultaneously.

Figure 34:
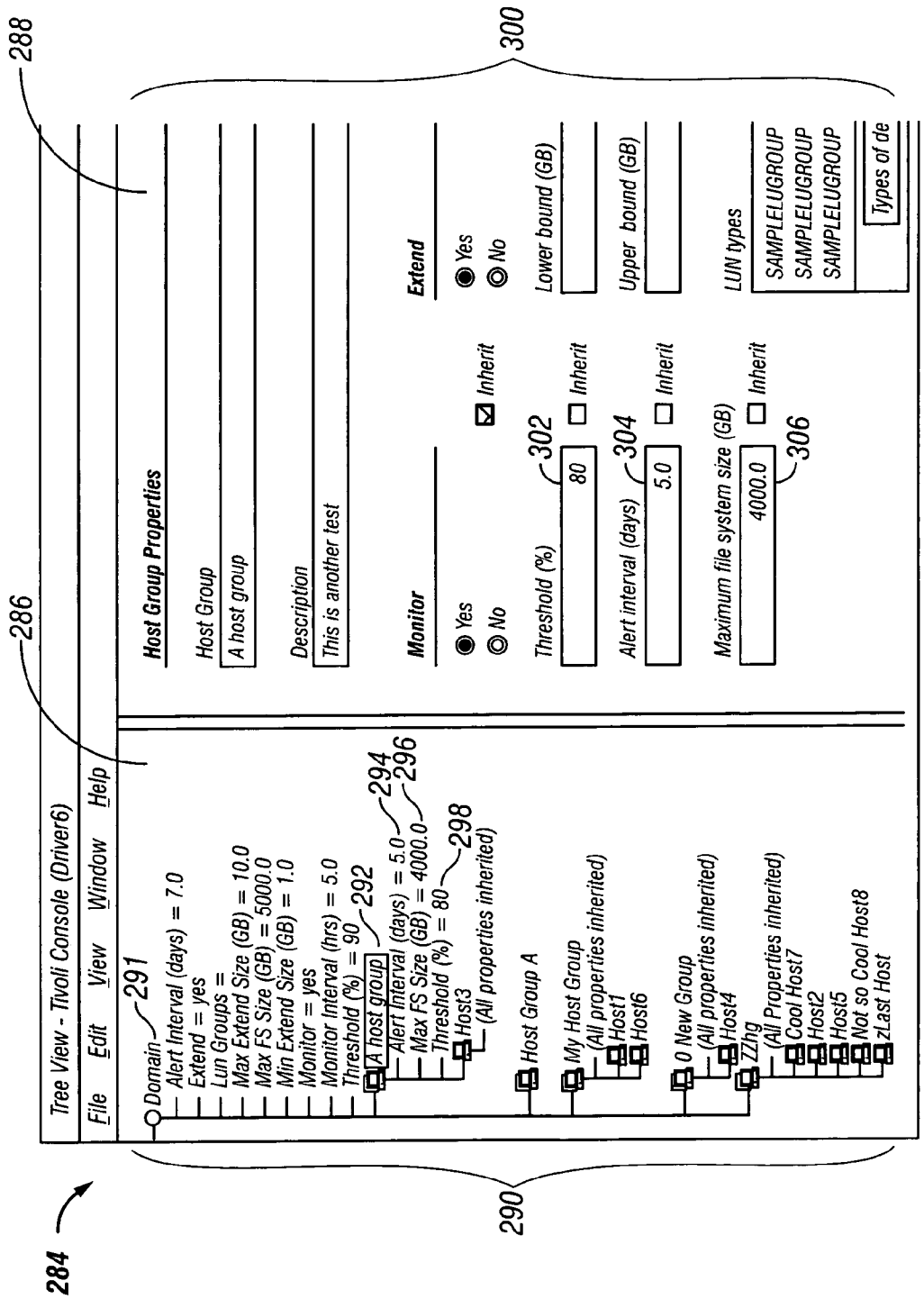
FIG. 34 depicts a graphical user interface display according to the invention for presentation and management of the hierarchical file extension policy of FIG. 28.

FIG. 34 illustrates a GUI generated by manager 20 for purposes of display and management of a policy hierarchy 284 in accordance with an embodiment of the present invention. The display 284 is separated into two vertical panels 286, 288, though will be appreciated that other screen arrangements may be utilized (e.g., horizontal panels, cascading panels, and so forth).

In the first panel 286, the manager 20 presents a hierarchical graphic 290 (in this case, in tree form—though other forms can be used instead or in addition) that represents the entire policy hierarchy for the SAN and the attribute values for each policy level. To avoid clutter, only override values are shown at each level, except for the domain level where all values are effectively "overrides." Thus, for example, branch 291 depicts all policy attributes at the domain level, while branch 292 depicts only the override values for Host Group A host group policy level (with items 294, 296, and 298 specifying the specific overrides for that group). For convenience, levels for which all values are inherited can be marked with a designator such as "(All properties inherited)."

The second panel 288 presents a plurality of editable fields 300 for all policy attributes for a policy level selected in the first panel, in this case policy 292. Through edit fields 300, the manager 20 permits the operator/administrator to modify the policies and inherited attribute values 290. Modifications made in any of the editable fields 300 in the second panel 288, are immediately represented in a refreshed view of the hierarchical policy structure 290 in the first panel 286. Moreover, any changes made to a value, in say, a host group level 292 changes the inherited value of that property on its associated hosts (host3).

For example, selection of a particular policy 292 in the policy hierarchy structure 290 displayed in the first panel 286, results in the display of editable fields 300 in the second panel 288 that correspond to attributes 302, 304, 306 and inherited attribute values of that policy 292. Changes made by an operator/administrator to the threshold value 302, alert interval 304, and maximum file system size 306 in the second panel 288 are immediately reflected in the corresponding values 294, 296, 298 in the policy hierarchy structure 290 displayed in the first panel 286.

Moreover, the modifications made to items 294, 296, 298 are inherited by the associated hosts (host3) of that host group 292. In this instance, host3 inherits the alert interval 294, max file system size 296, and threshold 298 from host group 292. All the other attributes of host3 are inherited from the default values at the domain level of the policy hierarchy 290.

LUN Masking on Windows NT Hosts

As discussed above, storage devices are assigned to the host devices 12 by the manager 20, which effects those assignments using the agents on the respective host devices. Referring back to FIG. 10 and the accompanying text, assigned LUN IDs are communicated to the hosts via the disk manager 76, which updates the filter drivers 79 on the respective hosts. When a host file system makes an attempt to mount a storage device, the filter driver 79 (FIG. 10) intervenes, comparing an identifier of the device being mounted against the assigned LUN IDs. The driver 79 fails devices for which there is not a match and succeeds (or at least passes for normal treatment by the operating system) those for which there is a match.

Figure 36:
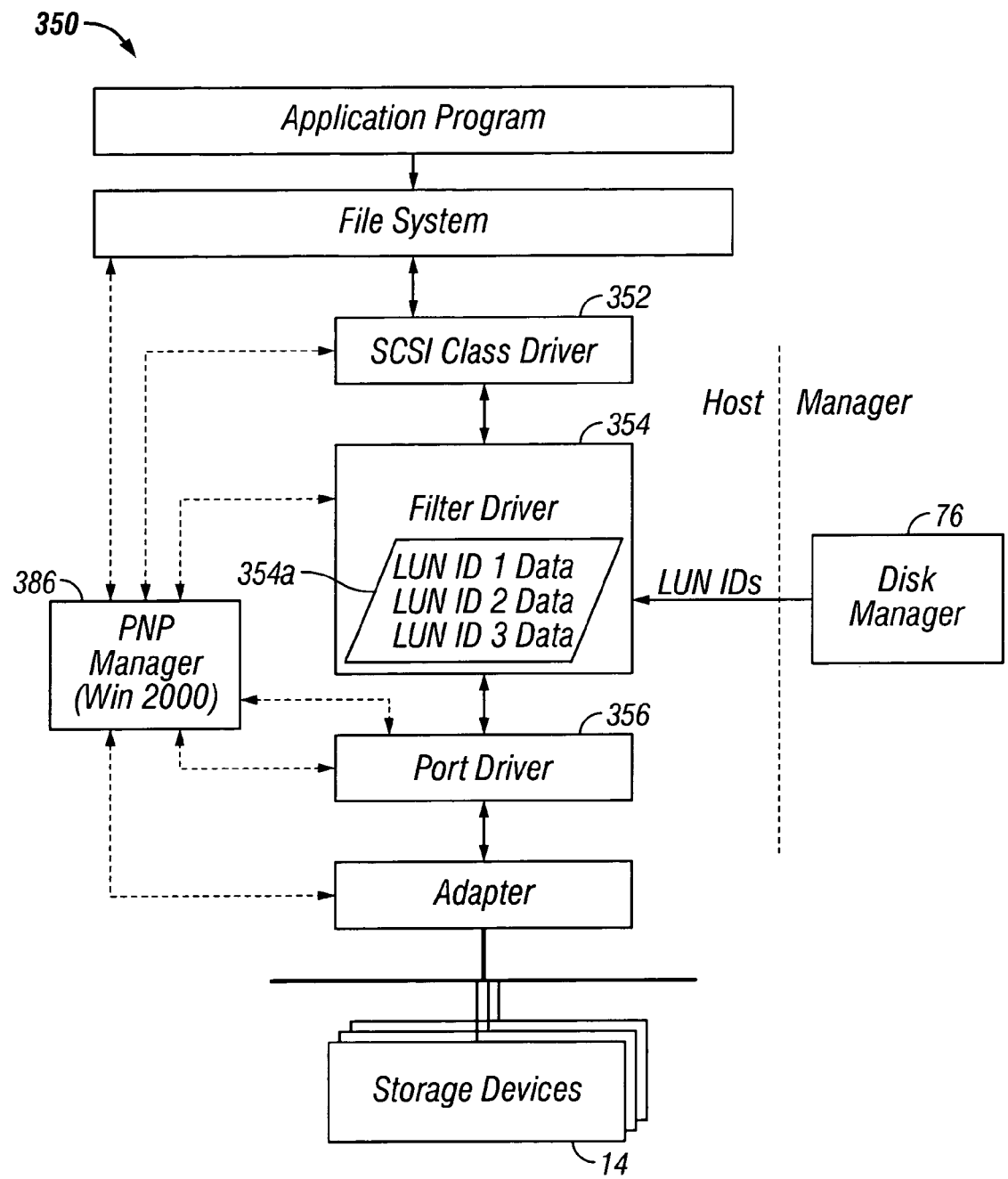
FIG. 36 depicts a storage driver architecture of a Windows™ NT or Windows™ 2000 host modified in accordance with the invention.

FIG. 36 depicts a storage driver architecture of the Windows™ NT operating system of an exemplary host 12 modified in accordance with the invention to provide these features, referred to elsewhere herein as "LUN masking."

The illustrated portion of the modified operating system 350 comprises a storage class driver 352 and port driver 356 of the conventional variety known and used in the art for the Windows™ NT operating system. In alternate embodiments, commercial or proprietary drivers providing like A functionality can be used in addition or instead.

Generally, storage class driver 352 and port class driver 356 operate in the conventional manner to translate IRPs from the file system to appropriate form for transfer to the host bus adapter (see FIG. 23, ADAPTER1 & ADAPTER2) associated with the attached storage devices (FIG. 23, DISK1–DISK3). More particularly, the storage class driver 352 uses the SCSI port/class interface to control one or more devices 14 on any bus for which the system provides a storage port driver 356. The port driver 356 serves as an interface between class drivers 352 and the host bus adapter (HBA) (FIG. 23, ADAPTER1) that is connected to one or more storage devices (FIG. 23, DISK1–DISK3). The SCSI port driver 356 receives SCSI request blocks (SRBs) from higher-level drivers (e.g., class driver, filter driver), and translates the SRBs into bus-specific commands that are then transferred to an HBA. An adapter-specific SCSI miniport driver is coupled to the port driver 356, and provides support for the particular SCSI HBA.

In the illustrated embodiment, filter driver 354 is interposed between storage class driver 352 and port driver 356. The filter driver includes a table 354*a*, or other data structure, listing LUN IDs that have been assigned to the associated host. The table is loaded and updated by the disk manager 76 (which typically communicates with the filter driver 354 and table 354*a* via a user mode applications program (not shown)) as discussed further below and can be persisted in a conventional manner, e.g., via a database or other persistent storage, not shown. (In alternate embodiments, rather than listing LUN IDs of devices that have been assigned to the host, the table 354*a* list LUN IDs of devices that from which access by the host to be blocked. Such alternate embodiments operate in the manner discussed herein, as appropriately modified to account for this difference in table content).

In normal operation, e.g., during boot-up of the Windows NT operating system or when the ports are otherwise scanned during system operation, the SCSI port driver 356 queries the SCSI bus to identify devices that are in communication with host 12. The port driver 356 then loads the SCSI addresses (each comprising multiple fields, e.g., port, bus, target id, logical unit number) of found devices (e.g., LUNs) into a port driver structure, and updates the Windows NT registry. The port driver also generates a physical device object for each identified device.

Continuing, in normal operation, the SCSI class driver 352 (a conventional Windows NT storage class driver) traverses the list of found device addresses, and issues claim requests to the port driver 356 for each of them. Normally, the SCSI port driver 356 responds to each of those requests by noting that the device is available to be claimed. The SCSI class driver 352 then creates a device object, making way for the file system or other aspects of the operating system (or any applications executing thereon) to access the device.

The filter driver 354 selectively intercedes in this process by intercepting the port driver response to claims issued by the class driver 352 for fiber channel devices. For such claims, the filter driver compares the identified devices against the LUN IDs listed in the data table 354*a*. More particularly, for each LUN ID in the table 354*a*, the filter driver 354 applies the associated algorithm (which, as noted elsewhere herein) is part of each LUN ID) to the identifying information contained in each claim (or otherwise obtained for the underlying device, e.g., from its Page 83*h* and/or Standard Page information, for example, obtained via the port driver 356), and compares the result with that LUN ID. If a match occurs, this indicates that the device has been assigned by the manager 20 to the associated host.

The filter driver 354 lets these claim requests (i.e., those for which there was a match) pass to and from the class driver 352 and port driver 356 in the normal course, such that the latter returns a normal success code (for assigned LUNs otherwise available for claiming) and such that the former generates a corresponding device object.

If no match occurs for any of the LUN IDs in the table, i.e., where an attempt is made to claim a LUN that has not been assigned, the filter driver 354 forces a failure return by the port driver 356, thus, preventing creation of a device object.

In this manner, the filter driver prevents the class driver 352 from creating disk objects—e.g., at system boot-up or whenever the port driver 356 is otherwise scanned—for devices not listed in the table 354*a* and, thereby, prevents the file system (or other aspects of the operating system of the host, or any applications executing thereon) from accessing fiber channel devices other than those assigned by the SAN manager 20.

In the event that a storage device, which was initially not assigned to the host, is subsequently assigned, e.g., at the request of an operator/administrator request via the SAN manager GUI, the disk manager 76 updates the filter driver table 354*a* to reflect the current list of assigned (or unmasked) LUNs. The filter driver 354 (or other functionality in the agent 24 operating on the host) then invokes the port driver 356 to re-claim all storage devices 14 identified by the port driver 356 as being connected to the host. In this regard, the filter driver 354 simulates the operation of the class driver 352 at boot-up.

The filter driver 354 accomplishes this task by initiating "FIND_NEW_DEVICE" (or equivalent) calls for all SCSI addresses in the port driver structure. All claim requests for previously claimed devices fail, as do those for already masked devices. The claim requests for newly unmasked LUNs succeed, and the SCSI class driver 352 creates the new corresponding disk objects.

In the event that a storage device which was initially assigned to the host is subsequently unassigned, e.g., at the request of an operator/administrator request via the SAN manager GUI, the disk manager 76 updates the filter driver table 354*a* and the filter driver 354 initiates a request to the host operating system to mark the disk object for the newly unassigned device as unusable.

A further appreciation of the operation of the illustrated portion of the modified operating system 350 may be attained through the discussion that follows.

A list of LUNs is stored and maintained in a common storage area, e.g., Windows NT registry. The list is used to communicate changes to the accessibility (such as assignment or unassignment) of LUNs to the operating system. During an assignment or an unassignment, the list is updated and the disk manager 76 notifies the filter drivers 354 of the change. A LUN is considered assigned when the device object is accessible (unmasked) to the system. A LUN is considered unassigned when the device object is inaccessible (masked) to the system. The management of LUNs is thereby performed without changes to the hardware configuration, and without re-boot.

An assignment is achieved by first, updating the LUN list in the common storage area (Windows NT registry) with the particular LUTNs to assign. Then an I/O control (IOCTL) that corresponds to the filter driver 354 is sent to communicate the assignment to each LUN. When the filter driver 354 receives this IOCTL for any device that matches the devices in the list of assigned LUNs, the device is unmasked. If a disk class object already exists for the LUNs, then all the objects are made available for access to the operating system. If a disk class object does not exist, then the LUNs are claimed using an IOCTL to find new devices. The actual masking bit is maintained in the device object, so any subsequent requests to the particular device object only require a checking of a bit rather than the entire registry.

If the current device object list does not locate the assigned LUN, a request to find new disk devices is sent through the I/O device control interface, i.e., IOCTL_DISK_FIND_NEW_DEVICES. The IOCTL_DISK_FIND_NEW_DEVICES request determines whether another device that the driver supports has been connected to the I/O bus, either since the system was booted or since the driver last processed this request. If such a device is found, the driver sets up any necessary system objects and resources to handle I/O requests for its new device. It also initializes the device on receipt of this request dynamically (i.e., without reboot). Such a driver is assumed to support devices connected on a dynamically configurable I/O bus.

This request generates a claim device to all the unassigned disks behind a particular port. The filter driver 354 then prevents any claiming of device objects that have yet to be assigned by intercepting the claim of each LUN, and comparing each LUN with devices available on that port. If the LUN exists, they are made available and the filter driver 354 makes the device objects available. Once a LUN is assigned, the operating system (e.g., Windows NT) maintains the device object for the course of the system up time. Therefore, the port driver 356 prevents an inordinate amount of device objects from being created during boot. If a disk device object cannot be claimed, it does not generate a device object. But if the LUN is found, the claim is successful, and a device object is created so that it can also then be checked to see if it should be masked or unmasked.

To unassign a LUN, the common storage area (e.g., Windows NT registry) is updated by removing that device's identification. A unique IOCTL is then sent to a filter driver (not shown) disposed "above" the SCSI class driver 352 to remove access to all device objects for the LUN that is to be unassigned. When unassigning a previously assigned LUN, only that filter driver needs to be notified because its device objects have already been created. This requires the submission of the IOCTL dedicated to that filter driver through the device I/O control API. Once the IOCTL is received, the disk id is checked against the registry, and if it no longer exists, the device object is masked from future I/O activity. If the unassigned LUN is later reassigned, the same filter driver, again, only needs to be notified (again, because the corresponding device objects already exists).

LUN Masking on Windows 2000 Hosts

In an embodiment of the invention for a Windows 2000 operating system, LUN masking is performed on hosts 12 in a manner similar to that described above with respect to a host running the Windows NT operating system.

The illustrated portion of the modified operating system 350 for a Windows™ host is architected and operated similarly to that described above with respect to the Windows™ NT operating system. LUN masking is performed in a similar fashion to that described above for Windows™ NT, except that the filter driver 354 intercepts the class driver 352 claims to storage devices (that are not assigned to the selected host 12), by blocking the claim requests generated by the class driver 352 in the first instance, rather than by blocking responses by the port driver 356 to the class driver in response to such requests. As above, the blocking of claims requests in the Windows™ environment also prevents the class driver 352 from creating device objects, thereby, preventing the file system (or other aspects of the operating system or any applications program executing thereon) from accessing unassigned devices.

According to the illustrated embodiment, the agent 40 prevents masked LUNs from appearing in the Device Manger of the Windows™ 2000 interface by setting a flag in the data structure normally sent by the plug-and-play manager (not illustrated) with the device state query. In addition, the illustrated embodiment prevents the plug-and-play manager from generating notifications to an operator of a host 12 from which a masked device has been removed. This is accomplished by setting a flag in the data structure normally sent by the plug-and-play manager along with the device capabilities query.

In an alternate embodiment for a Windows™ 2000 host, masking is accomplished by modifying a data structure populated by the port driver to reflect LUNs (or other devices) that are attached to the host.

In normal operation of a Windows™ 2000 host, the plug-and-play manager (which is a conventional component of the Windows 2000 operating system) is initiated at boot-up and creates a data structure that it passes to the SCSI port driver 356. The port driver 356 populates that data structure with information regarding all found devices (e.g., SCSI addresses). The illustrated embodiment effects masking via the filter driver 354, which removes from that data structure information regarding fiber channel devices not listed in the table 354*a*. As a result, neither the plug-and-play manager nor the class driver become aware of masked devices and, hence, do not attempt to create disk objects for them.

To "add" back a LUN that was previously masked, the plug-and-play manager is initiated to create and send a new data structure to the port driver 356 to be filled in. The plug-and-play manager is initiated by issuing from "user mode" a call to the filter driver 354, which itself issues a kernel mode IO_INVALIDATE_DEVICE RELATIONS call. This causes the plug-and-play manager to issue calls (IRPs) to the port driver 356, which causes refill of the data structure. Then the filter driver 354 again intercepts the response from the port driver 356, and removes any objects from the data structure that correspond to masked devices. Those skilled in art will appreciate that any other sequence of calls suitable for effecting refill of the data structure (e.g., DEVICE_RELATIONS) can be utilized.

To mask a LUN that is already available a command (i.e., REMOVE) is sent to the plug-and-play manager from "user mode" that identifies the device to be removed. The plug-and-play manager then removes all structures necessary for I/O (including disk objects). The filter driver 354 is active at all times to prevent any rescan from filling the data structure with a masked device.

To unmask a LUN, a "remove" command (e.g., CM_QUERY_AND_REMOVE_SUBTREE) is issued to remove a device. Then a rescan is forced by opening the SCSI port drivers 356 and issuing to them a CM_RENUMERATE_DEVNODE command.

A further understanding of utilizing a device driver to mask LUNs in this alternate embodiment for a Windows™ 2000 host may be attached through the discussion that follows.

To mask LUNs at the SCSI port level an upper filter driver 354 to the SCSI port driver 356 is used. The upper filter driver 356 catches Plug N Play request packets for devices on the SCSI port. The I/O request packet (IRP_MN_QUERY_DEVICE_RELATIONS) contains an array of all device objects attached to the SCSI port.

Using the first byte of the SCSI inquiry data, each device on the port is checked to make sure it is a disk and then if the device is a disk queried for the LUN ID. If the device should be masked, the last device object in the array replaces the device object and the count of total devices is decremented. This effectively removes the masked device from the array. If the device is not masked the device remains in the list. After all masked disks have been removed the I/O request packet is completed and the list is then sent back up to higher-level drivers. The masked disk devices are not visible to any driver higher than the filter driver 354. As a result, the SCSI class driver 352 does not make device objects for the masked devices, so the partitions on masked disks do not get mounted by the operating system.

The filter driver 354 does not change the SCSI port driver 356 data. Therefore, the SCSI port driver 356 always has a list of all devices on its ports. The filter driver 354 simply prevents masked LUNs from being assigned.

Once Windows 2000 is booted care must be taken when masking out LUNs to avoid a surprise remove. When an unmasked LUN needs to be masked a user mode uninstall must be done to unmount the partitions and remove the disk safely from the plug-and-play manager. The SCSI bus is then rescanned and the device driver removes the device object from the array after a user mode uninstall of the disk has been completed successfully.

When a masked LUN needs to be unmasked the SCSI bus is rescanned. This unmasks the LUN since the device driver is not removing the device object from the array. Then the I/O request packet is completed which causes the SCSI class driver 352 to claim the disk and mount the partitions that reside on the disk.

Since the device driver is an upper filter driver 354 to the SCSI class driver 352, any host bus adapters that use the SCSI protocol work with this configuration. Fiber channel is an example of an adapter that uses SCSI protocol.

Association of LUN ID with Physical Device Object Name

As evident throughout the discussion above, the SAN manager 20 and agents 40 utilize the LUN IDs as identifiers for the storage devices (LUNs). Thus, by way of non-example, as discussed in the preceding sections, the disk manager 76 assigns LUNs to the hosts by loading their respective filter drivers 354 with the corresponding LUN IDs. The hosts are permitted to access LUNs whose LUN IDs are contained in the driver tables and are precluded from accessing the other LUNs.

By contrast, many functions within the host digital processors 12 inherently utilize physical device names or addresses to identify attached storage devices. For example, the plug-and-play manager within a Windows™ 2000 host identifies storage devices via physical device object names that include, among other things, port number, path number, target number and logical unit number.

The illustrated embodiment provides a mechanism for readily associating these physical device names/addresses with the corresponding LUN IDs, thereby, facilitating use of built-in host functions—e.g., plug-and-play manager detection services—to determine when the SAN storage devices have been added, removed, enabled, disabled, otherwise affected. Though the discussion here focuses on association of physical device object names of the type used by plug-and-play managers in the Windows™ 2000 environments, those skilled in the art will appreciate that the teachings are equally applicable to forming other such associations with this and other operating systems and operating system functions.

Referring to FIG. 36 by way of review, in normal operation of a Windows™ 2000 host, the plug-and-play manager (PNP) queries the SCSI port driver 356 for information regarding all devices known by it. The information includes data such as port number, path number, target number, and logical unit number for each found device. The PNP manager 386 generates from this a physical object for each device.

Subsequently, when the PNP manager 386 detects that a storage device has been added or removed, e.g., coupled or decoupled from the interconnect 16, it generates an event. In a Windows™ 2000 environment, this is referred to as a "device change" event and includes a physical device object name, to wit, a string with the host bus adapter (HBA) name, port number, path number, target number, and logical unit number of the affected device. In embodiments operating on hosts with other operating systems, such an event may have a different name and/or content.

A user mode process executing on the host receives such PNP events, so long as that process is appropriately registered with the PNP manager. The process extracts the port number, path number target number, and logical unit number from the physical device object name and converts them to a form suitable for querying the device or its interface (e.g., the port driver and/or HBA) adapter for SCSI inquiry data, e.g., of the type contained on Page 83*h* and/or Standard Page. It uses this to open a handle to the device and obtain that SCSI inquiry data, e.g., by way of an IOCTL_SCSI_GET_INQUIRY_DATA call in the Windows™ 2000 environment or using a related or analogous call in other environments.

Using the SCSI inquiry data and the information extracted from the physical device object name, the user mode process generates an LUN ID using the algorithms discussed above in connection with FIG. 10. In this manner, it thereby forms an association between a physical device object name and logical identifier, to wit, a LUN ID.

In the illustrated embodiment, the user mode process forms such an association, e.g., for purposes of correlating the LUN ID included in a storage device assignment received from the SAN manager 20 with events generated by the host PNP manager. In this regard, the user mode process executes the algorithm identified within the LUN ID of the assigned device in order to convert the inquiry data and extracted information into a logical identifier. In alternate embodiments, the user mode process can exercise this or other LUN generation algorithms, e.g., for purposes of matching a raft of identified LUN IDs or for other purposes. In the illustrated embodiment, the aforementioned user mode process is a PNP event listener, though it can comprise any code operating in user mode. Moreover, the mechanism discussed above can be used to associate a physical device name or address of any device (disk or otherwise) with a logical identifier.

Fiber Channel Device Determination in Kernel Mode

As discussed above, in order to mask non-assigned LUNs, the filter driver 354 intercepts claim requests made by the class driver 352 to the port driver 356 or, conversely, the port driver response to those claims. For such claims, the filter driver compares the identified devices against the LUN IDs listed in the data table 354a, applying the associated LUN generation algorithms and comparing the results to determine whether the response should be passed or blocked. Because the filter driver 354 executes in kernel mode in Windows™ NT, Windows™ 2000 or other such hosts, operating system, adapter or storage device limitations may preclude the driver 354 from consistently determining whether any given claim is for a fiber channel device and, hence, subject to potential masking.

The illustrated embodiment overcomes this by utilizing a user mode process to detect fiber channel devices on the SAN and to communicate this to the filter driver 354 (or other functionality operating in the kernel mode) via the Windows™ registry. More specifically, upon deployment of the SAN and/or at the final phases of host boot-up, the user mode process identifies ports to which fiber channel devices are connected and stores that information to the host registry. At early stages of a subsequent boot-up (which may occur some time later), a kernel mode process validates those registry entries. The filter driver 354 operates as discussed above, e.g., masking non-assigned fiber channel devices, but also taking into account invalidity determinations made by the kernel mode process. The user mode process is re-executed to regenerate the registry (and, as a consequence, eliminate invalid entries), issuing new claims for any devices that were improperly masked by the filter driver 354, e.g., on account of the kernel mode process invalidity determinations.

Figure 41:
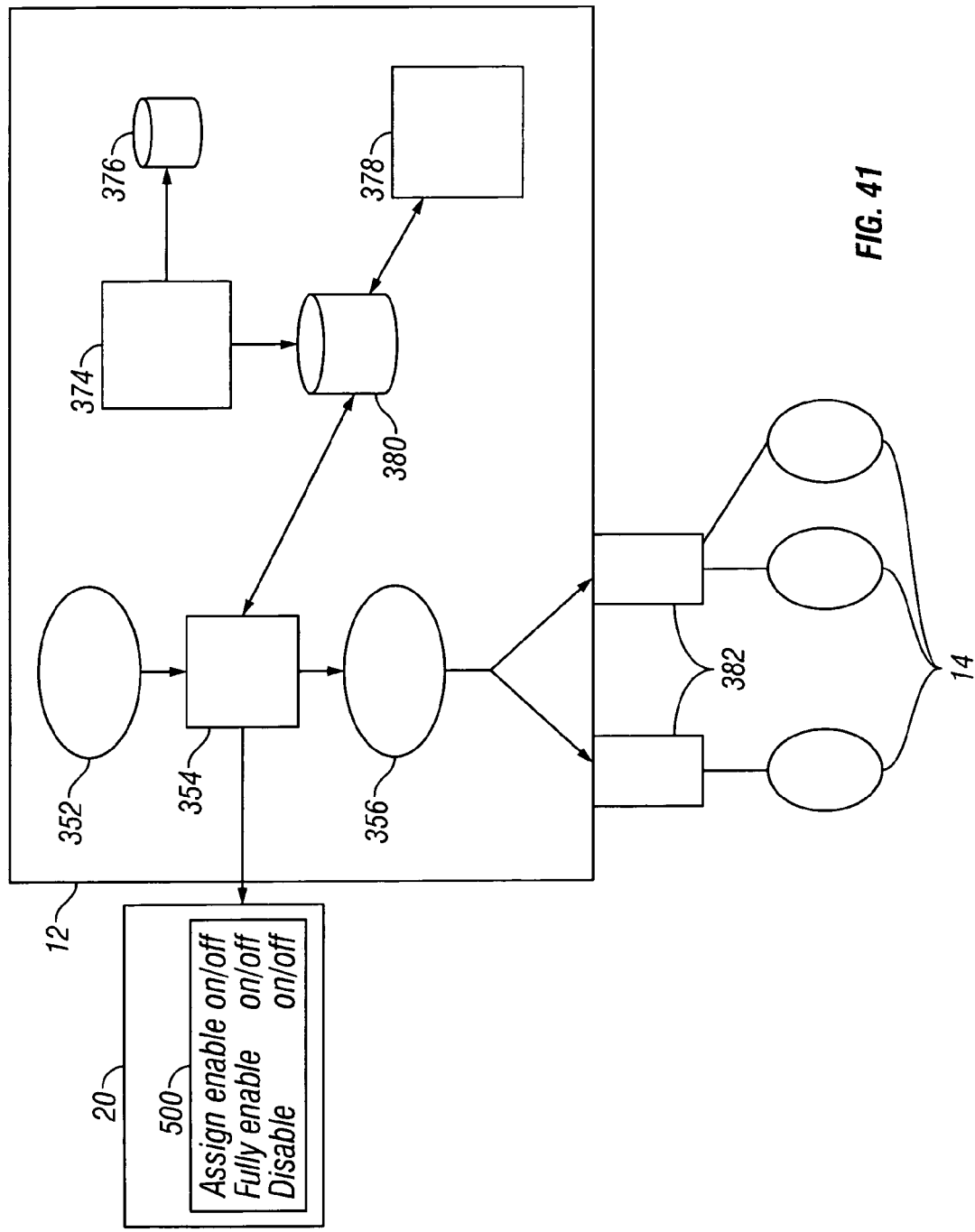
FIG. 41 depicts a storage driver architecture of a Windows™ NT or Windows™ 2000 modified in accordance with the invention for kernel level fiber channel detection.

Referring to FIG. 41, a process 374 executes on an exemplary host 12 in user mode under the Windows™ NT, Windows™ 2000 or other such operating system. The user mode process 374 collects information pertaining to the host's ports 382, and stores this to the Windows registry, or other persistent store 380 (e.g., a database) that can be subsequently accessed by the filter driver 354 or by other processes executing in the kernel mode. The collected information indicates each port's number, whether the port supports a fibre channel adapter, and verification data. In the illustrated embodiment, the latter comprises the name of the manufacturer of the port's driver software, e.g., as obtained from a standard location of the Windows™ registry (i.e., other than that portion of the registry corresponding to store 380), though other information can be used in addition or instead.

To determine which ports are connected to fiber channel devices, the illustrated user mode process 374 calls a common user mode library 376, e.g., of the type specified by the Storage Networking Industry Association (SNIA). The user mode process 374 identifies the host's other ports, i.e., those not connected to fiber channel devices, via the Windows™ registry (again, other than that portion of the registry corresponding to store 380).

The user mode process 374 executes on the host during deployment of the SAN agent 40 software and each time the host 12 is booted-up, specifically, at a late phase of the boot-up.

During a next boot-up of the host, which may occur minutes, hours, days, weeks or even longer after the user mode process 374 was last executed (and, more significantly, after which the operator may have added, removed or switched devices and/or adaptors), the kernel level process 378 is executed on the host to validate the store 380. This insures that the fiber channel identifications made by the previously run user mode process 374 are valid and, therefore, can be properly used by the filter driver 354 later during (the same) boot-up, when the class driver 352 begins issuing claims to the port driver 356.

More specifically, the kernel mode process 378 (which may reside within or outside filter driver 354) compares the driver manufacture name maintained in the store 380 for each port against the corresponding data maintained in the standard location of the Windows™ registry (i.e., in the same location previously used by the user mode process 374 to ascertain those names). For each port for which the comparison is favorable, the kernel mode process 378 stores a "valid" (or "not dirty") flag. Conversely, for each port for which the comparison is not favorable, the kernel mode process 378 stores an "invalid" (or "dirty") flag.

In addition to the ports listed in store 380, the kernel mode process 378 detects whether the host is coupled to any other active ports. As above, this is accomplished via the standard location in the Windows™ registry. Ports identified in the standard location that are not in store 380 are treated as invalid (or dirty) in the discussion below.

Subsequent to execution of the kernel mode process 378, the host operating system (class driver 352) begins making claims for devices attached to ports, as discussed above. The filter driver 354 (which also operates in kernel mode) responds by intercepting and selectively blocking those claims, also as discussed above. In order to determine whether a claim is potentially subject to blocking, i.e., whether it is a fiber channel device, the filter driver 354 retrieves from the store 380 the entry pertaining the port identified in each claim. This includes both the indication of whether the port is a fiber channel port (per the user mode process 374) and whether the entry has been validated (per the kernel mode process 378). The filter driver operates as discussed above, blocking claims for validated fiber channel devices that are not assigned to the host 12, while passing those for validated fiber channel devices that are. It also passes claims for devices that are validly indicated as not fiber channel. The filter driver utilizes the invalid determination of the kernel mode process 378 (as reflected by the store 380), for example, to pass claims to peripheral devices whose store 380 entries are invalid, unless those requests are for hard disk devices that are not designated as assigned to the host 12.

A more complete understanding of the operation of the filter driver 354 may be attained by reference to the following truth table.

| VALID REGISTRY ENTRY | FIBRE CHANNEL PORT | HARD DISK DEVICE | LUN ASSIGNED | MASK DEVICE? |
|---|---|---|---|---|
| N | N | N | N | N |
| N | N | N | Y | N |
| N | N | Y | N | Y |
| N | N | Y | Y | N |
| N | Y | N | N | N |
| N | Y | N | Y | N |
| N | Y | Y | N | Y |

-continued

| VALID REGISTRY ENTRY | FIBRE CHANNEL PORT | HARD DISK DEVICE | LUN ASSIGNED | MASK DEVICE? |
|---|---|---|---|---|
| N | Y | Y | Y | N |
| Y | N | N | N | N |
| Y | N | N | Y | N |
| Y | N | Y | N | N |
| Y | N | Y | Y | N |
| Y | Y | N | N | N |
| Y | Y | N | Y | N |
| Y | Y | Y | N | Y |
| Y | Y | Y | Y | N |

Following completion of the "claims process," i.e., when the host operating system makes claims for devices (which the filter driver selectively blocks), as discussed above, the host 12 re-executes the user mode process 374. Since this occurs with respect to the current configuration of the host ports, entries in the store 380 previously identified by the kernel mode process 378 as invalid are properly updated. In the event that the user mode process identifies a port that (a) is connected to a non-assigned, non-fiber channel disk drive and (b) had a store 380 entry previously marked as invalid, the user mode process 374 causes a new, non-blocked claim to be issued for the device so that it can be properly accessed by the operating system.

A further understanding of the foregoing may be attained by reference to the discussion that follows.

In the illustrated embodiment, common user mode code is utilized to use the common user mode interface 374 prior to an install of the filter device drivers 354 on the operating system, and immediately following a re-boot. The user mode code is only required once, because once the active topology is known, changes to that topology are not noticed until after a re-boot, especially on an operating system such as Windows NT and 2000. Although Windows 2000 adds the plug-and-play option, the actual bus adapters cannot be hot plugged. Therefore, new or changed bus adapters are only recognized after re-boot.

The first snapshot of the bus adapter topology is captured during install. This provides an initial snapshot of the adapters 382 that are connected to a SAN. Boot devices are not connected to a SAN and cannot change without destroying the operating system boot start. Therefore, the concern for boot devices is gone because the initial snapshot where boot drive exists never changes, and since all non-SAN connected devices are never masked the boot device is available during every re-boot. Any masking of the boot drive effectively destroys the system that is to be attached to a SAN.

The snapshots are stored in the Windows registry 380. The common user mode interface 374 identifies adapters 382 behind ports on a Windows operating system. Adapter drivers are written as SCSI-miniport device drivers on a Windows operating system, and when filtered, they are viewed as a level below port device drivers 356. Thus, only a port topology is required when faced with the Windows operating system. Since this information is stored by the Windows operating system after changing or adding a new adapter device, it accurately depicts the port topology of the system. The snapshot that is captured is taken from the Windows registry, and stored into another registry entry that is unique to the filter device drivers 354. This is the validation information that is used to determine if the topology has been altered after the prior re-boot, or install.

The actual identification information that is used is the response received by the common user interface on whether or not a device is connected to a SAN. This identification information is stored along with the validation information.

A re-boot invokes the filter device drivers 354 to check if a port is connected to a SAN. The validation information is compared against what is stored in the defined Windows hardware devicemap, and if it is valid, then the type information is considered valid and permanently stored for later reference (any future topology changes will require a system re-boot). If the validation information is not valid, then the filter device driver 354 will "dirty" the bad registry information so that the validation data information is no longer needed. This limits the validation of the data to one time during the boot cycle, once per active port. Any "dirty" ports are masked during the initial boot. There is an exception though. Any port that has devices that are not disk devices 384 will unmask such devices during a claim of these devices while booting.

Immediately following a re-boot, the common user mode code is executed to update the registry and locate new devices resulting from the update. The filter device drivers 354 are notified during claim processing, and since the information is valid, the filter device drivers 354 filter only those disk devices 384 behind ports that are connected to a SAN.

Ensuring Validity of Data from the Scanners

As noted above, the SAN manager 20 includes one or more fiber channel (FC) discover engines 40, such as the discover engine 40 shown in FIG. 6, responsible for gathering topology and attribute information for the SAN components. The discover engine 40 receives and processes information gathered by one or more scanners, such as scanner 42, which collect in-band and outband information including host and device interconnectivity (e.g., which storage devices are accessible to which hosts and host file system utilization), host attributes (e.g., file system information, including identities of mounted storage devices), storage device attributes (e.g., storage capacities), and interconnect element information. In addition to maintaining a one level-deep history of scans from the scanners 42, the discover engine 40 notifies the SAN manager service module 38 of apparent changes, such as addition of a new host or storage device, modification of attributes of a host or storage device, removal of a device, or change or removal of a relationship between a host and a storage device.

As a consequence of the nature and number of scanners 42 and of the interconnectedness of the hosts and storage devices, the scans may not be entirely consistent. For example, an inband topology scanner on one host 12 may detect a particular storage device 14 coupled to that host 12 over the fiber channel interconnect, while an outband scanner on that same host may not detect that device. The information does not match perfectly, since these two scanners are able to "see" or detect slightly different things in the host 12. As between the inband scanners on two different hosts 14, hardware invisible to one scanner may be visible to the other scanner, e.g., due to the configuration of the interconnect 16. This scenario is additionally complicated by the varied locations of the scanners on the interconnect 16. To account for potential discrepancies among scans, the discover engine 40 utilizes the mechanisms discussed below to reconcile information received from the scanners 42 before notifying the SAN manager service module 38 of apparent changes.

Generally, upon discerning from a scan that, for example, a storage device has apparently been removed, the engine 40 validates the change using other scans. To facilitate identifying those scans, the engine traverses relationships reflected by a set of objects or other data structures that represent SAN components to determine which contain information regarding the apparently removed device. Those scans can be checked to see if they are in accord with the scan in which the change was discerned and/or the scanners that generated the scan(s) can be re-executed.

Figure 37:
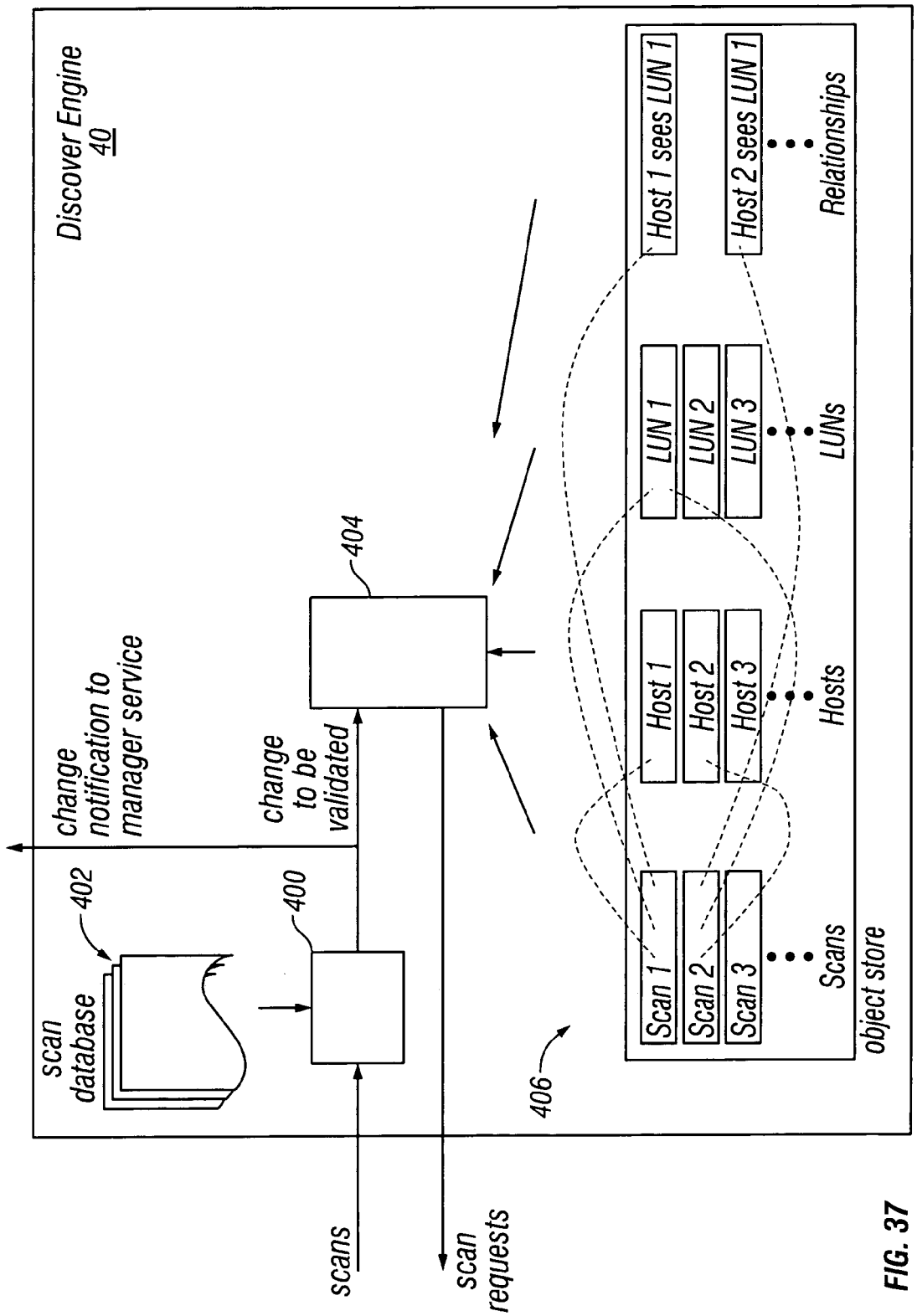
FIG. 37 depicts a mechanism for validating changes in the discover engine of a system according to the invention.

More particularly, referring to FIG. 37, element 400 in the discover engine 40 receives a scan from a scanner 42 and compares it against information previously received from that scanner 42 as reflected in a discover engine database 402 (which in the illustration is depicted as containing the aforementioned one-deep history of scans from all scanners 42) or other store. If, as a result of that comparison, the element 400 discovers a change, e.g., in the host associated with scanner 42 or in the SAN topology "seen" from that host, the element can generate and forward to the SAN manager 20 service module 38 notifications as discussed above in the section entitled "Event Processing."

Depending on its type of change, however, the element 400 validates the change before notifying module 38. Such validation is performed in the illustrated embodiment for device or relationship removal events, though, in other embodiments other changes can be validated in addition or instead. It is performed using objects 406 (referred to by the fanciful term "moid" objects), each of which represents a respective scan, SAN component, component attribute or relationship. These objects 406 may be object-oriented programming (OOP) objects or other data structures.

Validation is performed by element 404, which receives from element 400 notification of a change to be validated and/or the identity of the SAN component, attribute or relationship affected by the change. To validate a change indicating, for example, that a storage device has been removed, element 400 passes to element 404 the identity of that device, say, for example, "LUN 1." Element 404 searches for a moid object representing that LUN. The search can be performed in a store, database or other runtime or persistent store containing such storage device-representative moid objects and, depending on implementation, other moid objects as well.

Like the moid objects that represent attributes and relationships, each storage device-representative moid object is associated with a moid object that represents a scan. These associations reflect which scans contain information about which component, attribute or relationship. As information regarding any given component, attribute or relationship may be contained in more than one scan, there may be multiple moid objects for that component, attribute or relationship, each associated with a moid object for a different scan—or, depending upon implementation, there may by only one moid object for that component, attribute or relationship with multiple associations to the different scans.

In the illustration, associations are represented by dashed lines. The associations may be maintained in the moid objects themselves and/or in an associated store, database or other runtime or persistent store.

Continuing the example, by searching for mold objects representing a storage device that has been removed, the element 404 identifies, through the associations, which scans contain information regarding that storage device. Information pertaining to that device from those scans can then be compared (e.g. by element 404) with the information being validated. No comparison need be made with the scan that itself contains the information being validated. In case there is no discrepancy, the change that gave rise to the validation is indeed passed to the manager service 38.

In case the comparison reveals there is a discrepancy, the identified scans and/or the scan in which the change was initially detected can be re-executed, e.g., by way of request issued from element 404. Alternatively, the apparent change can be ignored—as is the case in embodiments where removal events are ignored unless not contradicted by other scans.

The foregoing mechanism is used to validate information regarding not only SAN components, but their attributes and relationships as well. A more complete understanding may be attained via the discussion that follows.

In order to perform the above diagnostics efficiently, the discover engine 40 needs to associate each scanner with the storage devices seen by that scanner. That is, the discover engine 40 needs to maintain not only information regarding association of a host with one or more storage devices but also information that links a scanner on that host with those storage devices seen by that scanner.

The illustrated embodiment utilizes a methodology that allows the discover engine 40 to maintain such data in a manner such that the needed information, e.g., which scans previously saw a particular storage device, can be retrieved in an efficient manner.

In general, a database or other storage environment can be used to represent an "association" between two objects, as shown schematically below:

<object> . . . <association> . . . <object>

However, some of the information detected by a scanner is itself relationship information that indicates association between two objects. That is, scanners not only detect devices, but they also detect, inter alia, relationships between devices, attribute information, and logical entities, e.g., to which volume group a storage device belongs. Such an association between an object and another association can be schematically depicted as follows:

<object> . . . <association> . . . <relationship>.

The illustrated embodiment provides for the retrieval of such information, by generating moid objects (or other data structures) for each SAN component, attribute or relationship which may form part of such an association. This means forming objects not only for storage devices, hosts, and so forth, but also objects representing attributes and relationships, such as "Host 1 is assigned to LUN 1" or "Physical device A contains LUN 4" or "LUN 1 is a fiber channel device." These objects can be stored in a persistent storage, e.g., an object database and each can hold a unique identification corresponding to the component or association that it represents. In this manner, each scan, which is also represented by an object, can be related to any information discovered during the scan, whether it relates to a device or a relationship.

In the illustrated embodiment, the moid objects refer to tables (not shown) that are generated by the discover engine 40 on examination of each scan. The are tables, for example, of scans, hosts, storage devices, attributes and component relationships. To avoid confusion regarding identifiers referring to different moid objects, each moid object in such cases can be identified by a unique key, for example, in the form <table name><unique Id>.

This provides some degree of flexibility in naming various objects corresponding to devices or associations. For example, an object representing a physical disk in a physical disk table and an object representing a logical disk in a logical disk table can be given the same name without causing any confusion in distinguishing the two objects.

User Interface Architecture

As described above in the section titled "SAN Manager Console", the console 52 (FIG. 6) provides a graphical interface that allows the SAN manager to view selected attributes of the SAN, such as, the SAN topology, and to submit commands, such as, refresh topology, to the manager 20. In some embodiments, software instructions for controlling the console 52 is interwoven with the other SAN manager functions, e.g., those of the aforementioned manager service. However, in the illustrated embodiment such control is implemented by a separate software module, "NetView," a commercially available product of the assignee that provides user interface functionality, e.g., for the display of network configurations. In other embodiments, still other modules (whether available from the assignee or others) providing similar functionality can be can be used in place of NetView.

A SAN manager 20 of the illustrated embodiment utilizes a software architecture as generally shown in FIG. 6 and described in further detail below to provide for operation of the console 52, here, referred to as the NetView console, via the NetView applications program interface (API). Those skilled in the art will appreciate that these teachings can be applied in controlling console 52 via other user interface applications and their corresponding APIs. In the illustrated embodiment, NetView executes on the manager digital data processor, although it other embodiments it can execute on separate hardware (e.g., in communication with the SAN manager 20 via an object request broker or otherwise). Though NetView may operate within the same processes as other SAN manager 20 functionality, it is referred to elsewhere herein as a separate process to connote is modularity.

Communication from the NetView console 52 to the SAN Manager 20 is initiated via the NetView Requester 60, which is an executable launched by the NetView console 52. This executable receives callback requests from the NetView console 52 and forwards these requests to the Console Request Handler 62. In this exemplary embodiment, the NetView Requester 60 transmits each call back notification received from the console 52 to the Request Handler 62 over a socket connection. Further, the information contained in the call back notification is preferably presented in an XML format to provide flexibility in describing the data. In the illustrated embodiment, the NetView Requester simply forwards the information from the console 52 to the Handler 62 without any substantial re-formatting of the information received from the console 52. In alternative embodiments, the NetView Requester can map the information received from the console 52 onto a generic format before its transmission to the Handler 62. This allows utilizing the same Handler with different graphical consoles. Although shown as a single block, the Request Handler 62 performs several distinct functions, and may be implemented as separate applications. In general, the Request Handler 62 processes the events that occur when a user, e.g., the operator/administrator, interacts with the NetView console 52. For example, all menu operations, accessible via the console 52, such as, launching a management application, are performed via the Request Handler 62. The Request Handler 62 communicates with the manager 20 and other services via the NetView daemon 56 and the SAN manager daemon 58.

The manager daemon 58 generally provides functions that allow the NetView console 52 to interface with the SAN manager 20. Some of these functions can include, for example, retrieval of the SAN topology representation from the SAN manager 20, mapping a retrieved topology map into sub-maps, and handling action callbacks received from the Handler 62. In the illustrated embodiment, the SAN manager daemon 58 utilizes an Object Request Broker, such as Voyager ORB, for inter-service communication, such as, communication with the SAN manager 20. Those skilled in the art will appreciate that other communication protocols can also be utilized.

Figure 38:
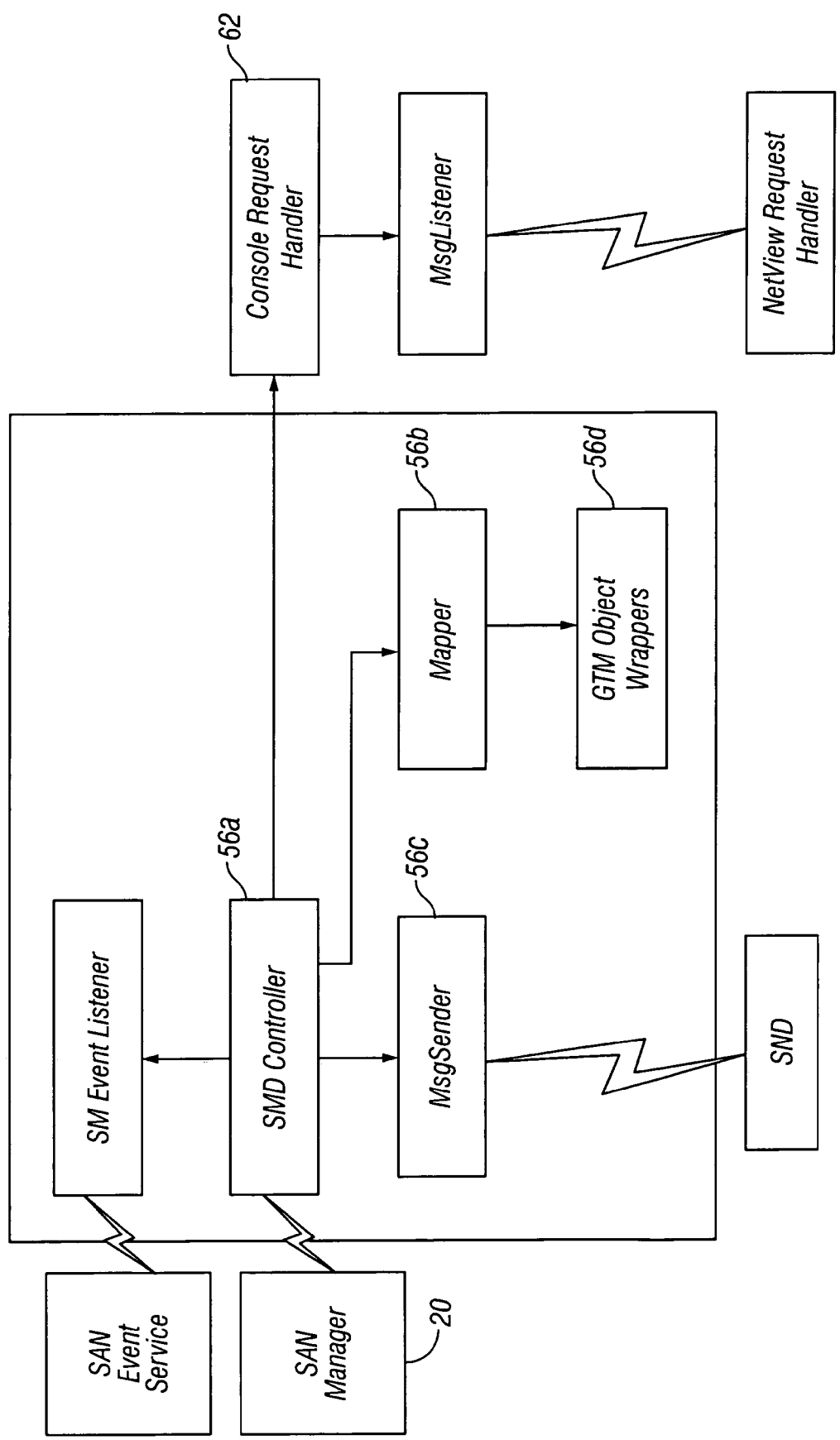
FIG. 38 depicts functional components of an exemplary SAN daemon in a system according to the invention.

FIG. 38 schematically illustrates functional components of an exemplary SAN daemon 56. A controller 56a communicates with the Request Handler 62 and the SAN manager 20 to process events received from the Handler 62. A Mapper 56b maps topology information received from the SAN manager 20 into sub-maps, and a Message Sender 56c is responsible for transmitting, for example, via a socket connection, the topology mapped by the Mapper 56b to the NetView daemon 56 for viewing on the NetView console 52. GTM object wrappers 56d can be utilized by the Mapper 56b for wrapping sub-map objects. The GTM object wrappers 56d further provide helper functions to format GTM API functions into raw String messages to be transmitted by the Sender 56c.

Figure 39:
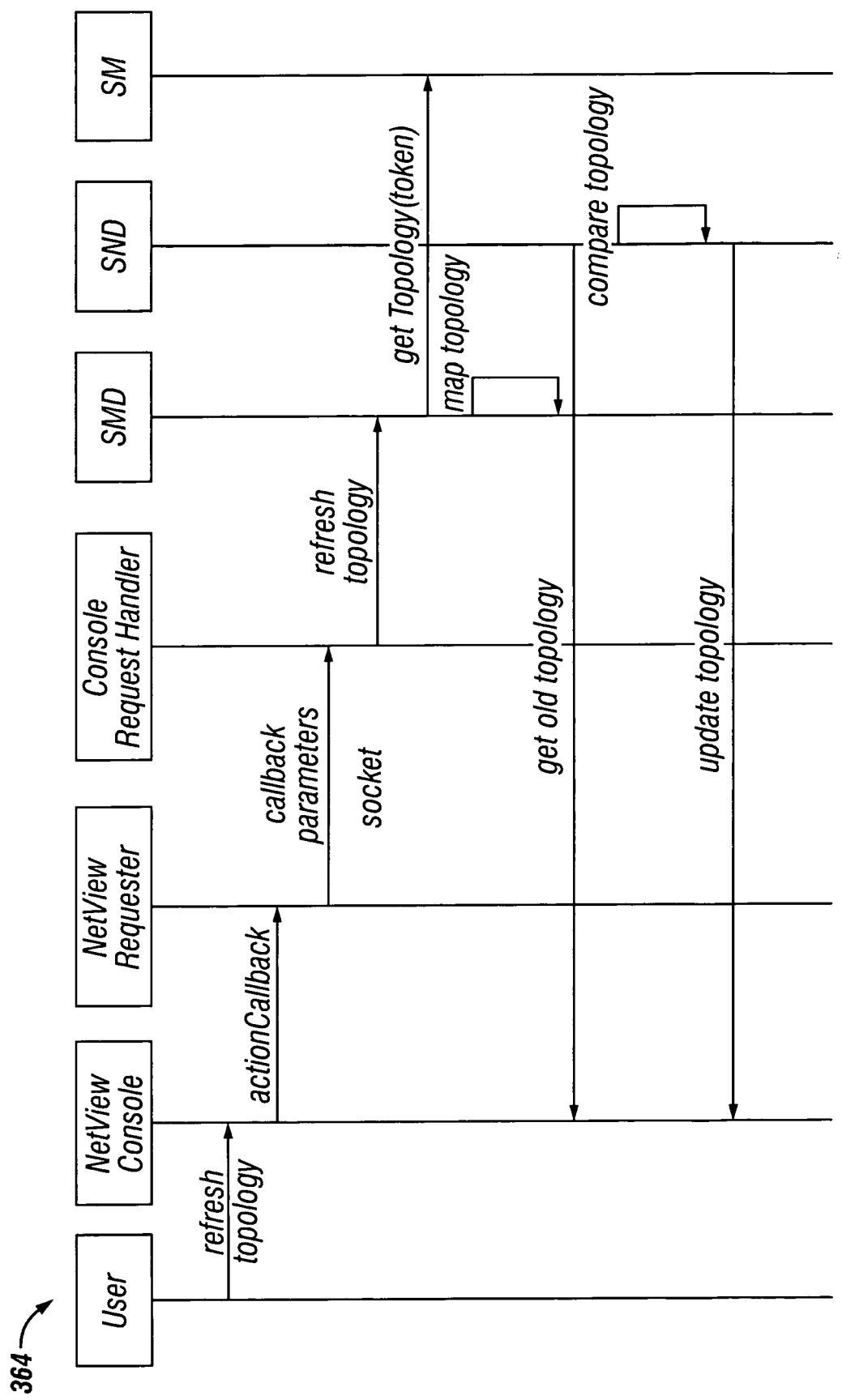
FIG. 39 depicts a flow of information in a system according to the invention in response to a administrator's request to refresh a topology display.

By way of example, FIG. 39 illustrates an information flow model 364 that depicts the flow of information among the above components when a user, e.g., the operator/administrator, selects a Refresh Topology item from a menu presented on the NetView console 52. In response to such a selection, the NetView console 52 transmits an action event to the NetView Requester 60. The NetView Requester 60 in turn forwards the action event, e.g., as a request, to the Request Handler 62 that processes the request and issues a refresh Topology message to the SAN manager daemon 58.

The manager daemon 58 establishes communication with the manager 20, for example, via an ORB protocol, to retrieve the SAN topology data therefrom. In some embodiments, the manager daemon 58 informs the manger service 38 of the user's security context to allow the manager 38 to determine whether the user is eligible for viewing the requested information. In addition, the manager daemon 58 maps the retrieved topology information into sub-maps, and transmits the sub-maps to the NetView daemon 56.

Upon receiving the topology information, the NetView daemon 56 compares the new topology representation with a topology representation previously stored in the NetView database, such as illustrated NetView object database 54a (FIG. 6), to determine whether the stored topology data requires updating. If the NetView daemon detects changes between the new and the old topology representations, it updates the topology data in the database 54a. The console 52 presents this updated topology information to the user.

A SAN topology model presented to the operator/administrator on the NetView Console 52 may be updated as a result of the operator/administrator's request in a manner described above. Alternatively, with reference to FIG. 6, the SAN topology model may require updating when the SAN manager receives reports of topology changes from the discover engine 40. In particular, as discussed above, one or more agents running on one or more hosts connected to the SAN can periodically, or upon request by the discover engine 40 via the query engine 46, obtain information regarding storage devices accessible to their respective hosts, and transmit this information to the discover engine 40. The discover engine 40 collates this information to determine any changes in the SAN topology, and if so, it reports the changes to the SAN manager service 38.

Figure 40:
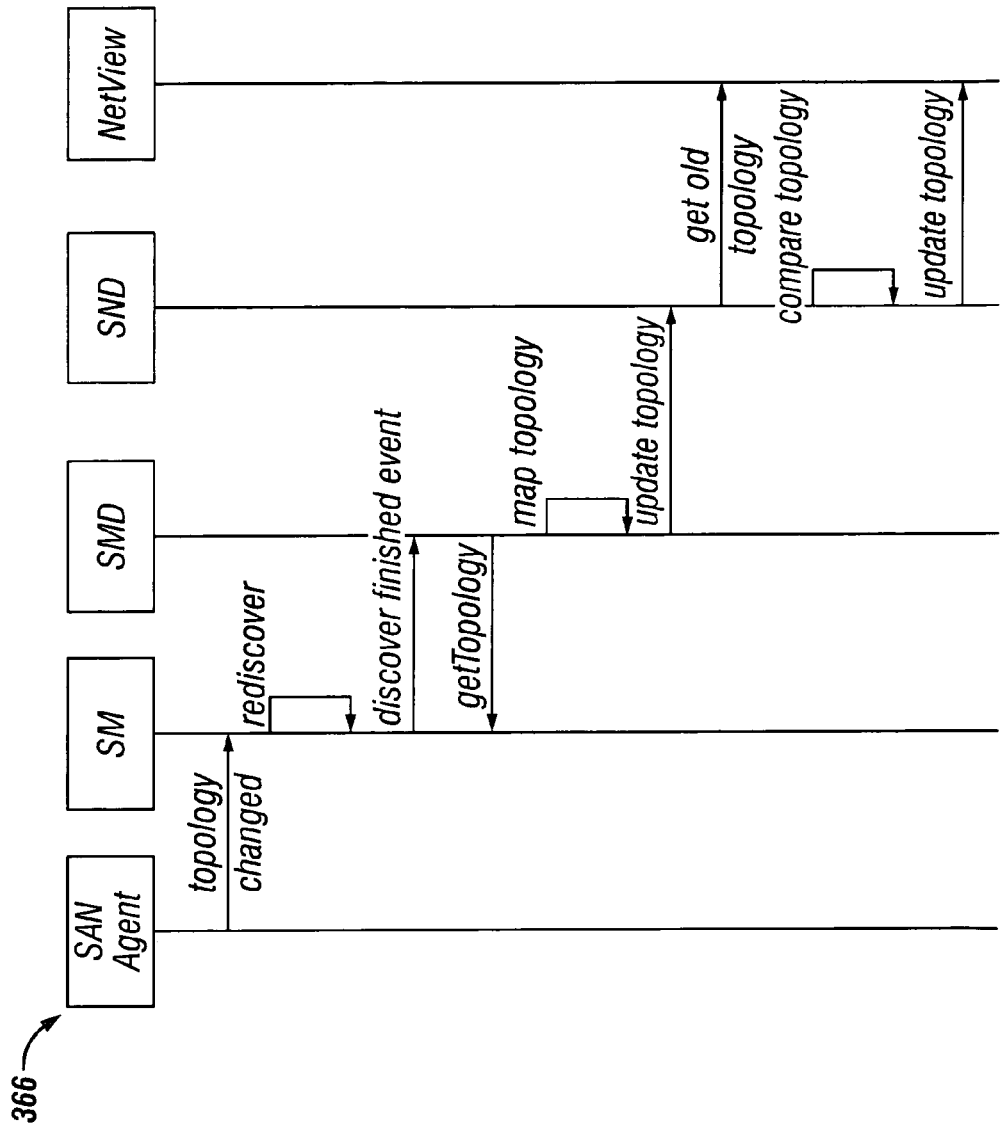
FIG. 40 depicts a manner in which new topology data is transmitted from a SAN manager service to a user interface module in a system according to the invention.

FIG. 40 presents a flow diagram 366 that schematically depicts the manner in which this new topology data is transmitted from the SAN manager service 38 to the NetView console 52 for presentation to a user, e.g., the SAN administrator.

In particular, upon updating its database, the SAN manager 58 sends a "discover finished" event to the SAN manager daemon 58. The daemon 58 in turn retrieves the new topology information from the SAN manager 38, and maps the topology information into sub-maps, as discussed above. Further, the SAN manager daemon 58 transmits these sub-maps to the SAN NetView daemon 56. The NetView daemon 56 compares the new topology with a previous topology representation stored in its database to determine whether an update of its topology representation is needed, and if so, it performs the update.

Dynamically Extending File Systems

The illustrated embodiment dynamically extends host file systems, without requiring operator intervention and without downtime of the host platform 12. A mechanism for such automatic extension is discussed below. Though discussed in connection with specified file systems, e.g., AIX journal file system, Veritas file system (managed under a Solaris operating system), Unix file systems (created using Veritas volume manager and managed under a Solaris operating system), it will be appreciated that similar mechanisms can be utilized with hosts operating under other file systems.

Referring back to FIG. 33, in the illustrated embodiment, when an agent 24 detects that the utilized portion of a file system associated with a managed host 12 has exceeded a predefined threshold 244, 268 (or upon request of the SAN operator/administrator, or based on other criteria or conditions), it transmits an event notification to the manager 20. The manager 20 determines, based on the predefined policy 240 whether the file system of this managed host 12 should be extended. If the predefined policy 240 mandates the extension of the file system, the manager 20 identifies which LUNs should be utilized and assigns one or more identified LUNs to that host 12. Upon receiving the LUN IDs from the manager 20, the agent 24 that is operating on the host 12 extends the file system as discussed below.

Generally, the agent 24 executes the following steps to extend the file system:

1. Initialize the newly assigned LUNs by converting them to a form understood by the host operating system. In some operating systems, this is referred to as writing a signature to the devices and is analogous to formatting a hard disk.
2. Create a logical representation (e.g., an "object") of each newly assigned LUN that corresponds to the underlying physical devices.
3. Add the objects to the logical grouping that form the host file system.
4. Increase the logical volume size of the file system by an amount equal to the entire size of the newly added LUNs.
5. Increased the size of the file system to occupy the increased logical volume size In an embodiment of the invention for use with the AIX Journal file system, the agent extends the host file system by executing the steps of 1. Convert the newly assigned LUNs to physical volumes using built-in host operating system features.
2. Add the physical volume(s) into the volume group of the file system to be extended, using the host API.
3. Extend the logical volume onto the new assigned LUNs using the host API.
4. Extend the file system by an amount equal to the capacity of the newly assigned LUNs, again, using the host API.

Upon completion, the agent 24 notifies the manager 20 of the successful file extension (and, subsequently, the user). If any of the above steps fail, the file system is not extended and the agent 24 notifies the manager 20 of the failure.

In an embodiment of the invention for use with, Veritas or Unix file systems (created using Veritas volume manager and managed under a Solaris operating system) are dynamically extended. As above, once given the newly assigned disk ID(s) and the name of the file system to extend, the agent 24 automatically increases the file system and its underlying volume by an amount equal to the size of the assigned disks. The specific steps (analogous to those above) that the agent 24 performs to accomplish this task are as follows.

1. The agent utilizes the host Solaris API to initialize the LUNs by writing a new label to the newly assigned LUNs (this equates with writing a signature to the disks).
2. The agent utilizes the Veritas API to configure the LUN(s) for use with Veritas Volume manager by converting the newly assigned LUN(s) into VM Disks (which are analogous to physical volumes).
3. The agent utilizes the Veritas API to add the VM Disk(s) to the disk group where the logical volume of the file system to be extended resides.
4. The agent utilizes the Veritas API to increase the size of the file system and its underlying volume by adding all the available disk space from the assigned LUN(s).

As above, if any of the steps fail, the file system is not extended. The manager 20 is notified of the success or failure of the file extension procedure.

Figure 35:
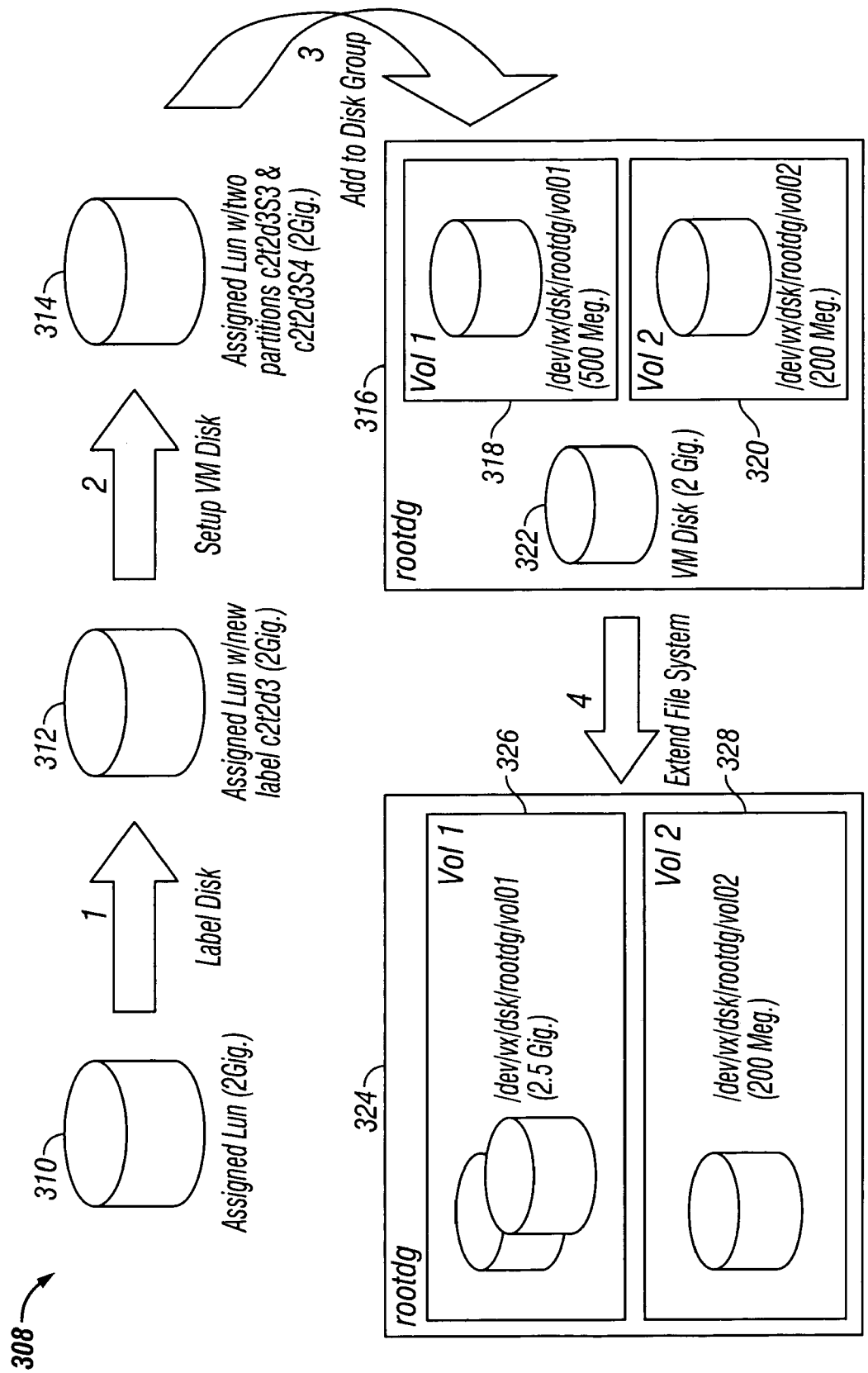
FIG. 35 depicts host file system extension in a system according to the invention.

FIG. 35 illustrates the process 308 that the agent 24 undertakes to extend file systems in accord with the invention. First, a new label is written to an assigned LUN 310. The newly labeled LUN 312 is then initialized and configured for use with the Veritas volume manager (VM) by converting the LUN 312 into VM disks 314. This involves separating the LUN 314 into one or more partitions (in this example having a total size of 2 Gigabytes). The configured disk 322 is then added to a disk group 316 that contains the file system to be extended. ID this example, disk group 316 already contains two volumes 318, 320, and the file system to be extended resides on one volume 318. All the available disk space (2 Gigabytes) from the configured VM disk 322 is then added to the logical volume 318, thereby increasing the size of the file system 324 and its underlying volume 326.

Dynamically Enabling SAN Manager

Upon installation of software defining the agents 24 and manager 20, scanners in the agents operate as described above, e.g., to identify devices connected to their respective hosts. That information is transmitted to the SAN manager 20 and, specifically, to the discover engine 40 (and, therefrom, to the manager service 38) for generation of a topological representation of the SAN. This is presented via the graphical user interface, e.g., NetView console, to the operator/administrator for purposes of making LUN assignments and otherwise administering the SAN.

If operated in the manner described above, the filter drivers 354 would prevent the hosts 12 from accessing any fiber channel storage devices 14 at the time of installation of the agent software—because, at that point, LUN assignments have not yet been made. This can be problematic when, for example, the installation is made over preexisting systems, insofar as users of the hosts 12 would be prevented from accessing the devices until installation is complete and assignments are made. To minimize such potential for interruption to users and hosts, the illustrated embodiment utilizes the mechanisms below to permit host scanning, topology generation, and LUN assignment (among other SAN functions) upon installation, without preventing the hosts from accessing storage devices—at least until such time as the operator/administrator formally "deploys" the system.

Referring to FIG. 41, three flags that reside in a central store are utilized to determine whether the filter driver 354 is active or not, and whether preliminary LUN assignment is enabled. These flags, which can be bits, bytes, fields, records, or other indicators, are referred to here as "assign enable," "fully enable," and "disable." The assign enable flag, when activated by the administrator, allows host/LUN assignments to be made (these have a pending status until deployed). The fully enable flag, if set by the administrator, activates the filter drivers 354. The disable flag, if set by the administrator, disables the filter drivers 354. In the illustrated embodiment, the flags are stored in a configuration file 500 on the manager digital data processor 20, though in other embodiments the flags reside anywhere in the SAN (e.g., together, independently or otherwise) accessible to the hosts 12 and manager 20.

When the SAN software is first installed, the disable flag is set, thereby permitting the agents and scanners to act in the normal course, but prohibiting the filter driver 354 from intercepting and blocking storage device claims for unassigned LUNs (or from otherwise blocking access to such LUNs). Hence, until deployment, the hosts 12 can access all storage devices to which they are coupled via the interconnect 16.

In order to configure the SAN, the operator/administrator sets the assign enable flag in the configuration file 500 by selecting the enable button 116a (or other user input field or option) on the graphical user interface (GUI) shown in FIG. 19. This has the effect of allowing preliminary host/LUN assignments to be made. Because the disable flag is still set at this point, the hosts 12 can continue to access devices 14 while the administrator is making pending assignments.

Once finished making preliminary host/LUN assignments, the operator/administrator initiates activation of the filter driver 354, by selecting the deploy button 116b (or other user input field or option) on the GUI, which has the effect of setting the fully enable flag. In some embodiments, the filter drivers 354 are installed on their respective hosts 12 at the time the agent software is installed. In these embodiments, the filter drivers 354 are activated when the fully enable flag is set. In the illustrated embodiment, selection of the deploy button 116b has the additional effect of causing the manager 20 to download the filter drivers 354 to the respective agents the first instance. In either embodiment, selecting the deploy button 116b can cause the hosts to reboot, e.g. after downloading of the filter driver 354 and/or setting of the fully-enable flag, so that the storage device claiming process can proceed as described earlier.

The operator/administrator can subsequently disable the filter drivers 354 and, thereby, permit the hosts 12 to access all devices 14, by selecting the disable button 116c on the GUI (shown in FIG. 19). This action causes the disable flag in the configuration file 500 to be set, and the filter drivers 354 to be disabled.

The foregoing defines a two-step process. The first step is to enable assignments, and the second step is to deploy the agents (filter drivers). If the operator/administrator is not concerned about a period of no access, he/she can invoke the second step immediately after the first step. However, the administrator can also invoke the first step, make a preliminary set of Host/LUN assignments and then invoke the second step to deploy the agents. Doing so will provide the administrator with continuous access (other than the time for a reboot) to those LUNs which have been assigned. Assignments made between the two steps are displayed as "pending" until the second step (deployment) has been completed. Until the second step is executed the filter driver 354 is considered disabled and file extensions will not occur. The first step only allows initial assignments to be made before masking is enabled.

Launching Device Specific Applications

As discussed above, a SAN according to the invention can include a variety of components, such as one or more digital data processors hosts, one or more storage device, and a switching fabric, having a variety of components, such as, switches, hubs, gateways, for providing communication between the hosts and the storage devices. These components are typically acquired from different vendors, and have various application software associated therewith. For example, the switching fabric components can have vendor-specific management applications that allow configuring and/or managing these components.

The illustrated embodiment permits the SAN operator/administrator to execute these vendor-specific applications from a single graphical user interface, to wit, that SAN manager GUI 20, in a manner described in more detail below.

Figure 42:
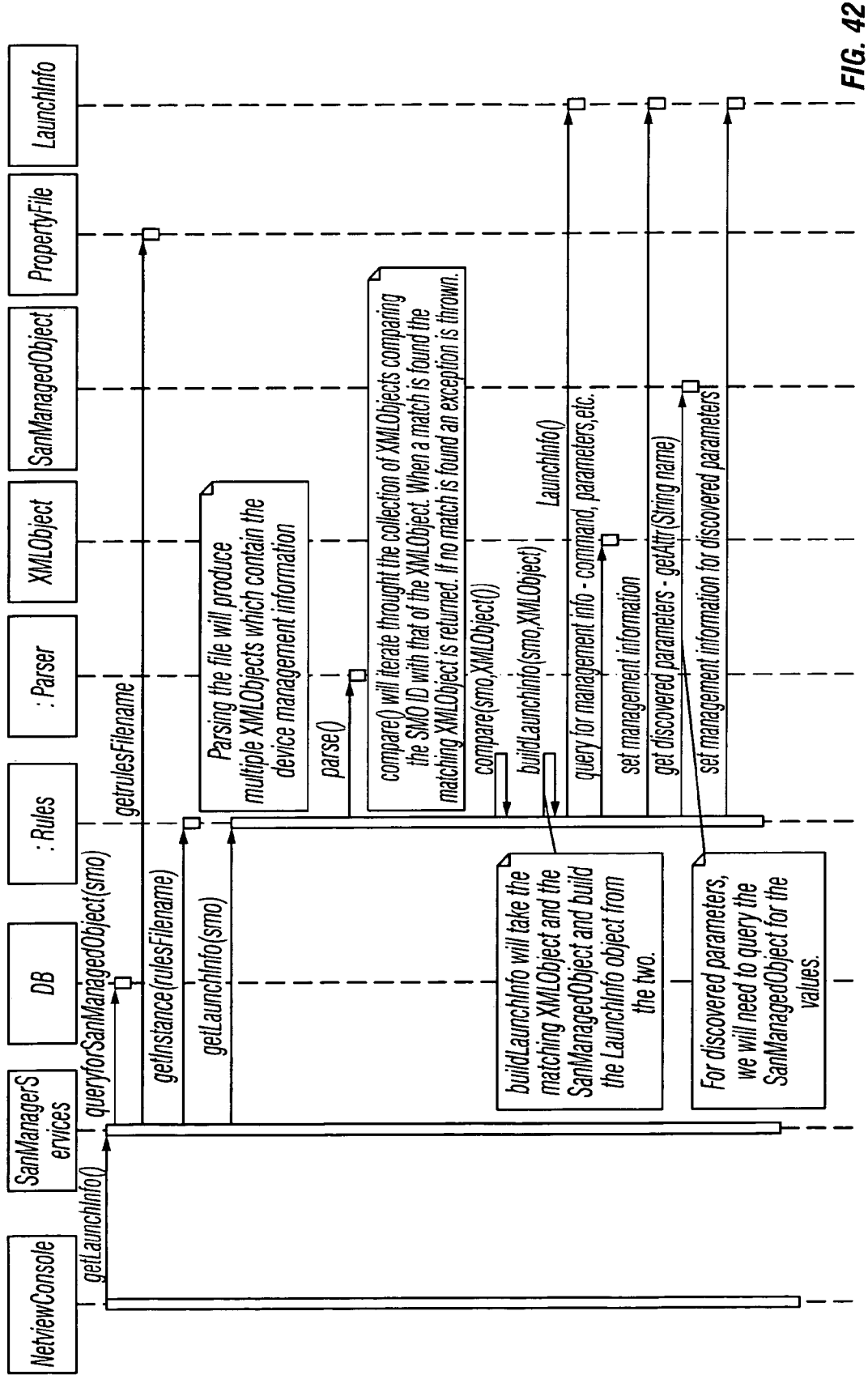
FIG. 42 is a data flow diagram depicting execution of applications processes by the SAN manager console in a system according to the invention.

With reference to FIG. 6 and FIG. 42, the SAN manager service 38 maintains a representation of the SAN that provides information, inter alia, regarding the identity of the SAN components, and the connectivity of these components. In addition, the manager service 38 maintains for selected components, for example, the switching fabric components, information regarding management applications specific to them. These can be applications, by way of non-limiting example, residing directly on the components, applications invoked or effected through HTTP, telnet or other servers residing on the components or on proxy services residing elsewhere, and/or via applications running on the SAN manager itself. This information is stored, for example, in a file, referred to herein as a "Rules" file, which identifies each of the selected components and the applications and communication interfaces supported by that component, e.g., telnet, SNMP. In the illustrated embodiment, a mark-up language, e.g, XML, is utilized to format the information contained in the Rules file, though in other formats may be used instead or in addition.

Information regarding the component management applications can be obtained from the operator/administrator (e.g., via prompt and/or menu option when the respective components are first added to the system or subsequently) and/or obtained directly from the components themselves. In the case of the latter, the information can be obtained via standardized queries, such as Management Server queries or FC MANAGEMENT MIB queries. In the case of components that cannot respond to such queries with the necessary information (as where the corresponding management application resides on the SAN manager itself) and/or that have multiple management applications, any information obtained from the component is augmented in the Rules file with information, e.g., obtained from the operator/administrator, identifying the necessary or preferred application.

The Netview server can effect retrieval of the SAN representation from the manager service 38 and the display of selected information discerned from the retrieved representation on the Netview console 52, as described in detail above. In one embodiment, the Netview console 52 displays a plurality of graphical objects, e.g., icons, each of which represents one of the SAN components. Alternatively, a textual list of the SAN components can be displayed. Further, the Netview console 52 provides an operator, e.g., the SAN administrator, with a user interface element, such as keyboard or mouse, that permits selection of one of the displayed components.

The Netview server allows the operator to launch an application process associated with a selected SAN component, such as, a management application residing on that component, such as, a switch, in a manner described below. In response to the selection of a graphical object representing a SAN component, the Netview server accesses the Rules file to obtain information regarding the application processes associated with that selected component, and effects the display of this information, for example, in the form of a menu, on the Netview console 52. In some embodiment, a plurality of management applications residing on a selected component are displayed while in other embodiments, only the primary management application is displayed. To facilitate the display of information regarding on the SAN components on the Netview console, in some embodiments, the Netview server stores the information retrieved from the SAN manager service 58 regarding the applications residing on the SAN components in a persistable storage. The Netview server 54 responds to the selection of one of the displayed application processes by effecting the launching of that application process via an interface process, such as a web-based browser application, a telnet process, or an SNMP application. More particularly, the Netview server 54 communicates with the SAN manager service 38 to retrieve information, such as, launch method and its respective parameters, therefrom. The SAN manager service responds to a request from the Netview server for the launch information by parsing the Rules file to generate an object, e.g., an XML object, that contains the requisite information, and transmits the information to the Netview server. The Netview server utilizes the object returned from the SAN manager service to effect the launching of the selected application process.

Once the selected application, e.g., a management application, is launched, the operator can utilize the application, via the interface software provided by the Netview server, to configure and/or manage the SAN component on which the application resides. This advantageously allows the operator, e.g., the SAN administrator, to manage a variety of SAN components, having different management applications, from a single entry point, that is, from the Netview server/console.

A further appreciation of the illustrated embodiment may be from the discussion below.

In the illustrated embodiment, the format of the rules file is comprised of three sections—the version, the supported device types, and a collection of the individual device rules themselves.

Version Section

The version section is used to hold the version of the rules file and is comprised of a major and a minor number. The San Manager software can handle minor version changes, but will not allow launch to operate with major version changes. If new fields are added, this would be considered a major change to the rules file and the major number would need to be updated along with the SAN Manager software. The addition If a new rule, a new device type, or a change in a current value, are considered minor changes as the format remains the same.

Device Type Section

This section is used to hold all device types for which rules are defined. If a rule is added for a device type that is not currently associated with any rule, then this device type is added to the device types section as one of the types.

For example, if the current version of the rules file contains switches and hubs in the device type section and all the rules relate to switches and hubs, then if another rule (say a CDRom) for a type other than switch or hub is added, a new type will be added to the device type section.

Rule Section

The rules section is comprised of multiple rules—one or more rules per managed device. The rule itself is comprised of two sections—the id section and the management information section. The id section is used to uniquely identify the device to be managed. The management information section is a collection of multiple types of management information, each one describing a certain method for managing the particular device. There can be multiple management methods available for managing a particular device.

ID Section

The id section is comprised of a collection of parameters that are used to uniquely identify the device that the rule represents. A rule match is obtained by matching an object's attributes with the parameter values contained in the id section of the rule.

OR Operation

Normally, all parameters in the ID section are AND'ed together with the exception of the parameters with the same name that are listed consecutively in the ID portion of the file, which are OR'ed together. For example, a sample ID portion of a rule is shown below. Note that there are two parameters with the same name ("Type") in the ID portion. The software will interpret this as meaning that the ID is satisfied with an attribute value of "Switch" or "Hub".

```
<ID>
    <Parameter>
        <Name>Vendor ID</Name>
        <Value>Brocade Communications, Inc.</Value>
    </Parameter>
    <Parameter>
        <Name>Type</Name>
        <Value>Switch</Value>
    </Parameter>
    <Parameter>
        <Name>Type</Name>
        <Value>Hub</Value>
    </Parameter>
</ID>
```

To complete the example, the preceding ID is equivalent to the following logical expression:

Vendor ID=Brocade Communications, Inc. AND (Type=Switch OR Type=Hub).

Control Characters

Defined control characters are allowed in the rules file and cause specific actions to occur depending on the control character. The following is a list of the control characters provided in one embodiment:

CONTROL_CHARACTER: "!"
DEFAULT_CHARACTER: "?"
WILDCARD_CHARACTER: "*"

CONTROL_CHARACTER: "!"— occurs before any other control type character. This is the main control character, which informs the software that another control type character exists.

DEFAULT_CHARACTER: "?"— the default character allows having a parameter match if the device for which a rule is to be identified contains a value for the parameter. For example, the following parameter can be present in the ID section of a rule:

```
<Parameter>
    <Name>Management Telnet Address</Name>
    <Value>!?</Value>
</Parameter>.
```

This indicates that if the device has a value for the attribute (parameter) Management Telnet Address, then this parameter is a match. Of course, all parameters must match for a complete ID match and thus a rule match.

WILDCARD_CHARACTER: "*"— the wildcard character is used to allow any value to be valid in a specific character of a parameter string. If there is more than one character in a string that can contain any value to be valid, then there are multiple wildcard characters in the Value string. For example, the following parameter:

```
<Parameter>
    <Name>Model</Name>
    <Value>Silkworm 1!***</Value>
</Parameter>.
``` indicates that to match the Model attribute (parameter), a Value string of Silkworm 1000-1999 will be accepted. Any number of control characters can be contained in the wildcard character for a parameter value. However, in order for the wildcard character to work, it should contain at least one control character. For example, "Silkworm 1*" would not work properly. It would only work if the device's model number where the string "Silkworm 1*" which is not what we would expect (1000–1999). The following example further illustrates this point:

```
<Parameter>
    <Name>Model</Name>
    <Value>Silkworm 1!*5*</Value>
</Parameter>.
```

The above example will accept any value in the $11^{th}$ and $13^{th}$ characters of the string. Only 1 control character is necessary in the string even though the wildcard flags are separated. Although not necessary, a control character can be put before each wildcard character. The placement of the control character is also not important—it could be contained anywhere in the string. "!Silkworm 1***" would work just the same as the above example.

Management Information Section

Any particular rule can have one or more management information sections. Each management information section describes a particular management method for the device. In one embodiment, there are four possible management information types depicted below:

1. Telnet
2. URL
3. Application
4. SNMP.

The management information section is comprised of the following format:

Type—one of the four types listed above

Primary—a Boolean (True, False) value indicating if this is the primary management method for the device.

Command—command section containing the command format and static parameters (StaticParameters), and the discovered parameter names (Name).

Below is a sample Management Information section of the rules file:

```
<ManagementInformation>
    <Type>Telnet</Type>
    <Primary>True</Primary>
    <Command>
        <StaticParameters>%1</StaticParameters>
        <Name>Management Telnet Address</Name>
    </Command>
</ManagementInformation>
```

The above management information section indicates that the type is Telnet, that this management information is the primary management information for the device, and the command format is one discovered parameter named "Management Telnet Address".

Command Section

The command section contains a StaticParameters section and one or more Name sections.

The StaticParameters section contains the command (if there is one), the format of the command, and any static parameters, if any. The placement of Discovered parameters in the command format are represented by a "%" character with the characters immediately following the "%" indicating which number the parameter is in the list of discovered parameters that follow. This numbering starts from 1.

The discovered parameters are stored by the Name section—one Name section for each discovered parameter.

The command section in the above example shows no command, no static parameters, and the format indicates that there exists one discovered parameter. This is all shown by the %1. The one discovered parameter is contained in the Name section and is "Management Telnet Address". Since telnet is a command supplied by the operating system, the type alone indicates what the command is and the Command section only needs to supply the command format, any static parameters, and any discovered parameters. This is also true of the URL and SNMP types. In fact, in some embodiments, only the Application type will have a command present in the StaticParameters field—an example of this is shown below:

```xml
<ManagementInformation>
    <Type>Application</Type>
    <Primary>False</Primary>
    <Command>
        <StaticParameters>managementApp -m %1 -p %2 -a %3</StaticParameters>
        <Name>Model</Name>
        <Name>Port</Name>
        <Name>Management Address</Name>
    </Command>
</ManagementInformation>
```

The example shows the type of management information is Application, and that this is not the primary management method, and the command includes the following:

Command and format—managementApp is the executable name and the format of the command is "managementApp—m Model—p Port—a Management Address.

Sample Rules File

Below is a sample rules file that contains only one rule.

```xml
<RulesFile>
    <Version>
        <Major>1</Major>
        <Minor>0</Minor>
    </Version>
    <DeviceTypes>
        <Type>Switch</Type>
        <Type>Hub</Type>
    </DeviceTypes>
    <Rule>
        <ID>
            <Parameter>
                <Name>Vendor ID</Name>
                <Value>Brocade Communications, Inc.</Value>
            </Parameter>
            <Parameter>
                <Name>Type</Name>
                <Value>Switch</Value>
            </Parameter>
            <Parameter>
                <Name>Model</Name>
                <Value>Silkworm 1!***</Value>
            </Parameter>
        </ID>
        <ManagementInformation>
            <Type>Telnet</Type>
            <Primary>True</Primary>
            <Command>
                <StaticParameters>%1</StaticParameters>
                <Name>Management Telnet Address</Name>
            </Command>
        </ManagementInformation>
        <ManagementInformation>
            <Type>URL</Type>
            <Primary>False</Primary>
            <Command>
                <StaticParameters>%1</StaticParameters>
                <Name>Management URL Address</Name>
            </Command>
        </ManagementInformation>
        <ManagementInformation>
            <Type>SNMP</Type>
            <Primary>False</Primary>
            <Command>
                <StaticParameters>%1 fcfe.mib</StaticParameters>
                <Name>Management Snmp Address</Name>
            </Command>
        </ManagementInformation>
        <ManagementInformation>
            <Type>SNMP</Type>
            <Primary>False</Primary>
            <Command>
                <StaticParameters>%1 fcfe.mib</StaticParameters>
                <Name>Management Snmp Address</Name>
            </Command>
        </ManagementInformation>
        <ManagementInformation>
            <Type>SNMP</Type>
            <Primary>False</Primary>
            <Command>
                <StaticParameters>%1 fcfe.mib</StaticParameters>
                <Name>Management Snmp Address</Name>
            </Command>
        </ManagementInformation>
    </Rule>
```

DTD Format

Below is shown the XML DTD for the rules file.

```
<!ELEMENT RulesFile (Version, DeviceTypes, Rule*)>
<!ELEMENT Version (Major, Minor)>
<!ELEMENT DeviceTypes (Type*)>
<!ELEMENT Rule (ID, ManagementInformation*)>
<!ELEMENT ID (Parameter*)>
<!ELEMENT Parameter (Name, Value)>
<!ELEMENT ManagementInformation (Type, Primary, Command)>
<!ELEMENT Command (StaticParameters, Name*)>
<!ELEMENT Type (#PCDATA)>
<!ELEMENT Primary (#PCDATA)>
<!ELEMENT StaticParameters (#PCDATA)>
<!ELEMENT Name (#PCDATA)>
<!ELEMENT Value (#PCDATA)>
<!ELEMENT Major (#PCDATA)>
<!ELEMENT Minor (#PCDATA)>
```

Interfacing with Multiple Host Platforms

Figure 43:
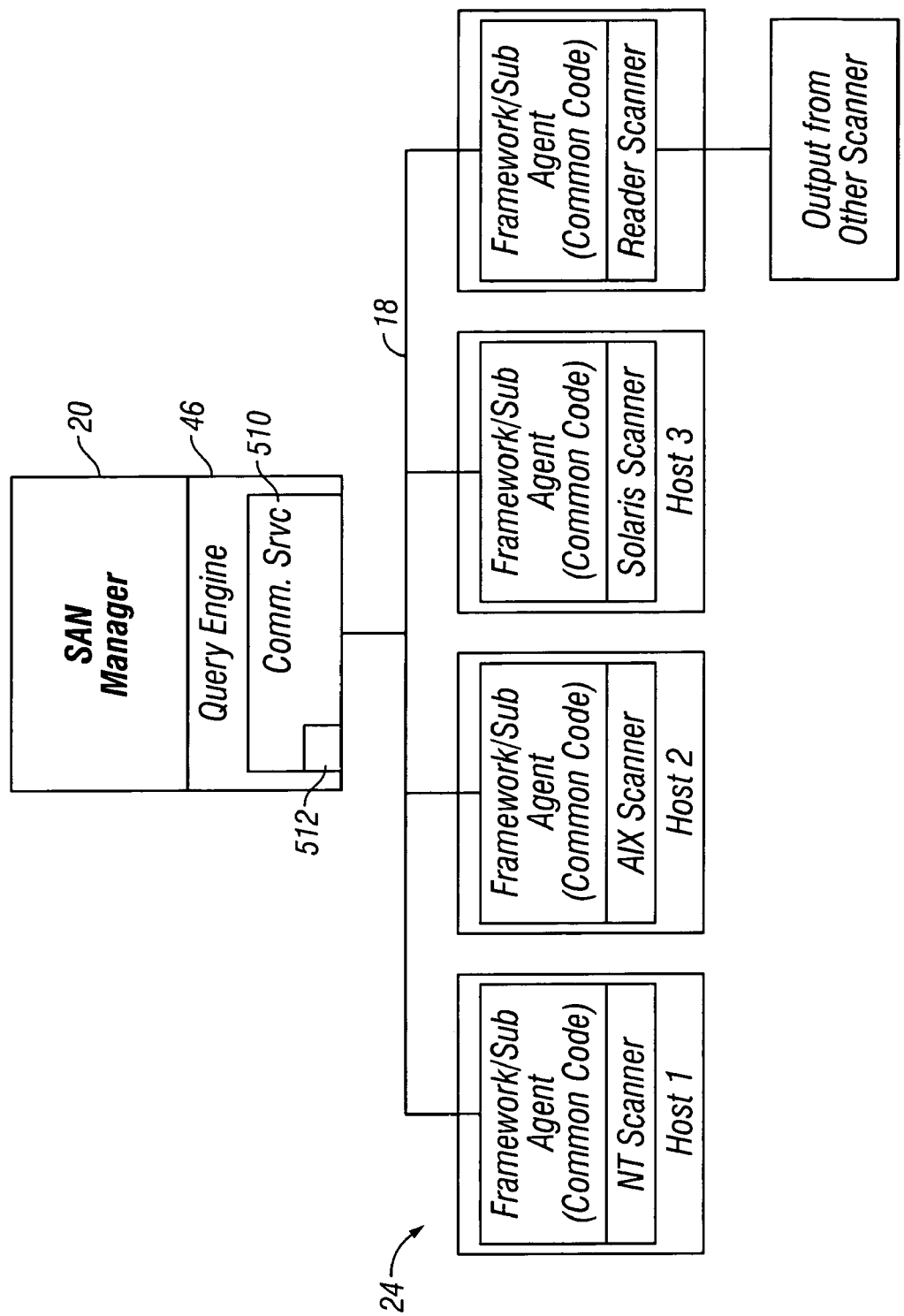
FIG. 43 depicts an architecture for host/agent communication and interfacing in a system according to the invention.

The illustrated embodiment utilizes a component architecture as shown in FIG. 43 to facilitate implementation of the agents on hosts 12 of varied platform types and, specifically, by way of example to facilitate collecting scan information from multiple host platforms. This architecture also facilitates testing of agent implementations and those of aspects of the SAN manager 20 that process and generate agent-specific data.

Referring to FIG. 43, SAN manager 20 includes a service 510 which provides a communication interface for query engine 46 (of FIG. 6). More specifically, service 510 transmits and receives XML data to/from the agents 24. It interfaces with inband or outband handlers (see FIG. 6) of engine 46, transmitting XML or other data generated by them to the agents 24, while receiving XML (or other) data from them for transfer to the handlers.

Communication service 510 includes an agent registry 512 (corresponding to the same-named element of FIG. 6) that identifies agents "known" to the SAN manager 20 via their (the agents) registering with the service 510, e.g., at the time of the respective host deployment and/or boot-up. The registry 512 lists the agents by identifier and provides addresses (e.g., IP addresses or otherwise) through which they can be accessed, e.g., over LAN 18 or other medium via which the manager 20 and agents 24 are coupled. Though the discussion that follows focuses on the communication service 510 of the query engine 46, those skilled in the art will appreciate that like functionality can be supplied with event correlator 48 of SAN manager 20 and its counterparts event subAgents of the agents 24, as well as with other components of the SAN manager that communicate with those agents.

Agents 24 reside on hosts 12 and operate in the manner described at length elsewhere herein. Those hosts can be of a variety of platforms, including by non-limiting example Windows NT, Windows 2000, Aix, Solaris, and so forth. As noted above, each agent comprises a framework and subAgents, the latter representing major agent services or functions. In the illustrated embodiment, the framework and those portions of the subAgent implementations common to all host platforms are implemented in Java or other platform-independent code (i.e., code that can be readily ported from platform to platform). This includes the subAgent services that provide overall control of host/LUN masking, as well as those that provide overall control of scanning, and so forth. In the illustration, this platform-independent code is labeled as "common code." Filter drivers, device drivers and other aspects of agent implementation that are platform specific are implemented in C or other platform-dependent code (i.e., code that is specific to each platform). This is represented in the drawing by names of the respective platform-specific scanners (though, it can represent more than merely scanners).

In the illustrated embodiment, a novel mechanism is utilized to provide communication between the platform-independent modules and the platform-dependent modules. Particularly, as such communication potentially crosses language barriers, the platform-dependent functions are implemented as a standalone applications which accepts input via command line parameters and return the output through Standard Output or Standard Error. More simply put, the platform-independent functions invoke and communicate with the platform-dependent function via a command line interface.

In operation, XML encoding requests, commands or data generated by the query engine 46 is passed to communication service 510, along with an identifier of the agent to which the same is to be directed. Service 510 determines from registry 512 and address for the target agent and transmits the data accordingly via LAN 18 (or other medium). The XML is communicated via CORBA in the illustrated embodiment, though other protocols and/or mechanisms can be used instead or in addition. Platform-independent modules comprising the agent framework and subagents receive the XML requests, commands or data and process them in accord with the implicated agent function and services. Processing that requires action of the platform-dependent modules are communicated to them via the command line, as noted immediately above. Data and other information generated by the platform-dependent modules is returned via Standard Output, Standard Error or other such operating system command-level environmental variables. In the illustrated embodiment that data or other information, which is encoded by the platform-dependent modules in XML (or other suitable format), is transmitted via the platform-independent framework or subAgents back to the service 510, via LAN 18, for processing by the SAN manager.

An advantage of the architecture illustrated in FIG. 43 is that it separates the platform dependent/independent components of the agent implementations, e.g., at the subAgent/Scanner boundary. In addition to facilitating development of agent implementations on a variety of platforms, this allows for great flexibility in testing. Thus, for example, since the scanners or other platform-dependent modules are implemented as stand-alone applications, they can be executed independently for unit level testing.

Moreover, re-creation of agent output is easily accomplished by executing the standalone scanner and capturing the output in a file, which is later read by a modified version of the agent. That is, the agent executes an application and then receives the output by capturing the Standard Output information. A modified version of the scanner or other platform-dependent module can simply read a file previously created by a Scanner and outputing this file to Standard Out. The information can be manually modified, to provide larger sets of information that are not possible to physically configure or generate test datasets for other difficult situations, and used as input by using the same modified module (which reads a previously generated file and routes the information to Standard Out).

Described herein are systems and methods achieving the objects set forth above. Those skilled in the art will appreciate that the illustrated embodiments are mere examples of the invention and that other systems and methods incorporating additions, modifications or other changes therein fall within the scope of the invention. By way of non-limiting example, it will be appreciated that the system and methods described herein can be implemented on any variety of manager and host digital data processor platforms. Further, it will be appreciated that programming constructs in addition to and other than those described above may be used in practicing the invention. By way of still further non-limiting example, it will be appreciated that graphical user interface techniques other than and/or in addition to those described herein may be beneficially employed in systems and methods of the invention. Still further, interconnection media and schemes in addition to and other than those described above can be used to support communications between the managers, hosts and/or storage devices.

In view of the foregoing, what we claim is:

1. In a storage area network (SAN) of the type having a plurality of components including one or more digital data processors in communication with one or more storage devices, the improvement comprising:
   a store comprising a plurality of objects, including
   (i) one or more objects ("scan" objects) each representing information gathered from a respective digital data processor,
   (ii) one or more objects ("component" objects) each representing a component of the SAN,
   (iii) one or more objects ("relationship" objects) each representing a relationship between two of the SAN components,
      where each scan object is associated with and regarding one of the component objects or one of the relationship objects,
      a discover module, coupled to the store, that validates information gathered from a setected digital data processor regarding any of a selected component or relationship based on a scan object, if any, associated with a component or relationship object, respectively, corresponding to the selected component or relationship.

2. In the SAN of claim 1, the further improvement comprising a plurality of scanners executing on the digital data processors, each scanner gathers information regarding the SAN components and relationships from its respective digital data processor by running one or more scans, each scan is represented by one of the scan objects.

3. In the SAN of claim 2, the further improvement wherein the discover module responds to a selected change in a SAN component or relationship identified in information contained in a scan by traversing the component or the relationship objects, respectively, to identify one or more scan objects, if any, associated with the component or relationship objects implicated by that change.

4. In the SAN of claim 3, the further improvement wherein the discover module effects each scanner corresponding to one of the identified scan objects to run a new scan to gather updated information relating to the identified change.

5. In the SAN of claim 4, the further improvement wherein the discover module validates the identified change if the updated information obtained via each of the new scans confirms the identified change.

6. in the SAN of claim 5, the further improvement wherein the discover module fails to validate the identified change if the information gathered by at least one of the new scans is inconsistent with the identified change.

7. In the SAN of claim 6, the further improvement comprising a manager process in communication with the discover module, the manager process maintaining a representation of the SAN.

8. In the SAN of claim 7, the further improvement wherein the discover module notifies the manager process of a validated change in the SAN.

9. in the SAN of claim 8, the further improvement wherein the manager process updates the SAN representation to reflect the change in the SAN.

10. In the SAN of claim 1, the further improvement wherein at least one of the relationship objects identifies an attribute of one of the components.

11. In the SAN of claim 1, wherein at least one of the objects represents a data field in a table.

12. In the SAN of claim 11, wherein the at least one of the objects includes a first identifier referencing the table and a second identifier referencing the data field within that table.

13. in the SAN of claim 9, wherein the change in the SAN represents a decoupling of a previously coupled storage device from the SAN.

14. In the SAN of claim 4, the further improvement wherein the discover module effects scanners corresponding the identified scan objects, other than the scanner initially providing information indicative of the change, to run new scans to determine whether the new scans confirm same change.

15. In the SAN of claim 14, the further improvement wherein the discover module validates the identified change if each of the new scans confirms the change.

16. In a storage area network (SAN) of the type having a plurality of components including one or more digital data processor hosts in communication with one or more storage devices, a method of updating a representation of the SAN, comprising:

collating data regarding the SAN received from at least a scan associated with a scanner executing on one of the digital data processors to identify a selected change, if any, in a component or a relationship in the SAN, identifying scans that previously provided information regarding a SAN component or relationship implicated in the selected change, effecting scanners corresponponcting to the identified scans to obtain new data regarding the component and relationship implicated in the change, updating the SAN topology representation to reflect the selected change if the new data obtained by each of the identified scanners confirms the change.

17. In the SAN of claim 16, wherein the step of effecting scanners further comprises effecting scanners other than the scanner initially reporting the change to obtain new data corresponding to the change.

18. In the SAN of claim 16, wherein the SAN representation provides a topology model of the SAN.

19. In the SAN of claim 17, wherein the identified change represents a decoupling of a previously coupled storage device from the SAN.

20. In the SAN of claim 18, wherein the identified change represents a change in an attribute of any of one of the storage devices and one of the hosts.

21. An article of manufacture, comprising:
code enabled to be executed by a system to perform operations, wherein the system has a storage area network (SAN) of the type having a plurality of components including one or more storage devices and one or more digital data processor hosts in communication with one or more storage devices, and wherein the system executed operations comprise updating a representation of the SAN, including:

collating data regarding the SAN received from at least a scan associated with a scanner executing on one of the digital data processors to identify a selected change, if any, in a component or a relationship in the SAN, identifying scans that previously provided information regarding a SAN component or relationship implicated in the selected change, effecting scanners corresponding to the identified scans to obtain new data regarding the component and relationship implicated in the change, and updating the SAN topology representation to reflect the selected change if the new data obtained by each of the identified scanners confirms the change.

22. The article of claim 21, wherein the effecting scanners further comprises effecting scanners other than the scanner initially reporting the change to obtain new data corresponding to the change.

23. The article of claim 21, wherein the SAN representation provides a topology model of the SAN.

24. The article of claim 22, wherein the identified change represents a decoupling of a previously coupled storage device from the SAN.

25. The article of claim 23, wherein the identified change represents a change in an attribute of any of one of the storage devices and one of the hosts.

* * * * *